(12) United States Patent
Davis et al.

(10) Patent No.: US 10,467,602 B2
(45) Date of Patent: Nov. 5, 2019

(54) FACILITATING SENDING, RECEIVING, AND UPDATING OF PAYMENTS USING MESSAGE AND PAYMENT QUEUES

(71) Applicant: Facebook, Inc., Menlo Park, CA (US)

(72) Inventors: Stephen Moore Davis, San Francisco, CA (US); Xunjie Yu, Santa Clara, CA (US); Aaron Alexander Sarnoff, San Francisco, CA (US); Jeremy David Fein, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 1122 days.

(21) Appl. No.: 14/645,006

(22) Filed: Mar. 11, 2015

(65) Prior Publication Data

US 2016/0267447 A1 Sep. 15, 2016

(51) Int. Cl.
*G06Q 20/10* (2012.01)
*G06Q 20/40* (2012.01)
*H04L 12/58* (2006.01)

(52) U.S. Cl.
CPC ......... *G06Q 20/10* (2013.01); *G06Q 20/4016* (2013.01); *H04L 51/08* (2013.01); *H04L 51/16* (2013.01)

(58) Field of Classification Search
None
See application file for complete search history.

(56) References Cited

U.S. PATENT DOCUMENTS 8,699,994 B2 * 4/2014 Kim ................... G06Q 30/0601
455/406

2007/0011104 A1 1/2007 Leger et al.
(Continued)

FOREIGN PATENT DOCUMENTS

JP 2003-150790 A 5/2003
JP 2004-177995 A 6/2004
(Continued)

OTHER PUBLICATIONS

Edward Curry: "Message-Oriented Middleware : Mahmoud/ Middleware for Communications" In: "Middleware for Communications.", Jun. 29, 2004 (Jun. 29, 2004), John Wiley & Sons, Ltd, XP055428926, ISBN: 978-0-470-86206-3 pp. 1-28, DOI: 10.1002/ 0470862084.ch1 (Year: 2004).*
(Continued)

*Primary Examiner* — Kito R Robinson
*Assistant Examiner* — Shacole C Tibljas
(74) *Attorney, Agent, or Firm* — Keller Jolley Preece

(57) ABSTRACT

The present disclosure relates to systems, methods, and devices for sending and receiving payments using an integrated payment and messaging system. In particular, the integrated payment and messaging system allows users to send and receive electronic payments as well as exchange messages. For example, one or more implementations involve facilitating message exchanges and payment transactions using push notifications via separate message and payment queues. To illustrate, one or more implementations involve pushing status updates to a payment transaction using a payment queue specific to a user. Additionally, one or more implementations involve associating payment transactions with messages within a messaging thread for providing updates to each user in the messaging thread.

20 Claims, 22 Drawing Sheets

(56) References Cited

U.S. PATENT DOCUMENTS

| | | | |
|---|---|---|---|
| 2010/0279733 A1* | 11/2010 | Karsten | H04W 48/18 |
| | | | 455/552.1 |
| 2012/0005326 A1* | 1/2012 | Bradetich | G05B 19/4185 |
| | | | 709/223 |
| 2012/0158589 A1* | 6/2012 | Katzin | G06Q 20/12 |
| | | | 705/44 |
| 2012/0167098 A1* | 6/2012 | Lee | G06F 16/2379 |
| | | | 718/101 |
| 2012/0198002 A1 | 8/2012 | Goulart et al. | |
| 2012/0221962 A1 | 8/2012 | Lew et al. | |
| 2013/0297481 A1 | 11/2013 | Assia | |
| 2013/0297493 A1 | 11/2013 | Linden et al. | |
| 2014/0006297 A1 | 1/2014 | Hogg et al. | |
| 2014/0052633 A1 | 2/2014 | Gandhi | |
| 2014/0095622 A1 | 4/2014 | Fisher et al. | |
| 2014/0207679 A1 | 7/2014 | Cho | |
| 2014/0279543 A1* | 9/2014 | Ruhrig | G06Q 50/01 |
| | | | 705/44 |
| 2014/0316937 A1 | 10/2014 | Jiao et al. | |
| 2015/0046327 A1 | 2/2015 | Taupitz | |

FOREIGN PATENT DOCUMENTS

| | | |
|---|---|---|
| JP | 2010-108177 A | 5/2010 |
| JP | 2011-518377 A | 6/2011 |
| JP | 2012-504273 A | 2/2012 |
| JP | 2012-088755 A | 5/2012 |
| JP | 2014-010558 A | 1/2014 |
| JP | 2014-078220 A | 5/2014 |
| JP | 2014-132474 A | 2/2019 |
| WO | WO 15/020208 | 12/2015 |
| WO | WO 2016-144364 | 9/2016 |

OTHER PUBLICATIONS

Edward Curry: "Message-Oriented Middleware : Mahmoud/Middleware for Communications" In: "Middleware for Communications.", Jun. 29, 2004 (Jun. 29, 2004), John Wiley & Sons, Ltd, XP055428926, ISBN: 978-0-470-86206-3 pp. 1-28, DOI: 10.1002/0470862084.ch1.

Office Action as received in European application EP 15188178.6 dated Dec. 6, 2017.

International Search Report as received in PCT/US2015/020208 dated Dec. 10, 2015.

Extended European Search Report as received in EP 15188178.6 dated Jul. 12, 2016.

Office Action as received in Japanese application 2017-544612 dated Feb. 5, 2019.

* cited by examiner

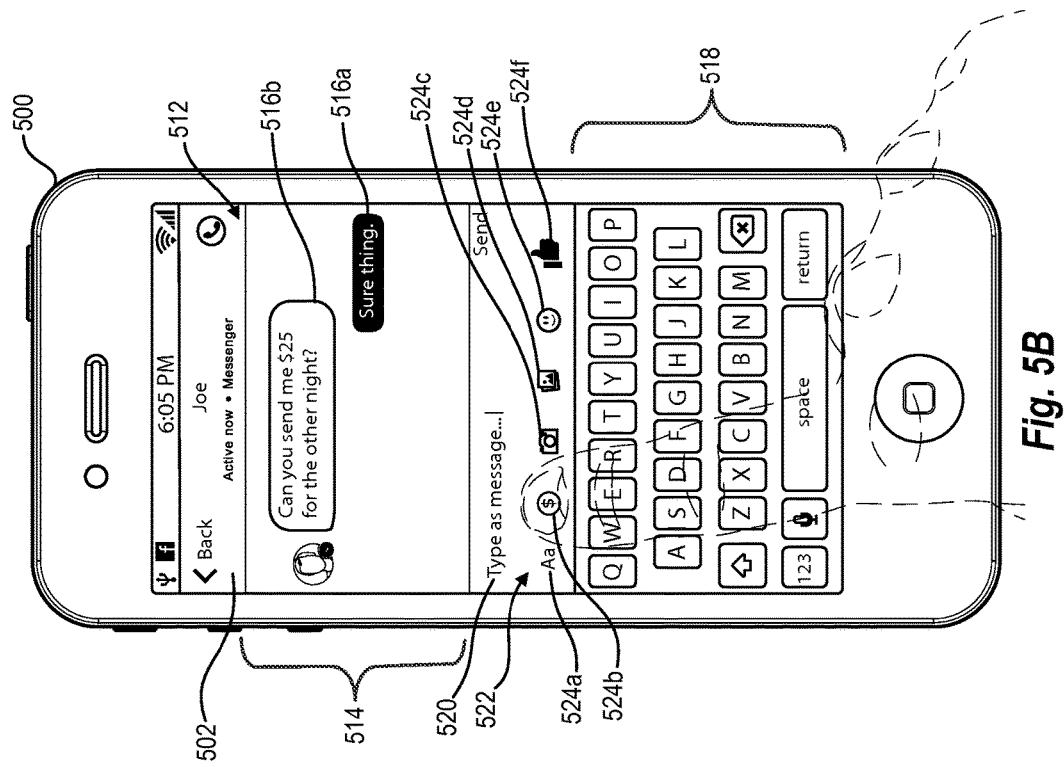
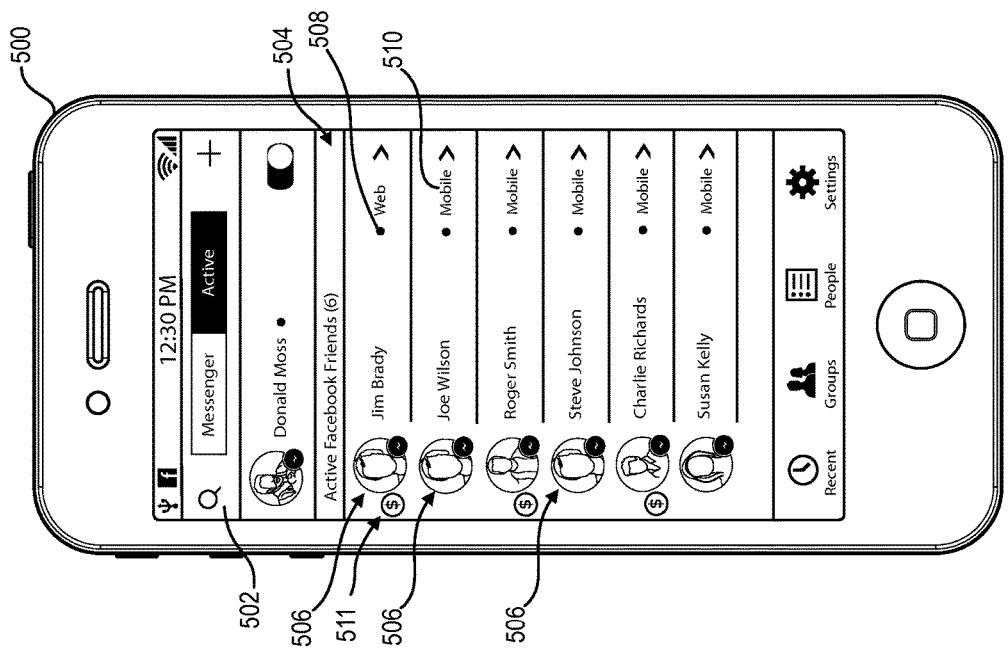
Fig. 5B
Fig. 5A

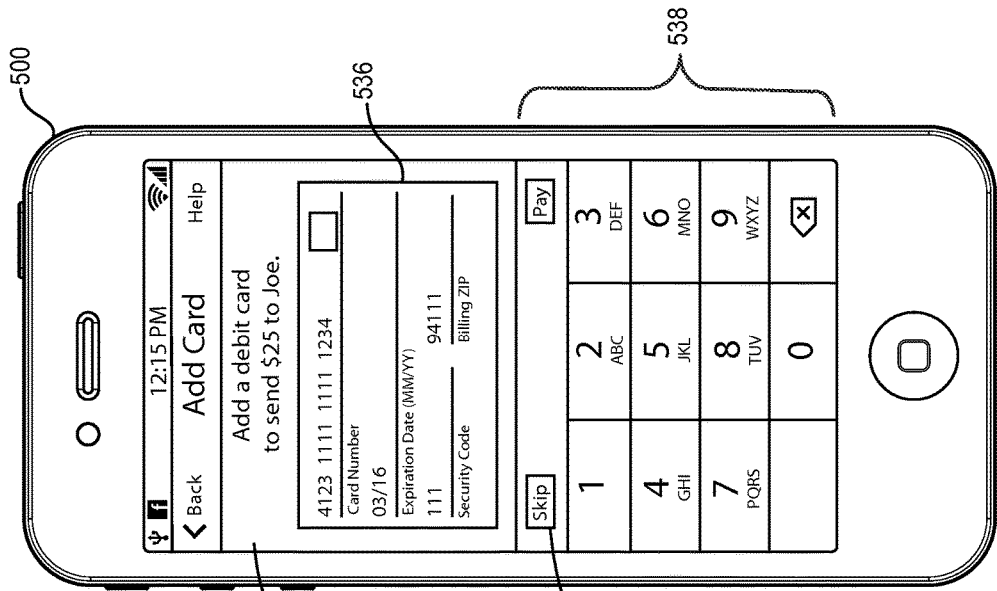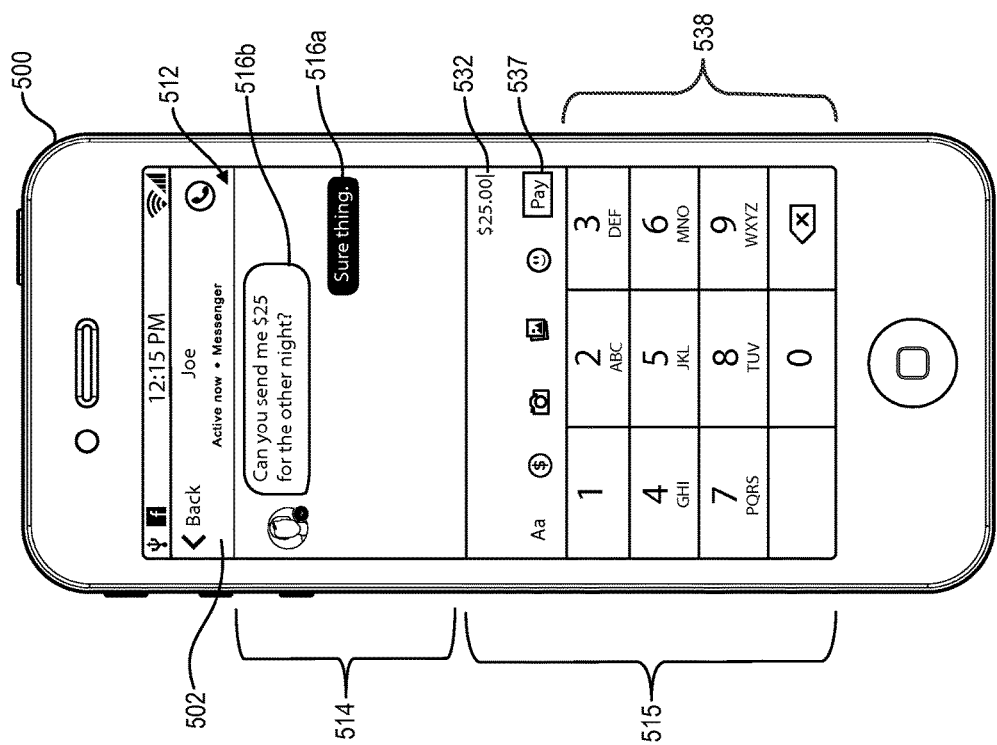
Fig. 5D
Fig. 5C

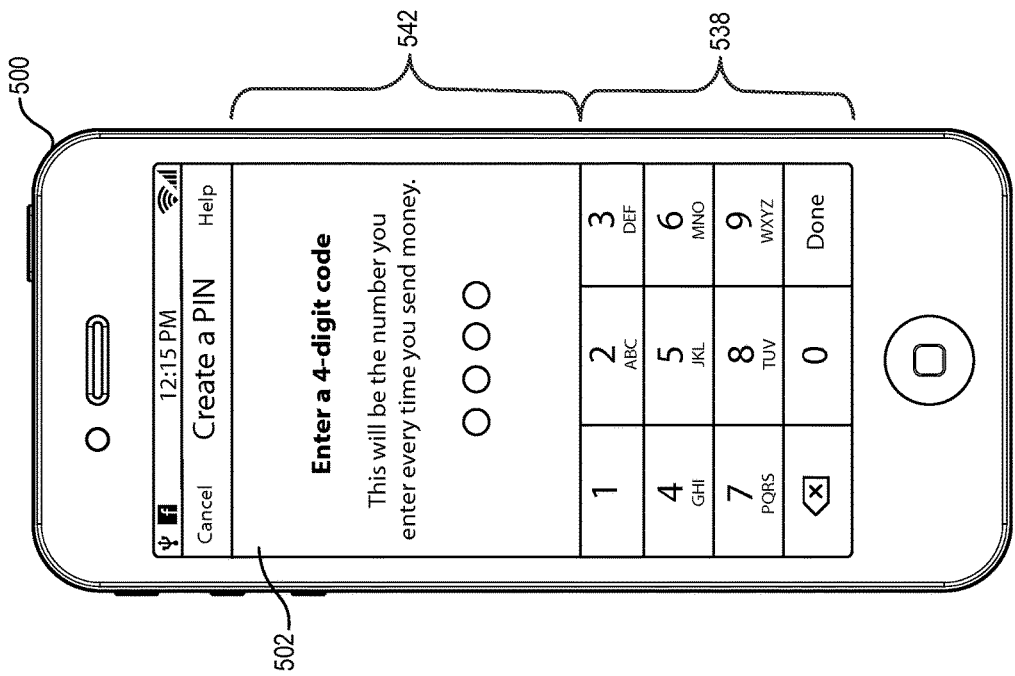
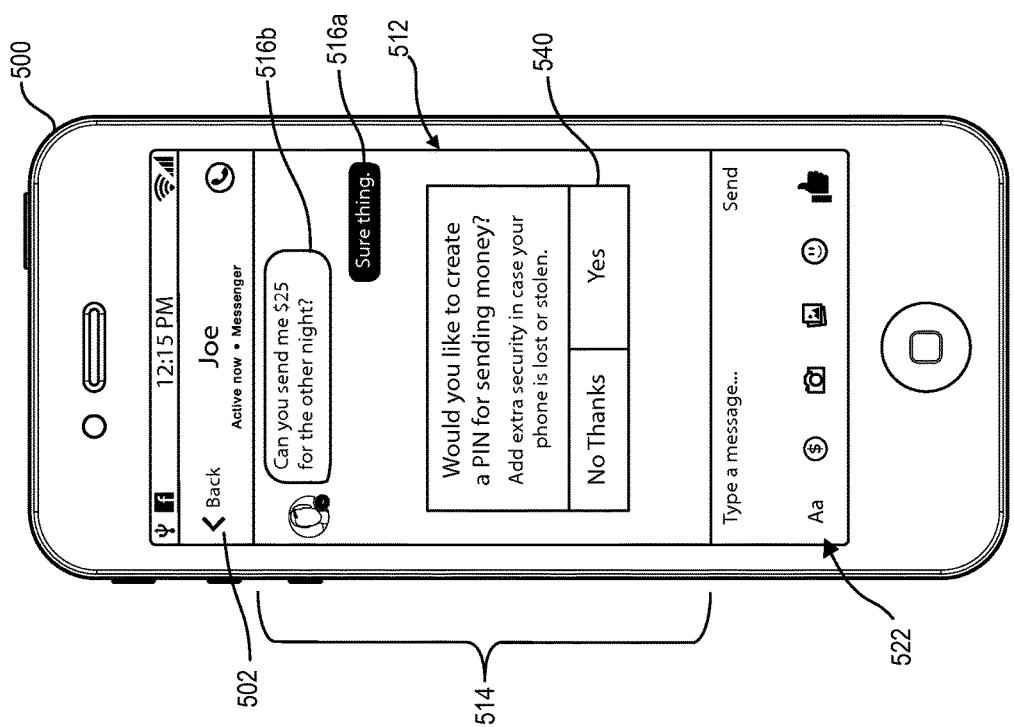
Fig. 5F
Fig. 5E

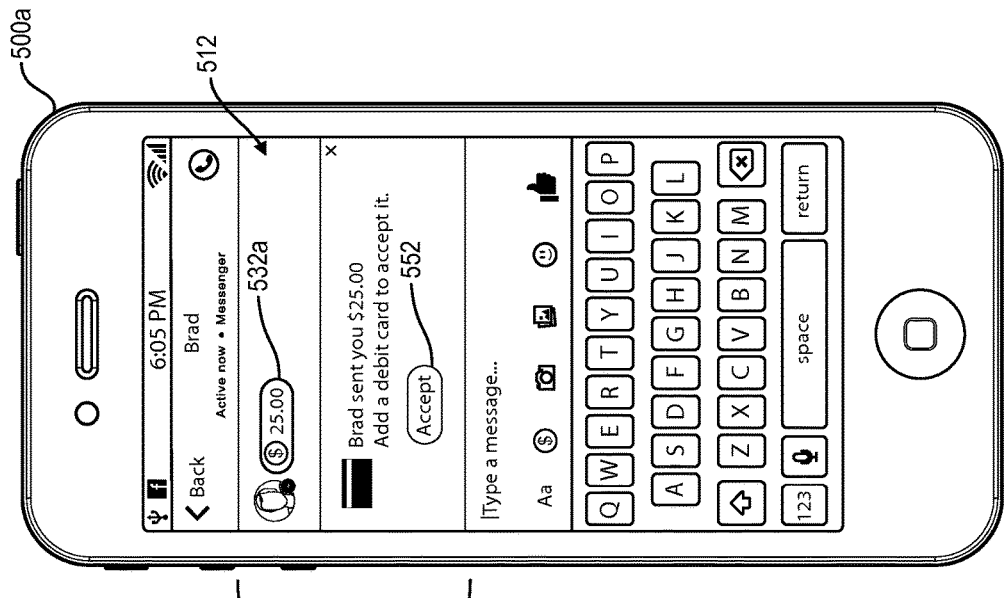
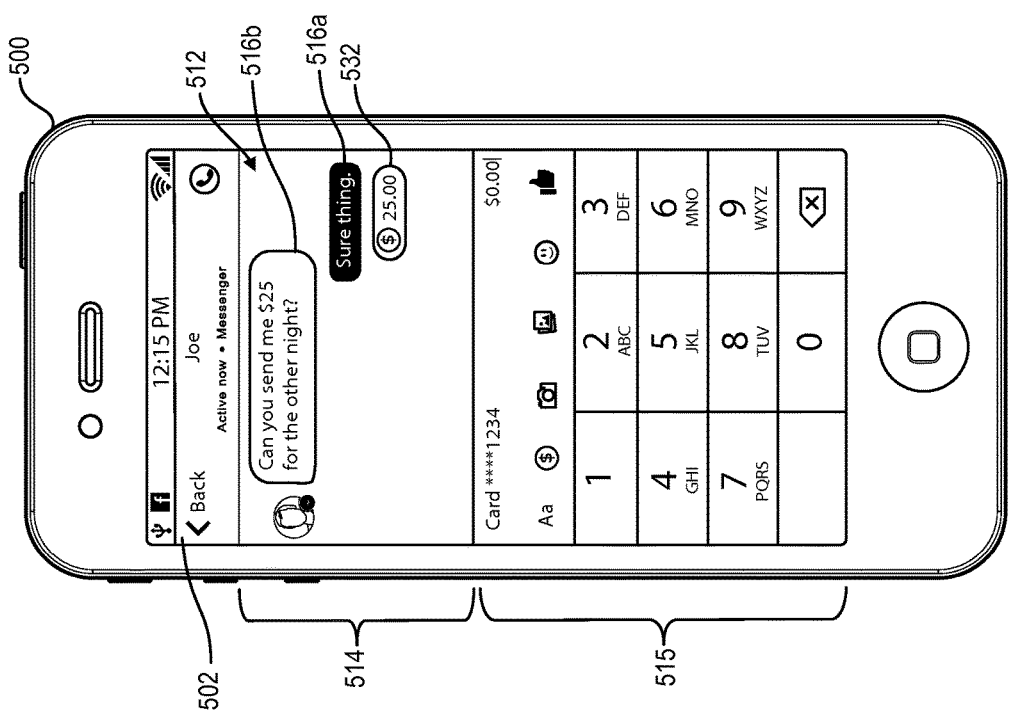

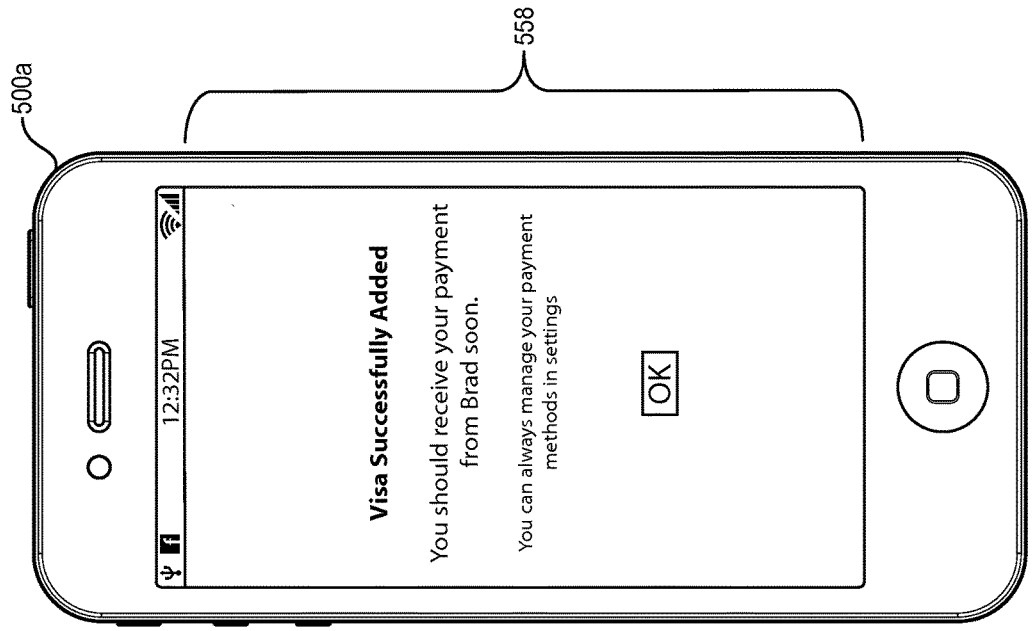
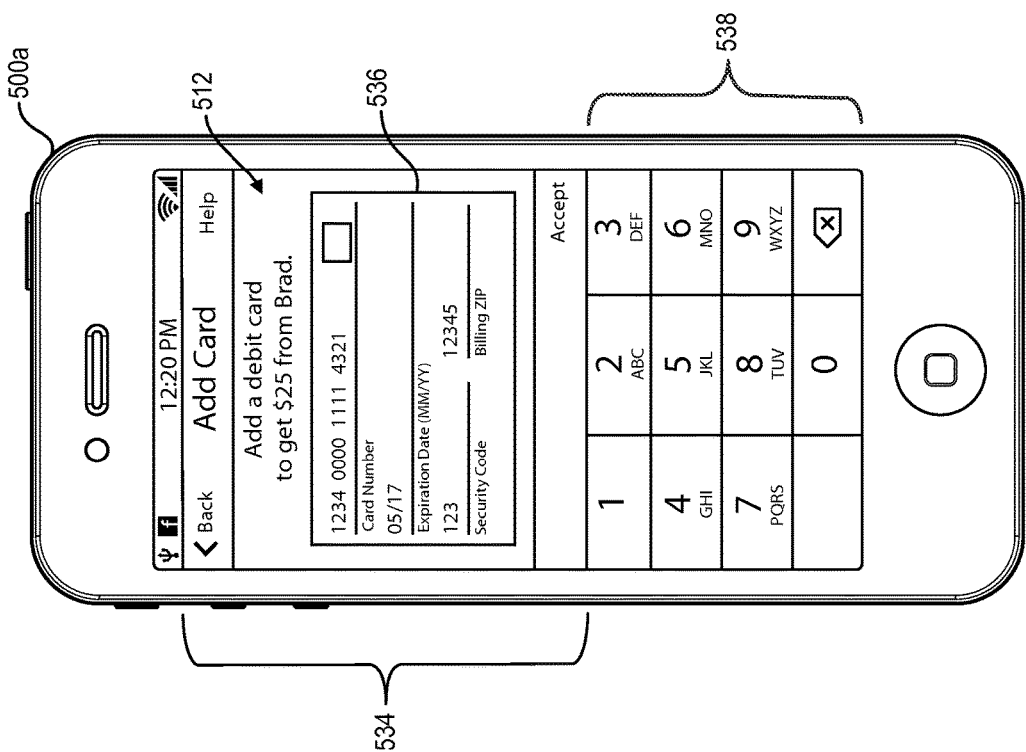
Fig. 5I
Fig. 5J

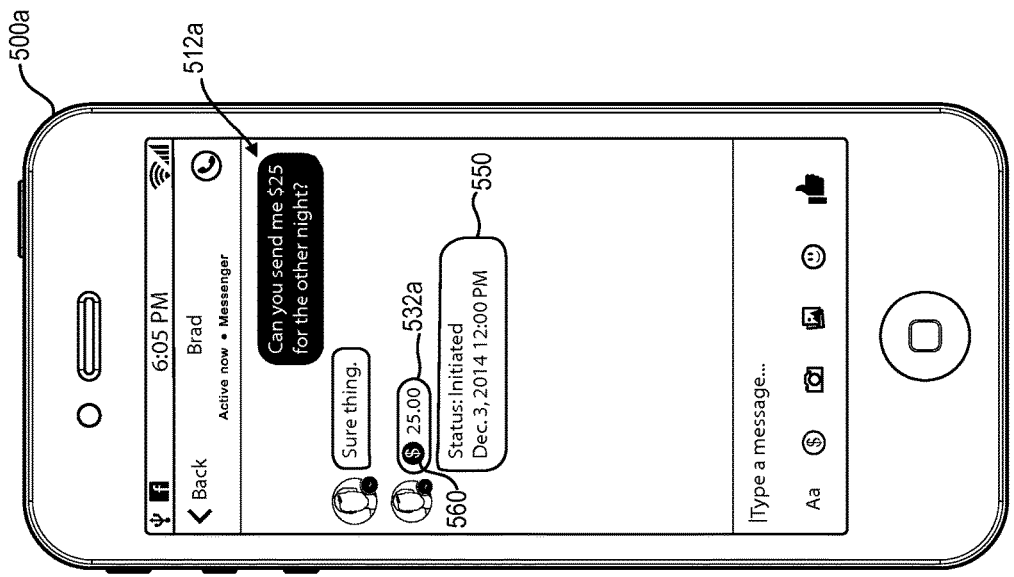
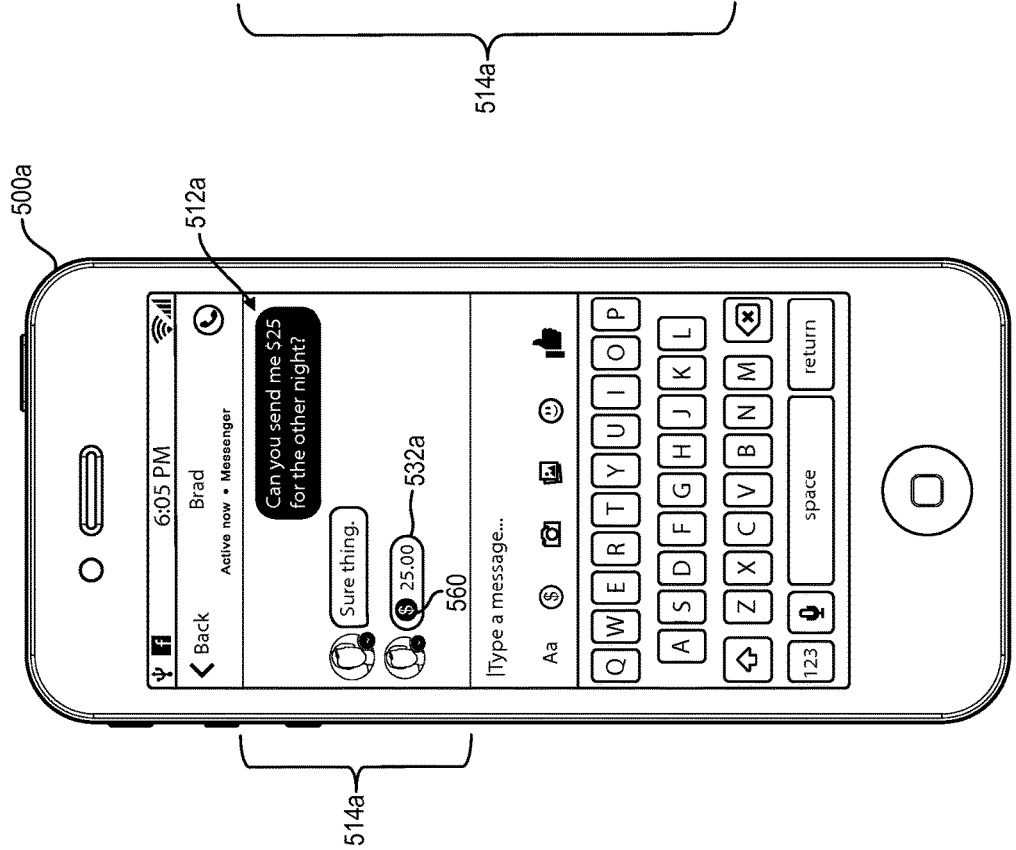
Fig. 5L
Fig. 5K

FACILITATING SENDING, RECEIVING, AND UPDATING OF PAYMENTS USING MESSAGE AND PAYMENT QUEUES

BACKGROUND

1. Technical Field

One or more embodiments described herein relate generally to systems and methods for exchanging payment requests. More specifically, one or more embodiments relate to systems and methods of improving electronic payments.

2. Background and Relevant Art

Electronic payment systems allow users to perform payment transactions with others via software applications on one or more types of devices (e.g., desktop devices and mobile devices). Some electronic payment systems allow users to perform payment transactions with financial institutions or merchants (i.e., peer-to-business payment transactions). Other electronic payment systems allow users to perform payment transactions with other users of the electronic payment systems (i.e., peer-to-peer payment transactions).

In theory, conventional electronic payment systems provide a convenient method for transferring money between users. Conventional electronic payment systems, however, have several drawbacks that often cause users frustration, confusion, and result in an unsatisfactory payment process. One such drawback of conventional electronic payment systems is that they are typically standalone systems to which both the sender and the recipient must subscribe. Due to the number and limited functionality of such systems, it is often the case that one of the sender or recipient is not a member of a particular electronic payment system. Thus, the sender, recipient, or both may have to go through a time-consuming process of setting up an account and providing sensitive financial information to use a system to send or receive a payment. Often times the users may rarely use the electronic payment system after an initial transaction.

The limited nature of conventional electronic payment systems also adds inconvenience. In particular, the standalone nature of conventional electronic payment systems typically requires that users open a separate application dedicated just to payment transactions in order to send or receive a payment while limiting the amount/type of communication between users within the separate application. The inconvenience of the standalone nature of conventional electronic payment systems can discourage users from using such systems.

Furthermore, conventional payment systems are also typically limited in the amount of information available to the users, such as payment status information. Specifically, conventional systems may provide updates to the user when a payment transaction is initiated and when the payment transaction is completed, but often do not provide any other information to the users. Thus, the users of conventional systems may not have access to all of the potentially useful information about the payment transaction.

For example, many conventional systems will send you an email indicating that you have been sent a payment. In order to confirm receipt of the payment, however, the user often must check their bank account. One will appreciate that the need to check a bank account can be time consuming and frustrating if the user needs to check the account multiple times.

Other conventional systems provide an email to indicate the payment only upon receipt of the payment. These types of systems also provide various drawbacks. For example, upon the exchange of good or services, the receiver does not know if the sender has sent the payment until it is received.

Accordingly, there are a number of disadvantages with conventional electronic payment systems and methods.

SUMMARY

One or more embodiments described herein provide benefits and/or solve one or more of the foregoing or other problems in the art with systems and methods and otherwise improve the user experience associated with electronic payments. In particular, one or more embodiments provide a payment system integrated with a messaging system that provides status updates to payment transactions between users. For example, the systems and methods can receive status updates for a payment transaction and push the status updates to both the sender and the recipient. Thus, the users can receive timely update information associated with the payment transaction.

Additionally, the systems and methods provide queues for processing messaging exchanges and payment transactions between the users. Specifically, the systems and methods can provide a message queue and a payment queue for each user for sending and receiving updates corresponding to messages and payment transactions, respectively. Queues for receiving and pushing updates associated with messages and payment transactions allows for faster storing of messages and communication between the users.

The systems and methods can allow a user to view update information for messages and payment transactions within a messaging thread of a messaging application. For example, when a user initiates a payment transaction with another user, the user can view information about the payment transaction in association with a message indicating the payment transaction within a messaging thread between the users. Thus, each user can receive and view timely updates for the payment transaction within the messaging thread, while exchanging messages.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
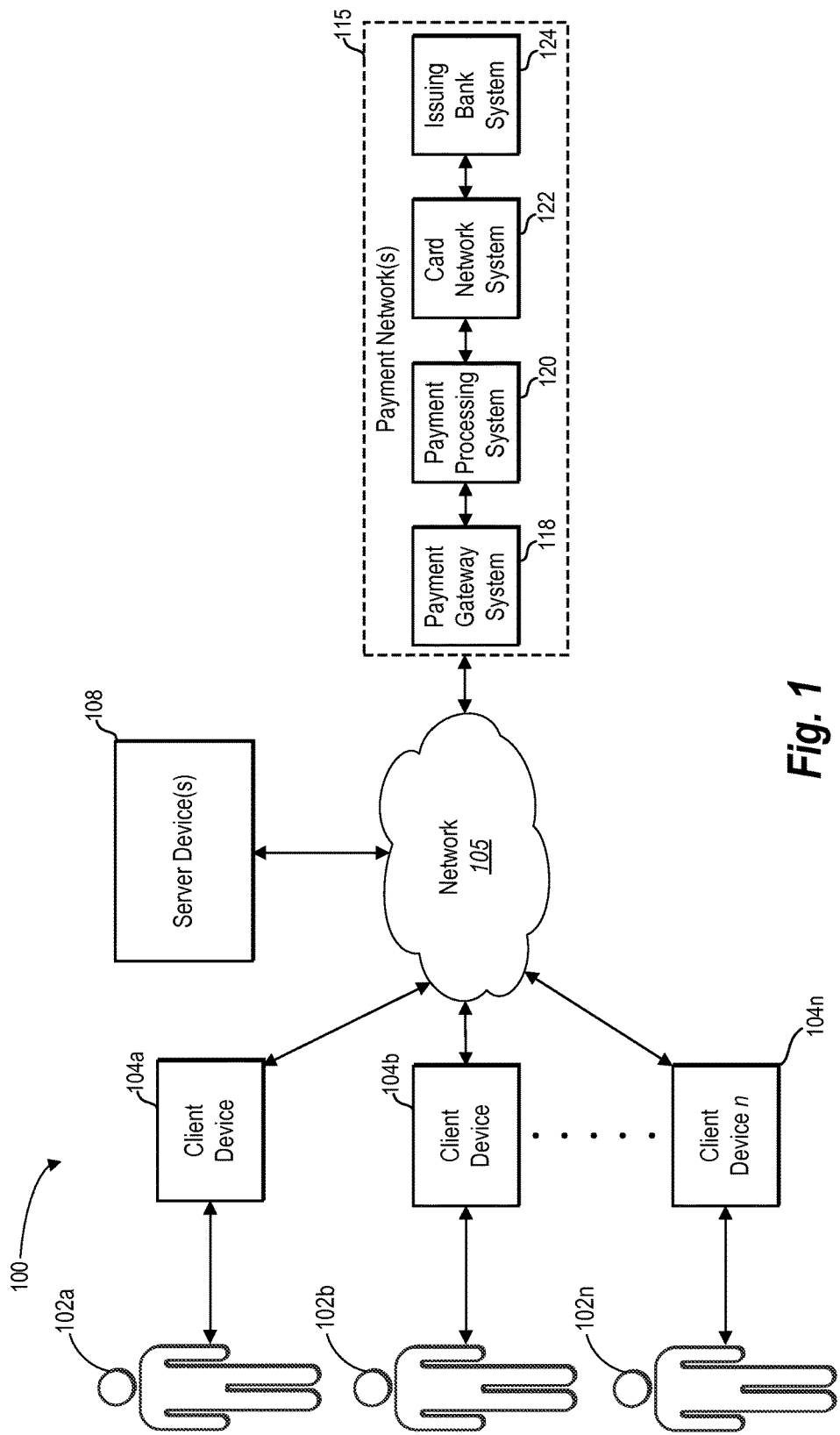
FIG. 1 illustrates a schematic diagram of an example system that facilitates the sending of messages and payments in accordance with one or more embodiments.

Embodiments of the present disclosure provide an integrated message and payment system that increases the speed and reliability of sending and receiving payments. In particular, one or more embodiments provide an integrated message and payment system that integrates an electronic payment system and an electronic messaging system. The integrated message and payment system can allow two or more users to send and receive messages as well as electronic payments. For example, the integrated message and payment system can allow a user to send a co-user(s) an electronic payment via a messaging interface that also allows for the exchange of electronic messages with the co-user(s).

By integrating an electronic payment system and a messaging system, the system can provide users with the ability to send and receive electronic payments within the flow of a conversation. Thus, the system can allow users to communicate about a payment transaction and conduct the transaction without having to open a separate application dedicated to electronic payments. The increased ease and efficiency of sending payments seamlessly during the exchange of messages provided by one or more embodiments of the system can lead to greater use of, and satisfaction with, electronic payments.

The integrated message and payment system can provide speed in the processing of payment transactions. Specifically, the integrated message and payment system can process payment transactions between users and exchange messages within the same application using different queues. For example, the system can send and receive payment transactions in a payment queue and messages indicating the payment transactions in a message queue. By providing separate queues for processing payments and messages, the system can quickly process payment transactions and messages within a messaging application by processing the payment and messaging information in parallel.

Additionally, the system may provide separate pairs of payment/message queues for each user. In particular, the system associates a separate payment queue and a separate message queue for each user to send and receive messages in association with payment transactions in a messaging application. For example, the system can process updates (e.g., payment initiation, cancellation, or modification) to payments and/or messages using the corresponding queues for a specific user so that the system can keep track of the updates and push the updates to the user's devices in a timely manner. User-specific queues for updating payments/messages at each user's device(s) can also improve the reliability of the messaging application, for instance, if the user temporarily loses connectivity to the system.

Each of the message and payment queues can store message and updates according to sequence IDs. Thus, each of the message and payment queues can include a portion of a transaction or message history ordered by sequence IDs. The message threads or payment transactions are optionally ordered by recency, so if a thread or transaction changes, the thread or transaction can be moved to the top of the respective queue by updating the sequence ID. Thus, as a change or update to a thread or transaction occurs, the queue can increase the sequence ID for the update/change. When a client device first receives a message or a payment transaction confirmation, the client device can receive the sequence ID. Then at a subsequent point in time, when the client device connects to the queue(s), the client device can provide the sequence ID. Based on the received sequence ID, the queue can know what part of the thread/transaction the client device has received. Then the queue can provide all of the changes/updates that have happened since that sequence ID. Thus, if the client device were to disconnect and then reconnect to the queue, the process can be repeated.

In one or more embodiments, the integrated message and payment system can identify related payment and messages (e.g., a message indicating a payment transaction) within a messaging thread. Specifically, the system can assign unique identifiers to both payments and messages that allow the system to map related payments and messages. By mapping related payments and messages together using the corresponding unique identifiers, the system can provide updates to payments and the corresponding messages in response to receiving update information for the payment. Thus, the system can send a message via a message queue to a recipient client device notifying the recipient that a sender has sent the recipient a payment. Upon a status of the payment changing, a payment queue can send the update to the recipient client device. The recipient client device can update the message previously received from the message queue. Thus, the system can notify a recipient of when a payment is sent with a message and then update the status of the message as the status of the payment changes.

In one or more embodiments, the system can provide push notifications or updates to a payment transaction associated with a message within a messaging thread. In particular, the system can push payment status updates to each user's client device via the corresponding payment queues. For example, when the system receives a status update for a particular payment transaction (e.g., an update indicating a successful transfer of funds), the system can push the update to each of the client devices of the sender and recipient without requiring the client devices of the sender and recipient to request the update from the system. Thus, the users can watch the payment status update in real time within the messaging thread.

As used herein, the term "message" or "messages" refers to any form of electronic communication between two or more computing devices. Messages can include text messages, photos, stickers or other icons, videos, voice recordings, music, voice mails, etc. In one or more embodiments, a message is an instant message communicated in real-time or near real-time. In alternative embodiments, however, a message can refer to any from of electronic communication, such as an SMS message, an email, or a social network post or comment.

In addition, the term "payment request" refers to a message that includes payment information that allows the system to initiate a payment transaction. For example, a payment request can include a data package that includes a payment amount, a sender, a recipient, a payment method, formatting indicating how the system processes the payment method, an offline reference, as well as additional information such as user provided text for a message.

As used herein, the term "payment transaction" refers to any type of electronic transaction exchanging currency or credits between two or more entities. For example, a payment transaction can be a financial electronic transaction between two users of the integrated message and payment system. In another example, a payment transaction can be a financial electronic transaction between a user and a financial institution or other multi-person entity. Additionally, a payment transaction can represent a monetary gift, a payment of a debt, a funding of a loan, a payment in consideration for a purchase of goods and/or services, or any other type of monetary transfer. In addition, a payment transaction can be made in one or more currencies and converted, based on an exchange rate for example, to one or more additional currencies.

As used herein, the term "account" or "payment credential" can refer to a user's debit card account, bank account, credit card account, messaging account, gift card, or any other account from which money can be deducted or to which money can be deposited. The meanings of the above terms, as well as additional terms, will become more apparent in light of the disclosure below with respect to the figures.

As used herein, the term "queue" refers to a communications medium that temporarily stores data sent to, and received from, users of a messaging application. For example, a queue can temporarily store data received from a client device and/or data to be sent to a client device. In particular, a queue can be separate from, and can communicate with, a database that stores persistent data associated with payment transactions and messages. The queue can store new message data or message update data in a sequence in which the data arrives (e.g., by sequence ID), according to corresponding identifiers for payment transactions or messages, or according to other suitable types of storage methods.

FIG. 1 is a schematic diagram illustrating an integrated messaging and payment system 100 in accordance with one or more embodiments. An overview of the system 100 is described in relation to FIG. 1. Thereafter, a more detailed description of the components and processes of the system 100 are provided in relation to the remaining figures.

As illustrated by FIG. 1, the system 100 can allow user 102a, user 102b, and up to any number of users 102n (collectively "users") to interact using a corresponding number of client devices 104a, 104b, 104n. As further illustrated in FIG. 1, the client devices can communicate with server device(s) 108 via a network 105. In addition, the system 100 can include a payment network 115 communicatively coupled with the server device(s) 108 via the network 105. Although FIG. 1 illustrates a particular arrangement of the users, the client devices, the network 105, the server device(s) 108, and the payment network 115, various additional arrangements are possible. For example, the client devices 104a, 104b, 104n may directly communicate with the server device(s) 108, bypassing network 105.

As briefly mentioned above, FIG. 1 shows that user 102a and user 102b can use client devices 104a and 104b, respectively, to communicate with one another via the server device(s) 108. For example, user 102a and user 102b can exchange electronic messages containing text, digital content (e.g., audio, images, video), location information, and other forms of data and information. For instance, the user 102a, using client device 104a, can compose a message intended for the user 102b. After composing the message, the user 102a can cause the client device 104a to send the message intended for the user 102b via the network 105 to the server device(s) 108. The server device(s) 108 can identify the user 102b as the intended recipient, and forward the message to the client device 104b associated with the user 102b.

In addition allowing the users to exchange electronic communications, the system 100 can allow the users to send and receive monetary payments to and from one another. In one or more embodiments, the system 100 allows users to define and send a payment request to another user. For instance, the system 100 can allow the user 102a to send a payment to user 102b via the server device(s) 108 and the payment network 115. Likewise, user 102b can receive notice of the payment, and accept or decline the payment. As will be explained in more detail below, the server device(s) 108 can communicate with the payment network 115 to coordinate a transaction that facilitates the payment between the users (i.e., their accounts).

While the system 100 can facilitate a payment between users 102a and 102b, the system 100 can also facilitate a payment between more than two users, such as a group of users. For example, the user 102a may send a payment to users 102b, 102n. In one or more embodiments, the user 102a can send payments to multiple users within the same payment transaction, as will be discussed in further detail below. Furthermore, in one or more embodiments, a group of users may be provided with the ability to send and/or receive payments through the system 100, either to or from other groups or individual users.

While FIG. 1 illustrates the users as people, the users may include other entities, such as business, government, or other entities. For example, the user 102a can use the system 100 to provide a payment to a business for services or products. For instance, the user 102a can communicate with a business via the system 100, and ultimately decide to make a purchase of a product or service from the business. Using the same system 100, the user 102b can then send a payment for the product or service to the business. Similarly, a business may send a payment to other businesses or vendors, whether an individual or a business entity.

Figure 8:
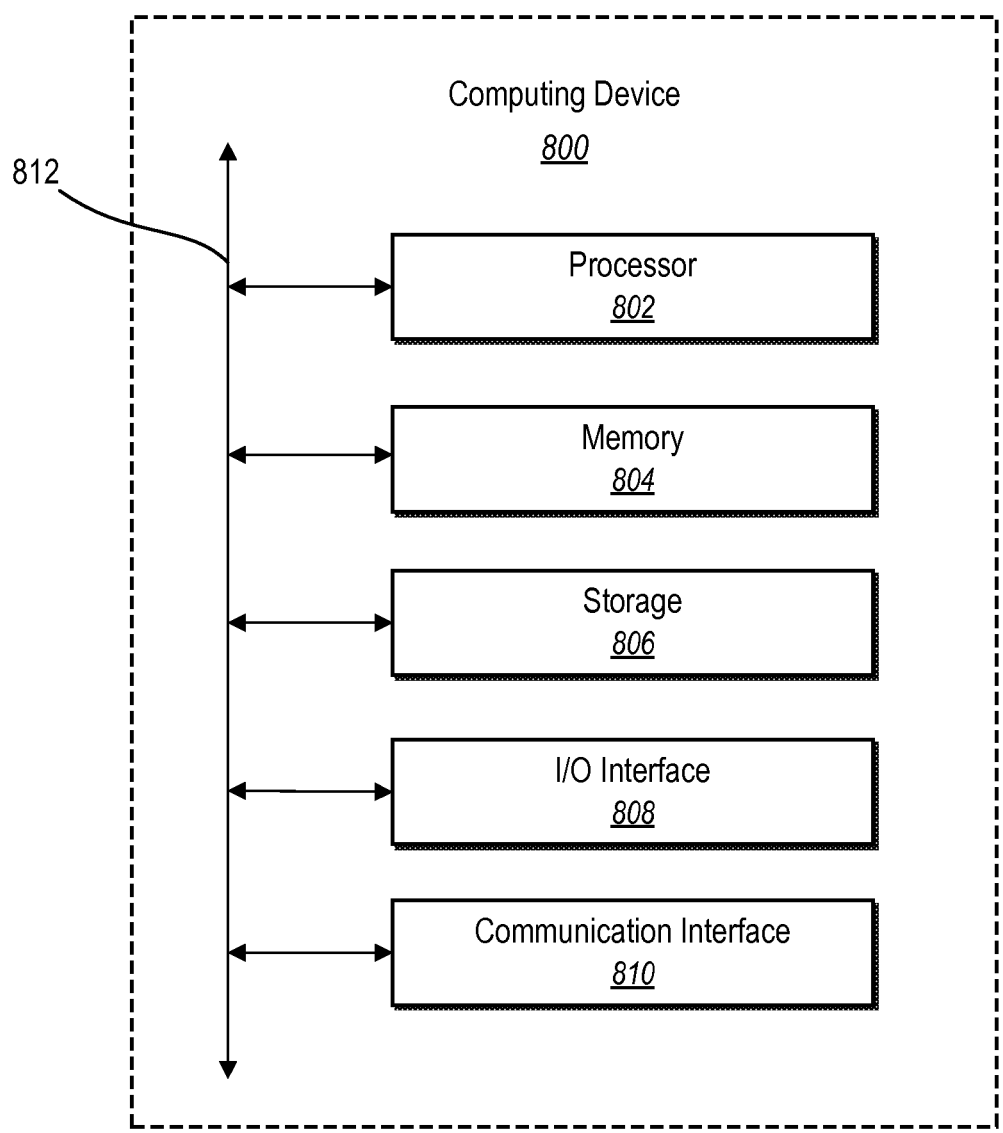
FIG. 8 illustrates a block diagram of an example computing device in accordance with one or more embodiments.

As mentioned above, and as FIG. 1 illustrates, the users 102a and 102b can interact with the client devices 104a and 104b, respectively. Examples of client devices include computing devices such as mobile devices (e.g., smartphones, tablets), laptops, desktops, or any other type of computing device. FIG. 8 and the corresponding description provide additional information regarding computing devices. Moreover, and as mentioned above, the client devices can communicate with the through the network 105. In one or more embodiments, the network 105 includes the Internet or World Wide Web. The network, however, can include one or more private and/or public networks that use various communication technologies and protocols, as further described below with reference to FIG. 8.

As briefly discussed above, the system 100 can coordinate the sending and receiving of payments between the users. For example, the user 102a can compose and send a payment request to the user 102b. For instance, the user 102a can provide input via the client device 104a to define the payment method (e.g., the sender user's 102a credit card, debit card, account balance), payment amount, payment currency, payment description, and/or various other payment details.

From the user's 102a perspective, for example, the sender user 102a can compose and send a payment request in a similar manner as sending a communication message (e.g., text). For example, in one or more embodiments, the user 102a can compose a payment request that includes a payment amount of a payment the user 102a desires to send to user 102b. After composing the payment request, the sender user 102a can then send the payment request to the user 102b via the server device(s) 108.

In one or more embodiments, the system 100 can coordinate a transaction between one or more accounts of the sender user 102a and one or more accounts of the recipient user 102b via the payment network 115. For example, in response to receiving a payment request from the sender user 102a, the server device(s) 108 can communicate transaction information to process a payment using one or more components within the payment network 115. Alternatively, or additionally, the system 100 can maintain one or more user accounts directly, and therefore, the system 100 can coordinate a transaction, or a portion of a transaction.

As illustrated in FIG. 1, the payment network 115 can include a payment gateway system 118, a payment processing system 120, a card network system 122 and an issuing bank system 124. In alternative embodiments, however, the payment network 115 can include more or fewer components depending on a particular embodiment of system 100.

In one or more embodiments, for example, the system 100 can communicate with the payment network 115 to authorize and process a transaction. For example, the system 100 can send a transaction to the payment gateway system 118, as shown in FIG. 1. Once the payment gateway system 118 receives the transaction, the payment gateway system 118 can send the transaction to the processor (e.g., payment processing system 120) used by a payment recipient user's acquiring bank. Based on the method of the payment (e.g., sender user's account), the payment processing system 120 can transmit the transaction to an appropriate card network system 122. In many instances, the card network system 122 then sends the transaction to an issuing bank system 124.

The issuing bank system 124 either approves or declines the transaction, and sends the decision back to the card network system 122. The card network 122 then sends the decision to the payment processing system 120. The payment processing system 120 can then forward the decision to the payment gateway system 118, and in one or more embodiments, the payment gateway system 118 can maintain the details related to the transaction and the decision. The payment processing system 120 also sends the decision to the system 100.

The acquiring bank can then send a funding request in satisfaction of the deposit amount to the payment processing system 120, which passes the funding request to the appropriate card network system 122. The card network system 122 then sends the funding request to the issuing bank system 124. The issuing bank system 124 can post the transaction to the sender user's account and pass a release of the funds to the card network system 122, which are then passed to the payment processing system 120, and then the acquiring bank.

According to one or more embodiments, after authorizing and/or receiving a payment in a payment transaction between the user 102a and the user 102b, the system 100 can transfer funds from the user 102a to the user 102b. Specifically, the system 100 can facilitate a transaction that deposits the funds for payment into a payment account (e.g., debit) of the user 102b. For example, the system 100 can facilitate a transfer to deposit the funds into a debit account of the user 102b (e.g., using Automated Clearing House (ACH), EFT or other debit card transfer method). The client device 104a may format the payment request according to the corresponding payment method.

Figure 2:
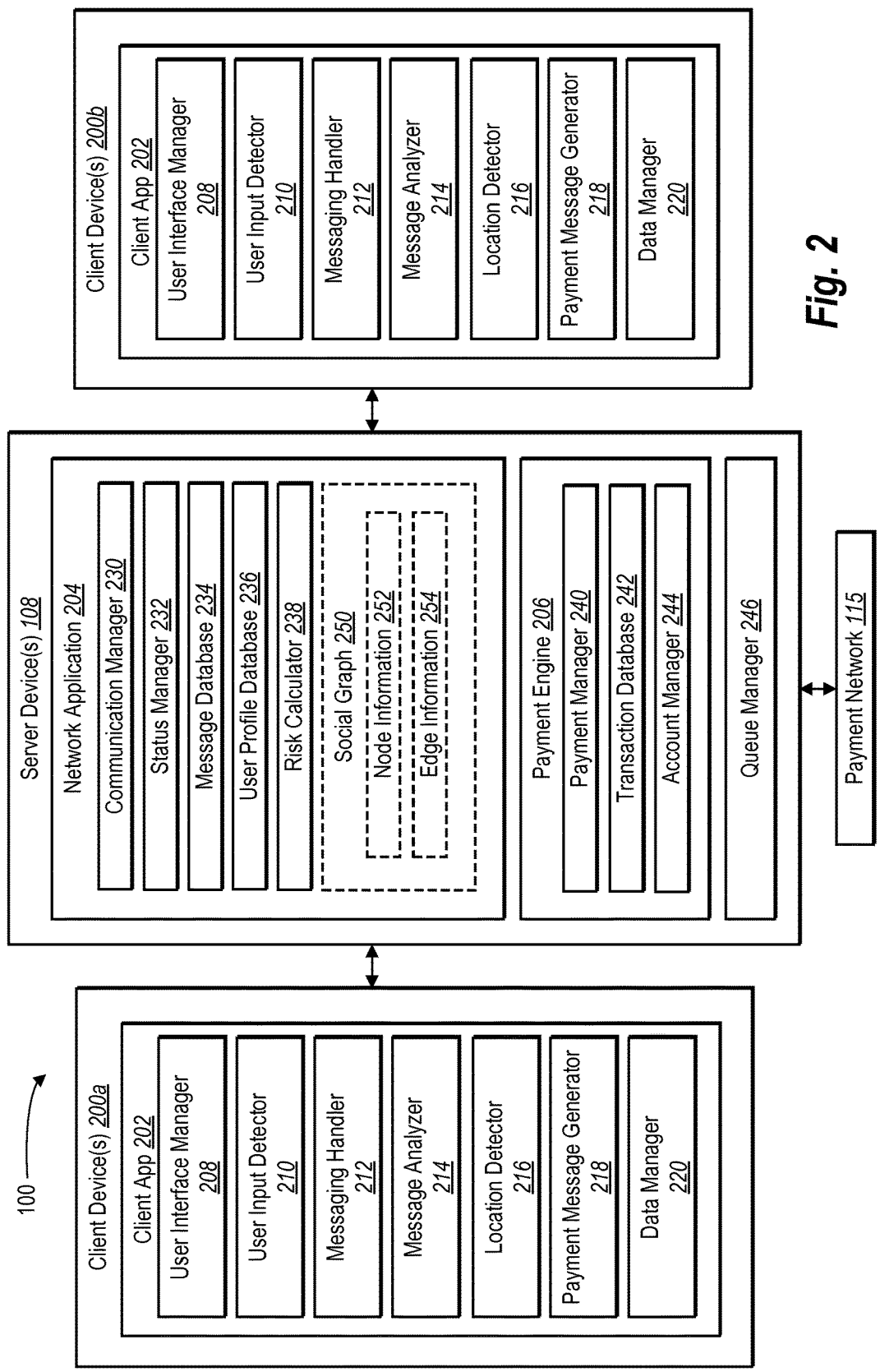
FIG. 2 illustrates a detailed schematic diagram of the system of FIG. 1 in accordance with one or more embodiments.

FIG. 2 illustrates a schematic diagram illustrating additional details of the system 100. As shown, the system 100 can include client devices 104a, 104b, server device(s) 108, and payment network 115. In general, the system 100 can allow a user of the client device 104a to send a payment to or receive a payment from a recipient of client device 104b. Additionally, the system can allow the user of the client device 104a to exchange messages with a user of the client device 104b.

As shown, the system 100 can include various components on the client devices 104a, 104b and the server device(s) 108. For example, FIG. 2 illustrates that the client devices 104a, 104b can each include a client application 202 (e.g., a messaging application) with various components and the server device(s) 108 can include a network application 204, a payment engine 206, and a queue manager 246 with various components. The components of the client applications 202, the network application 204, and the payment engine 206 can work together to allow the users to send payments, receive payments, and exchange messages as described in greater detail below.

As shown, the client application 202 can include a user interface manager 208, a user input detector 210, a messaging handler 212, a message analyzer 214, a location detector 216, a payment request generator 218, and a data manager 220. FIG. 2 illustrates that the network application 204 can include a communication manager 230, a status manager 232, a message database 234, a profile database 236, and a risk calculator 238. As described below, the network application 204 can also optionally include a social graph 250, which includes node information 252 and edge information 254. FIG. 2 also illustrates that the payment engine 206 can include a payment manager 240, a transaction database 242, and an account manager 244. Each of the components 208-220, 230-246, 252, and 254 can communicate with each other using any suitable communication technologies. It will be recognized that although components 208-220, 230-246, 252, and 254 are shown to be separate in FIG. 2, any of components 208-220, 230-246, 252, and 254 may be combined into fewer components, such as into a single facility or module, or divided into more components as may serve a particular embodiment. While FIG. 2 describes certain components as part of the client applications 202 and other components as part of the network application 204, the present disclosure is not so limited. In alternative embodiments, one or more of the components shown as part of the client application 202 can be part of the network application 204 or vice versa. Similarly, one or more components shown as part of the network application 204 can be part of the payment engine 206 or vice versa.

The components 208-220, 230-246, 252, and 254 can comprise software, hardware, or both. For example, the components 208-220, 230-246, 252, and 254 can comprise computer instructions stored on a non-transitory computer-readable storage medium and executable by at least one processor of the client devices 200a, 200b or the server device(s) 108. When executed by the at least one processor, the computer-executable instructions can cause the client device(s) 104a, 104b or the server device(s) 108 to perform the methods and processes described herein. Alternatively, the components 208-220, 230-246, 252, and 254 can comprise hardware, such as a special purpose processing device to perform a certain function or group of functions. Additionally or alternatively, the components 208-220, 230-246, 252, and 254 can comprise a combination of computer-executable instructions and hardware.

In one or more embodiments, the client application 202 can be a native application installed on one of the client devices 104a, 104b. For example, client application 202 may be a mobile application that installs and runs on a mobile device, such as a smart phone or a tablet. Alternatively, the client application 202 can be a desktop application, widget, or other form of a native computer program. Alternatively, the client application 202 may be a remote application that the client device accesses. For example, the client application 202 may be a web application that is executed within a web browser of the client device.

As mentioned above, and as shown in FIG. 2, the client application 202 can include a user interface manager 208. The user interface manager 208 can provide, manage, and/or control a graphical user interface (or simply "user interface") that allows a user to compose, view, and send messages as well as send payments. For example, the user interface manager 208 can provide a user interface that facilitates the composition of a message, such as an instant message. Likewise, the user interface manager 208 can provide a user interface that displays messages received from other users.

More specifically, the user interface manager 208 may facilitate the display of a user interface (e.g., by way of a display device associated with the client device 104a, 104b). For example, the user interface may be composed of a plurality of graphical components, objects, and/or elements that allow a user to compose, send and receive messages or payments. More particularly, the user interface manager 208 may direct the client device 104a, 104b to display a group of graphical components, objects and/or elements that enable a user to view a messaging thread.

In addition, the user interface manager 208 may direct the client device 104a, 104b to display a one or more graphical objects or elements that facilitate user input for composing and sending a message. To illustrate, the user interface manager 208 may provide a user interface that allows a user to provide user input to the client application 202. For example the user interface manager 208 can provide one or more user interfaces that allow a user to input one or more types of content into a message. As used herein, "content" refers to any data or information to be included as part of a message. For example, the term "content" will be used herein to generally describe, text, images, digital media, files, location information, payment information and any other data that can be included as part of a message.

As discussed above, one example of content that can be included in a message is a payment from a sender user to a recipient user. In one or more embodiments, the user interface manager 208 can provide a user interface to allow a user to easily and efficiently define and send a payment to one or more other users. For example, the user interface manager 208 can provide one or more input fields and/or one or more user selectable elements with which a user can interact to create and send a payment.

In addition to the forgoing, the user interface manager 208 can receive instructions or communications from one or more components of the client application 202 to display updated message information, updated status of the payment, and/or updated available actions. The user interface manager 208 can update an available option based on whether a particular option is available at a particular point within the transaction process. The user interface manager 208 can add, remove, and/or update various other selectable actions within the sender and/or receiver status messages, as will be discussed below.

The user interface manager 208 can facilitate the input of text or other data to be included in an electronic communication or message. For example, the user interface manager 208 can provide a user interface that includes a keyboard. A user can interact with the keyboard using one or more touch gestures to select text to be included in an electronic communication. For example, a user can use the keyboard to enter a message to accompany and/or describe one or more other content items in an electronic communication. In addition to text, the user interface, including the keyboard interface, can facilitate the input of various other characters, symbols, icons, or other character information.

As further illustrated in FIG. 2, the client application 202 can include a user input detector 210. In one or more embodiments, the user input detector 210 can detect, receive, and/or facilitate user input in any suitable manner. In some examples, the user input detector 210 can detect one or more user interactions with respect to the user interface. As referred to herein, a "user interaction" means a single interaction, or combination of interactions, received from a user by way of one or more input devices.

For example, user input detector 210 can detect a user interaction from a keyboard, mouse, touch pad, touchscreen, and/or any other input device. In the event the client device 104a, 104b includes a touchscreen, the user input detector 210 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 210 may additionally, or alternatively, receive data representative of a user interaction. For example, user input detector 210 may receive one or more user configurable parameters from a user, one or more user commands from the user, and/or any other suitable user input. The user input detector 210 may receive input data from one or more components of the client application 202, from the storage on the client device 104a, 104b, or from one or more remote locations (e.g., the network application 204).

The client application 202 can perform one or more functions in response to the user input detector 210 detecting user input and/or receiving other data. Generally, a user can control, navigate within, and otherwise use the client application 202 by providing one or more user inputs that the user input detector 210 can detect. For example, in response to the user input detector 210 detecting user input, one or more components of the client application 202 allow a user to select a recipient for a message, compose a message, select content to include in a message, and/or send a message to the recipient. In addition, in response to the user input detector 210 detecting user input, one or more components of the client application 202 allow a user to navigate through one or more user interfaces to review received messages, contacts, etc.

In one or more embodiments, in response to the user input detector 210 detecting one or more user inputs, the client application 202 can allow the user to create a payment to send to one or more other users. For example, a user wanting to send a payment can interact with a payment element provided on a menu within a user interface. Upon detecting the user interaction with the payment element, the user input detector 210 can cause the user interface manager 208 to provide a user interface for creating a payment. Therefore, in response to the user input detector 210 detecting one or more user inputs, the client application 202 can allow a user to create a customized payment that defines a payment to be sent to another user, as will further be described below.

As further illustrated in FIG. 2, the client application 202 can include a message handler 210 that manages messages provided to or sent from the client application 202. For example, the message handler 210 can interact with the user interface manager 208 and the user input detector 210 to coordinate the sending and receiving of messages using the client application 202. The message handler 210 may direct the sending and receiving of messages to and from the network application 204 over the course of an electronic messaging session among a plurality of participants. The message handler 210 may organize incoming and outgoing messages and direct the user interface manager 208 to display messages.

In one or more embodiments, the message handler 210 can facilitate receiving and sending data via the client application 202. In particular, message handler 210 can facilitate sending and receiving messages. For example, the message handler 210 can package content to be included in a message and format the message in any necessary form that is able to be sent through one or more communication channels and using an appropriate communication protocol, as described herein. Likewise, the message handler 210 can process messages the client device 204 receives from other users.

In addition to providing communication functions for the client application 202, the message handler 210 can provide access to message data. For example, the message handler 210 can access data that represents a list of contacts, or one or more groups of contacts, to include and recipients to a message. To illustrate, the message handler 210 can obtain and provide data representing a contact list to the user interface manager 208 to allow the user to search and browse a contact list, and ultimately select an individual contact or group of contacts to include as recipients of a message. In one or more embodiments, a social-networking system can maintain remote contact list data (e.g., a "friends list"), and the message handler 210 can access the contact list data on the social-networking system for use within the client application 202.

The message handler 210 can also provide access to other local or remote data that the client application 202 can use to compose, send and receive messages. For instance, the message handler 210 can obtain access to files, images, audio, video and other content that a user can include in a message. Moreover, the message handler 210 can provide access to one or more functions of the sender client device 204 to provide the user the ability to capture or create content to include within a message. For example, the message handler 210 can activate a camera, a microphone, or other function that allows the user to capture content to include in a message.

In addition, the message handler 210 can facilitate the sending of a payment. In particular, FIG. 2 illustrates that the client application 202 can include a payment request generator 218 that can generate a payment request that the message handler 210 can send to the network application 204 to initiate a payment process/transaction. For example, upon a sender selecting a payment element on a user interface, the payment request generator 218 can create a data package that includes payment information received from the sender. A payment request can include an indication of an amount of money to be sent as part of the payment transaction as well as any necessary information to allow the network application to perform a payment transaction. According to one or more embodiments, the message handler 210 can communicate with the network application 204 directly and/or via the queue manager 246, as described in more detail below.

In one or more embodiments, the payment request generator 218 can create a data package that includes the payment amount, one or more sender identifiers, one or more recipient identifiers, one or more payment methods or sender account information, authorization information, currency information, a message or payment description, and/or any other data that may be helpful to facilitating a payment form the sender to the recipient. Alternatively, a payment request can identify a recipient, an amount of a payment, and an offline reference that allows the client device 104a of a sender user to resolve inconsistencies in data sent and received. The payment request generator 218 can pass the payment request (e.g., the data package that includes the payment information) to the message handler 210 to send to the network application 204.

The payment request generator 218 can also obtain payment information from various sources. For example, the payment request generator 218 can obtain payment information directly from the sender via the user input detector 210. Additionally, or alternatively, the payment request generator can gain access to payment information maintained on the client device 104a, 104b by the data manager 220. For example, the client application 202 can allow a sender to input and save various payment methods and/or identify a default payment method, default currency, and otherwise specify other user preferences related to sending and/or receiving a payment.

The payment request generator 218 may also facilitate formatting of messages based on input from the user via the client application 202. Specifically, the payment request generator 218 can facilitate formatting payment requests according to the corresponding payment method. For example, the payment request generator 218 can determine that a user has input a request to pay a co-user in a debit transaction and format of the payment request to the co-user accordingly. In one or more examples, the payment request generator 218 can determine that the payment request should be formatted for same day processing based on payment information or payment credentials associated with the payment transaction or based on a specific selection by the sending user.

In one or more embodiments, the payment request generator 218 can access and provide a token within a payment request. The token can reference a payment credential stored by the network application 204. For example, the payment request generator 218 can retrieve a token to include in, or with, the payment request that verifies the sender and/or sender client device 104a as authorized to make the payment using a payment credential stored by the network application 204.

As mentioned above, the client application 202 can further include a message analyzer 214. The message analyzer 214 can analyze messages sent from and received by the client application 202 for potential events. In one or more embodiments, the message analyzer 214 can infer the events from the electronic messages exchanged between users based on contextual content in the exchanged messages. Specifically, the message analyzer 214 can identify certain phrases or character strings that indicate a social networking event or an opportunity for a payment. For example, the character strings can include predetermined character strings from electronic messages in a messaging thread between two or more users.

The client application 202 can further include a location detector 216. The location detector 216 can access or identify a location of the client device 104a, 104b based on GPS information from the client device 104a, 104b, cell tower triangulation, WIFI received signal strength indication, WIFI wireless fingerprinting, radio-frequency identification, near-field communication, by analyzing messages, or based on data from other sources. The location detector 216 can then provide the location of the client device 104a, 104b to the message analyzer 214 or the network application 204. Additionally, the location detector 216 can receive indications of the location of other client devices from the network application 204 and provide them to the message analyzer 214.

As discussed above, the client device 104a can include a data manager 220, as illustrated in FIG. 2. The data manager 220 can maintain message data representative of data used in connection with composing, sending, and receiving messages between a user and one or more other users. For example, message data can include message logs, contact lists, content, past communications, and other similar types of data that the client application 202 can use in connection with providing the ability for users to communicate using the client application 202.

The data manager 220 may also maintain payment data representative of information used to generate payment requests. For example, payment data may include a payment method data (i.e., a credential) and/or account data (e.g., bank or credit card account data). Furthermore, payment data can include payment preferences (e.g., a default payment method). In general, payment data can include any data that the payment request generator 218 can use in connection with generating a payment.

As briefly mentioned above, in addition to the client devices 104a, 104b, the system 100 can further include a network application 204 that is implemented in whole or in part on the server device(s) 108. In one or more embodiments of the present disclosure, the network application 204 comprises a social-networking system (such as but not limited to FACEBOOK™), but in other embodiments the network application 204 may comprise another type of application, including but not limited to an e-mail application, search engine application, banking application, or any number of other application types that utilizes user accounts.

In one or more embodiments where the network application 204 comprises a social-networking system, the network application 204 may include a social graph 250 for representing and analyzing a plurality of users and concepts. Node storage 252 of the social graph 250 can store node information comprising nodes for users, nodes for concepts, nodes for transactions, and nodes for items. Edge storage 254 of the social graph 250 can store edge information comprising relationships between nodes and/or actions occurring within the social-networking system. Further detail regarding social-networking systems, social graphs, edges, and nodes is presented below with respect to FIG. 10.

The communication manager 230 can process messages received from client applications 202. For example, the communication manager 230 can interact with a message handler 206 of a client application 202. The communication manager 230 can act as a director for messages sent back and forth among users in an electronic messaging thread. The communication manager 230 may receive a message from client application 202, detect the intended recipient of the message, and send the message to the client application 202 (or device) associated with the intended recipient. One will appreciate that the communication manager 230 can direct a message for a recipient to multiple client devices associated with the recipient (i.e., each device upon which the user has installed a version of the client application 202).

Additionally, the communication manager 230 can also re-format or otherwise modify the content or format of a message based on the messaging protocol used by a destination communication device or a type. As such, in one or more embodiments the system 100 can allow participants using different communication platforms to exchange messages. For example, the communication manager 230 can receive a message in a first protocol (SMS, IM, XMPP, APNS, etc.), re-format the message into a second protocol, and send the reformatted message to the intended recipient(s).

The status manager 232 can track the status of users of the client applications 202 and/or the client devices 104a, 104b. For example the status manager 232 can identify when a user is logged into the client application 202, when a user is active on the client application 202, when a client device 104a, 104b associated with a user or user account is online or active. The status manager 232 can send indications (such as push notifications) to the client application 202 to notify the client application 202 of the status of users, device, messages, or payments. The user interface manager 208 can add, modify, or otherwise change or update status notifications based on indications received from the status manager 232. For example, the status manager 232 can send an indication to the client application 202 indicating that another user has accessed a message, received a payment, sent a payment, is active, a device or device type a co-user is active on (e.g., mobile vs. web), etc. The user interface manager 208 in turn an update a user interface to notify a user of the status.

The network application 204 may also include a message database 234. The message database 234 can maintain message data representative of content of messages from electronic messaging sessions among a plurality of participants. The message database 234 may maintain status data representative of the information mentioned above that the status manager 232 tracks. The message database 234 can thus provide an archive of messaging threads, which the network application 204 can provide to a user on demand or once a user logs into the client application 202 using a new computing device.

As mentioned previously, the server device(s) 108 can include a payment engine 206 having a payment manager 240. The payment manager 240 of FIG. 2 can integrate the sending and receiving of payment requests and initiate payment transactions, and may employ one or more application programming interfaces (APIs). For example, upon the communication manager 230 receiving a payment request, the communication manager 230 can send any payment details to the payment manager 240. The payment manager 240 can then use the payment details retrieved from the payment request to initiate a payment transaction using the payment network 115.

According to one or more embodiments, the system 100 can maintain the payment engine 206 separate from the network application 204. For example, the system 100 can implement payment processes associated with the payment engine 206 separately from at least some of the functionality of the network application 204 (e.g., using a messaging database for recovery). To illustrate, the system 100 can implement the functionality of the payment engine 206 on a first group of one or more servers and the functionality of the network application 204 on a second group of one or more servers. Implementing functionality of the payment engine 206 and the network application on separate servers can allow the system 100 to ensure that at least some of the financial information associated with the users is maintained apart from the network application 204 to comply with Payment Card Industry (PCI) standards. Alternative configurations of servers and/or software than those described herein may also allow the system 100 to comply with PCI standards.

The payment manager 240 can coordinate a transaction corresponding to a payment defined in a payment request. As generally explained above, the payment manager 240 can coordinate a transaction via the payment network 115 that corresponds to a payment request, monitor the status of the transaction, and provide status information regarding the transaction. More specifically, the payment network 115 can authorize a transaction, fund a transaction, and/or settle an individual transaction or batch of transactions as described above with reference to FIG. 1. In one or more embodiments, the payment manager 240 can use one or more application programming interfaces (API) to communicate relevant information with the payment network 115.

In additional or alternative embodiments, the client application 202 on the client device 104a can cause the client device 104a to send a payment request and/or messages associated with the payment request to the network application 204 and the payment engine 206 in parallel. In particular, when the client application 202 receives a selection by the user to pay an amount to a co-user, the client application 202 can cause the client device 104a to send a payment request to the first network application 204 and to the payment engine 206. Thus, the network application 204 can process the payment request while the payment engine 206 is also processing the payment transaction associated with the payment request. In alternative embodiments, the client device 104a can send messages to one or more servers associated with the network application 204, which can then forward the messages to the payment engine 206, or vice versa.

To complete a transaction, the payment manager 240 can access or obtain a payment credential for the recipient (such as deposit account information, debit card, credit card, gift card, electronic wallet). The payment manager 240 can obtain a recipient's payment credential (e.g., a debit card for receiving substantially instant payments) using a variety of methods. In one example embodiment, a recipient can register one or more deposit accounts or other payment credentials with the network application 204. Upon a user registering a deposit account or other payment credential, the user profile database 236 can maintain the payment credential.

After the payment manager 240 receives the payment information, the payment manager 240 can identify the recipient. The payment manager 240 can lookup the recipient in the user profile database 236 to determine if the recipient has registered a payment credential. At this point, the payment manager 240 can initiate the transaction.

In the event that the recipient's user profile does not include a payment credential, or if the recipient's user profile does not include a payment credential that supports same day payments, the payment manager 240 can direct the communication manager 230 to send the recipient a message prompting the recipient to provide a payment credential. The message may prompt the recipient to register a payment credential by providing one or more interactive fields that allows the recipient to provide payment credential details. Additionally, or alternatively, upon determining that a recipient does not have a registered payment credential, the payment manager 240 can generate a temporary deposit account. In particular, the payment manager 240 can generate an account number and associate the account number with the recipient's user profile. In one or more embodiments, the recipient may already have a temporary account, and therefore, the payment manager 240 can use the previously created temporary account to complete the transaction. In particular, the temporary account allows the payment manager 240 to proceed immediately to process a transaction without delaying the payment process from the perspective of either the sender or the recipient.

The account manager 244 can manage one or more temporary accounts in connection with the networking application. For example, upon completion of the payment, the payment manager 240 can deposit the payment amount to a temporary account. In one or more embodiments, the payment manager 240 can cause the communication manager 230 to send the recipient a message indicating that the payment manager 240 has transferred the money to the recipient's payment credential. For example, if the recipient has already registered a debit account, the payment manager 240 can transfer the money to the registered debit account in a substantially instant payment transaction. Alternatively, if the recipient does not want to register a deposit account, the message system can provide the recipient instructions to withdraw the money from the temporary account.

In addition to coordinating a transaction via the payment network 115, the payment manager 240 can also coordinate a transaction with respect to one or more system user accounts. In one or more embodiments, the network application 204 can support user cash accounts, such as gift card accounts, cash card accounts, or similar types of user accounts. The sender can specify the sender's user cash account as the method of payment, and likewise, the recipient can set the recipient's user cash account as the registered deposit account. Therefore, in at least one or more embodiments, the entire transaction, or substantially the entire transaction, can be processed within the network application 204.

In one or more embodiments, the system 100 can also allow a recipient to register a debit card account as a payment credential to receive funds. In order to send funds to a user's debit card, the payment manager 240 can send a request to credit a payment amount to a recipient's debit card account. In one or more embodiments, the request can comprise an unreferenced refund request. An unreferenced refund request is a refund request that is not attached to a previous funding transaction with the user's debit card account. Processing unreferenced refunds requests result in applying a credit in the amount of the refund request to a recipients debit card account. For example, in the event that a recipient has a negative balance on a debit card account, the request amount may be applied to the negative balance. Likewise, in the event that a recipient has a zero balance on a debit card account, the request amount would result in a positive debit card account balance that the recipient can spend against. Alternatively, the request may include a charge request corresponding to a particular card service that allows the system 100 to transfer money via a proprietary routing method for processing same day payments.

The payment manager 240 of FIG. 2 may perform various functions with relation to coordinating the information received from the communication manger 230 to request and accept payment requests, and to coordinate the payment process. For example, the payment manager 240 can create and store payment credentials. More specifically, a user (e.g., senders and recipients) may already have accounts with the network application, and thus already be registered users, or may still set up an account. In one embodiment, at least some of the users can also be members of a social-networking system and already have identifiers ("IDs") and user profiles associated with social-networking accounts that are also used when messaging using the system 100. Alternatively, other users may not be members of the social-networking system and can create an account to become a registered member of the system 100. In this example, the payment manager 240 can receive date from these users (via the client application 202) and create an account, and then create a unique ID and user payment profile for these users, which will be referenced later during the payment process. In some cases, the payment manager 240 may also augment user profiles of previous social-networking users to include payment profile features that may have been absent.

In setting up or augmenting the account, a user can submit one or more payment credentials, such as a credit card, a debit card, a deposit account or other bank accounts, gift card accounts, store credit accounts, etc. When adding methods of payment, the system 100 can request that users submit card and/or account numbers, expiration dates, security codes, transfer or routing identification numbers, and bank information used for money transfers. The user can also create an authorization code such as a personal identification number (PIN), or use a security code of a credit card, e.g., when providing only a single payment method, or provide some other authorization code. The user can also select a default method of payment.

The user payment profiles stored by the user profile database 236, accordingly, can include user (or group) IDs created uniquely for each registered user (whether as a social-networking user and/or as a messaging user). The user profile database 236 can provide storage for payment credentials of users of the network application 204. For example, the user can create an "account" with the network application 204, which allows a user to provide the payment information to the network application 204. The network application 204 can then save that payment information in the user profile database 236. In one or more embodiments user profile database 236 can store in relation to the user one or more of: a first name, a middle name, a last name, a payment card number (e.g., a credit card, debit card), an expiration date (year and/or month) of the payment card, a card security code of the payment card (e.g., a Card Verification Value (CVV or CVV2)), a billing address (including street name, house number, city, state or province, zip code, country, etc.) associated with the payment card, a phone number associated with the payment card, one or more shipping addresses (including similar fields as the billing address). When the payment card comprises a debit card, the profile storage module can also store a personal identification number (PIN) for the debit card. In an embodiment where the network application 204 comprises a social-networking system, the payment information stored in the user profile database 236 may be associated with a node of the node storage 252 that represents the user.

In one or more additional embodiments, the payment manager 240 can communicate with the risk calculator 238 to determine a risk associated with a sender, a recipient, and/or a particular payment transaction. Specifically, the risk calculator 238 can determine whether the sender/recipient is a fraudster based on information associated with the sender/recipient in order to prevent fraudulent payment transactions. For example, the risk calculator 238 can determine the likelihood of fraudulent activity based on activity or information associated with the sender/recipient in connection with the network application. Determining a risk associated with users involved in payment transactions can particularly be useful when processing push-to-debit transactions.

For example, in one or more embodiments, the network application 204 can determine whether a risk associated with the sender or the recipient satisfies a predetermined threshold. In particular, the network application 204 can determine whether the sender or the recipient is a fraudster (e.g., a scam account or software posing as a real person) based on a "realness" score. For example, if the risk associated with the sender is below a predetermined threshold (i.e., a high risk level), the network application 204 can determine that the sender is likely a fraudster and notify the payment engine 206 that the sender is a fraudster. If the sender has a high-risk level, the payment engine 206 can stop a payment transaction between the sender and the recipient. Similarly, if the risk associated with the recipient is below a predetermined threshold, the network application 204 can determine that the recipient is likely a fraudster and notify the payment engine 206 that the recipient is a fraudster.

To illustrate, the network application 204 can determine a realness score for a user based on whether the user has been tagged has been tagged in media posted to the social networking system by one or more co-users, whether co-users of the user recognized the user's previous one or more birthdays (i.e., wished the user a "happy birthday"), the number or volume of messages exchanged between the user and co-users of the user via the network application 204, whether co-users of the user have indicated agreement or solidarity (i.e., "liked") with posts made by the user, and/or whether co-users of the user have commented on posts made by the user. Additionally or alternatively, the network application 204 can determine whether the user has been a member of a social networking system for a predetermined amount of time, lives in a pre-approved origination location, has a predetermined level of social network activity with a destination location, has a threshold realness score, etc. In another example, the network application 204 can determine a risk for a user based on the relationship between the user and a co-user, including whether the user and the co-user are friends on a social networking system, are within a number of degrees of separation, etc. Additionally, the network application 204 can use information about the payment transaction to determine whether the payment transaction is fraudulent or erroneous, such as based on the payment amount (e.g., the payment amount includes an unrealistic amount).

In additional embodiments, after determining a risk associated with the sender and/or recipient, the network application 204 can perform one or more actions in association with the risk. Specifically, the network application 204 can perform an action that allows the network application 204 to verify the identity of the user. For example, the network application 204 can request information from the user that indicates the user is who the user purports to be. To illustrate, the network application 204 can request a password entry, a number of digits of a registered payment credential for the user, a personal security question, an upload of a visual identification (e.g., a photo), or other identification mechanism based on the risk level or realness score of the user.

In additional or alternative embodiments, the network application 204 can automatically perform one or more actions with respect to the payment request or a payment transaction in response to determining a risk level of the user. Specifically, the network application 204 can perform an action that affects the payment request or a corresponding payment transaction between the sender and the recipient without requesting additional information from the user. For example, the network application 204 can allow the payment transaction, hold the payment transaction pending for review (e.g., by a bank of the user's payment credential), block the payment transaction, disable the user's account, or process the transaction without using an intermediate account (e.g., directly from the sender's account to the recipient's account).

In any event, upon receipt of a payment request from a sender, the payment manager 240 can detect the user (or group) ID of the sender and retrieve the payment profile for that user (or entity). The payment manager 240 can then generate a transaction package (e.g., a "payment drone") that includes a transaction ID associated with a payment amount, the sender, and the recipient. The transaction ID can help the system 100 track money from the sender's account, within the system in a temporary or intermediate account, and to the recipient's account. In some instances, the system 100 can provide users access to the transaction ID to follow the movement of money during a corresponding payment transaction.

The transaction package can also include a default payment method, and related information, unless the sender selected to send a payment to the recipient with an alternative payment method, in which case the transaction package can include payment information for the alternative payment method. The payment manager 240 may then send the transaction package to the payment network 115 to initiate the payment authorization process.

The payment manager 240 can perform various other additional steps and methods in order to effectively manage the payment process. In one or more embodiments, for example, upon receiving a payment request the payment manager 240 can generate a transaction identifier (or simply "transaction ID") and associate the transaction identifier with the payment request and/or the payment information within the payment request. For instance, upon generating a transaction ID, the payment manager 240 can send the transaction ID and the payment information to the transaction database 242. The transaction database 242 can include a data table or similar data matrix that stores transaction information according to transaction ID.

The transaction database 242 of FIG. 2 can provide storage for each transaction (such as in the form of a graph object), attempted or completed, the transaction ID, a date, an amount of the transaction, the payment method used, associated messages interchanged between sender and recipient related to the transaction, and any other information gathered on the transaction. With this information, the payment manager 240 can provide, upon request, a summary of one or more transactions to users as a history of payments requested, payments declined and payments completed.

In one or more embodiments, after a transaction ID is associated with a particular payment request, the transaction ID can be included or embedded within substantially all communications within the system 100 relating to the particular payment. As such, the transaction ID allows the payment manager 240 to manage and process a large number of payments in an organized fashion. For example, the payment manager 240 can include instructions to include the transaction ID in any information sent to the client devices 104a, 104b. In return, the messaging handlers 210 can also include the transaction ID in any information sent from the client devices 104a, 104b to allow the payment manager 240 to efficiently and reliably identify a particular transaction to which the information corresponds.

In one or more embodiments, the transaction ID can be associated with one or more sender identifiers, recipient identifiers, thread identifiers (e.g., identifying a messaging thread between the sender and the recipient), payment amounts, payment methods (e.g., sender accounts), deposit methods (e.g., recipient accounts), transaction history, current transaction status, as well as other transaction information. In one or more embodiments, the transaction database 242 maintains the transaction information in the form of one or more graph objects that are updated with any updates or actions with respect to a transaction.

Also, as previously mentioned, the account manager 244 of the payment engine 206 can maintain one or more intermediate or temporary accounts. The temporary accounts can function as a type of "hot account" that provides funding for a deposit to be made into a recipient account prior to the settlement or actual funding of the payment from the sender's account. For instance, with some payment methods, the funding of the payment may take several hours or even days for money to be debited from the sender's account. However, a payment authorization request can verify and reserve funds to satisfy a payment. Thus, upon receiving a successful response from a payment authorization request, the payment manager 240 can fund the payment amount from a temporary account to provide a shorter time for the payment to arrive in the recipient's account. Once the payment funds from the sender's account, the temporary account is renewed for the amount of the payment.

As previously mentioned, the server device(s) 108 can include a queue manager 246 that manages queues for the users 102a, 102b, 102n. Specifically, the queue manager 246 can manage a payment queue and a message queue for each of the users 102a, 102b, 102n to facilitate communications between the users 102a, 102b, 102n and with the network application 204 and the payment engine 206. The queue manager 246 can comprise the logic or set of instructions and/or hardware that controls how the queues, described below, receive and handle messages and updates. In particular, queue manager 246 may be operative to determine an incoming sequence number for a queue. The incoming sequence number can be determined by incrementing a highest current sequence number for the queue. The queue manager 246 can assign the incoming sequence number to the incoming update. The queue manager 246 can add the incoming update to the queue. Furthermore, the queue manager 246 can determine a current sequence number for a current update state of a client device associated with the incoming update. Then the queue manager 246 can determine that the incoming recipient sequence number is greater than the current sequence number for the current update state of the client device. In response, the queue manager 246 can update the current sequence number for the current update state of the client device to be at least the incoming recipient sequence number. The queue manager 246 can transmit the incoming update to the client device based on the determination that the incoming sequence number is greater than the current sequence number at the client device.

The queue manager 246 can further be operative to add incoming updates to queue and determine messaging endpoint(s) to receive the incoming updates. The queue manager 246 can retrieve one or more messaging endpoint parameters associated with the messaging endpoint and generate a customized incoming update from the incoming update according to the one or more messaging endpoint parameters. The queue manager 246 can transmit the customized incoming update to the recipient messaging. The parameters can comprise a current sequence ID of the client devices, a language, and preferences set by the user of the client device.

Whether the network application 204, payment engine 206, or queue manager 246 receives data from a client device first can depend on the type of data. The client devices 102a, 102b, 102n may communicate directly with the network application 204 or the payment engine 206 for some types of data, but may first communicate with the queue manager 246 for other types of data. The queue manager 246 allows the system 100 to process different types of data in different ways to allow the users 102a, 102b, 102n to view the most up-to-date information at their respective devices more quickly. The queue manager 246 can comprise payment queues and message queues. FIGS. 3A-3F and FIG. 4, as described below illustrate the operation of the queue manager 246 in more detail.

As discussed, the systems and components discussed above with reference to FIGS. 1-2 can allow users of a messaging system to easily, effectively, and securely send and receive payments via an integrated messaging and payment system 100. FIGS. 3A-3F illustrate example process diagrams of one or more example embodiments of processes implemented by system 100 discussed above. Consistent with system 100 illustrated in FIGS. 1 and 2, FIGS. 3A-3F illustrate (according to a sequence flow of operations) a sender client device(s) 300a with a client application 202, a recipient client device(s) 300b with a client application 202, server device(s) 108 that supports a network application 204 and a payment engine 206, a payment network 115, a sender payment queue 302, a sender message queue 304, a recipient payment queue 306, and a recipient message queue 308.

In one or more embodiments, a process for a user sending a payment to another user via the system 100 can begin with a sender user (or simply "sender") associated with the sender client device(s) 300a providing user input to the client application 202 to generate a request to conduct a payment transaction. For example, the sender can access one or more user interfaces (e.g., contacts UI 504 of FIG. 5A) that allow the sender to select or otherwise define on or more recipient users (or simply "recipient"). The sender can then select an option (e.g., payment control 524b) to send money to the recipient. The sender can then select a payment amount. The user can then optionally add a payment credential, select a previously added payment credential, or use a default payment credential. As described below in relation to FIG. 5G, the sender client device 300a can populate a messaging thread between the sender and the recipient with the payment amount.

In response to request for the payment transaction, the sender client device(s) 300a can send a payment initiation request 312 to the payment engine 206. Specifically, the payment initiation request can request the payment engine 206 to initiate a payment transaction between the sender and the recipient. The sender client device 300a can provide a graphical element indicating a status of the payment (i.e., that the payment initiation request as been sent from the sender client device(s) 300a) next to the payment amount in the messaging thread.

Figure 3A:
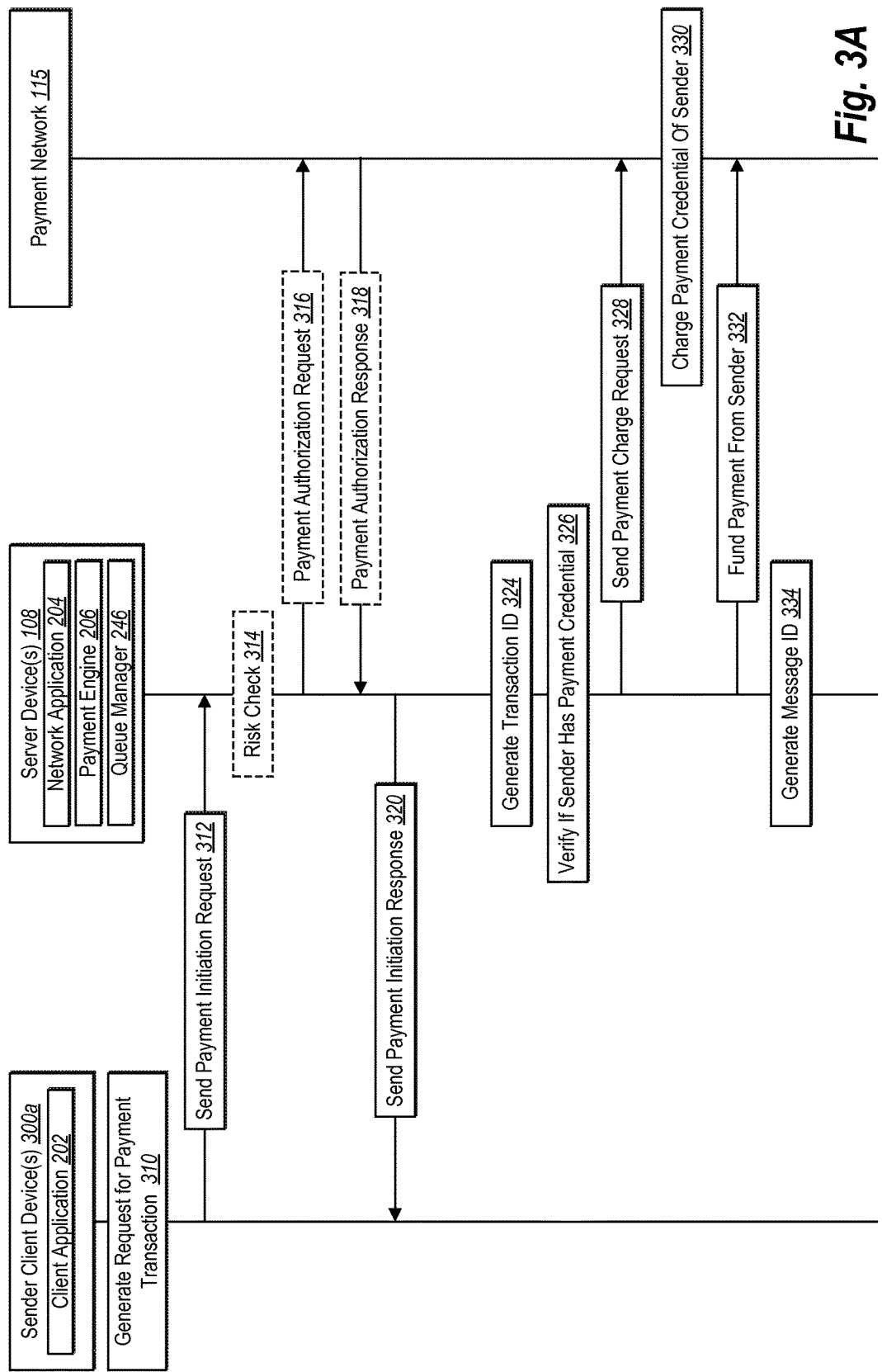
FIGS. 3A-3F illustrate a sequence-flow diagram illustrating interactions as part of a payment process between users in accordance with one or more embodiments.

Upon receiving the payment initiation request, the server device(s) 108 can optionally perform a risk check 314 to determine a risk of the sender and/or the recipient. For example, the network application 204 can use information associated with the sender, the recipient, and/or a relationship between the sender and the recipient to determine whether the payment engine 206 processes a payment transaction for preventing fraud. Specifically, the network application 204 can determine a risk associated with the sender and notify the payment engine 206 of the risk to allow the payment engine 206 to determine whether to process payment transactions between the sender and the recipient. Although FIG. 3A illustrates the risk check at a particular point during the processing of a payment transaction, the risk check may occur at any time or at multiple times during the payment transaction before transferring the money to the recipient's account, such as while money is in an intermediate or temporary account. In another example, the server device(s) 108 can perform a risk check to determine whether to provide a payment option to the sender, or whether to provide a payment option to the sender in association with a potential recipient.

The payment engine 206 can also optionally authorize the payment credential of the sender with the payment network 115. Specifically, the payment engine 206 can send 316 a payment authorization request against the sender's payment credential (e.g., debit card of the sender) for the amount of the payment or another amount (e.g., $0.01 or $100.00) to the payment network 115, which can approve or deny payment authorization. The payment network 115 can then send the payment credential authorization response 318 to the payment engine 206. One will appreciate that the optional authorization request can take place earlier or later in the timeline. In alternative implementations, the payment engine 206 can send an authorization request against the payment credential of the sender for the amount of the payment as part of the payment transaction.

The payment engine 206 can optionally send a payment initiation response 320 to the sender client device(s) 300a to notify the sender client device(s) 300a that the payment credential authorization or the risk check failed. If the sender fails the risk check 314 or the payment authorization fails, the payment indication response 320 can indicate to the client device 300a that the transaction cannot be initiated.

In one or more embodiments, the payment engine 206 can communicate at least some of the information from the payment initiation request to the network application 204.

Additionally or alternatively, the network application 204 can obtain information from the sender client device(s) 300a in connection with the payment initiation request. For example, the network application 204 can obtain information about the sender client device(s) 300a during a risk check in connection with a user account of the sender.

Prior to or upon authenticating the payment credential of the sender, the payment engine 206 can generate a transaction ID 324. As described above, the payment engine 206 can associate a unique transaction ID 324 to each payment request received. The payment engine 206 and the network application 204 can communicate to use the transaction ID within various files, objects, messages, and other information to allow the network application 204 to efficiently identify and process messages, status updates, and other information with respect to each payment made via the network application 204. For example, and as described above, the payment engine 206 can associate the transaction ID 324 with a graph object that maintains information that corresponds to processing a payment request.

Additionally, the payment engine 206 can optionally verify whether the sender has a payment credential 326 registered with the payment engine 206. In one or more instances, if the payment engine 206 has not previously authorized the payment transaction (e.g., by receiving a positive authorization response from the payment network 115), the payment engine 206 can determine whether the sender has any registered payment credentials associated with the sender's user account. The payment engine 206 can also verify whether any registered payment credentials are valid. If the sender does not have any payment credentials registered, the payment engine 206 can notify the sender client device(s) 300a to prompt the sender to input a valid payment credential.

In one or more embodiments, the payment engine 206 can send a payment charge request 328 to the payment network 115 that requests the payment amount be charged 322 to the sender's payment credential. In response to the payment charge request, the payment network 115 can charge 330 the payment credential of the sender, and fund the payment 332 from the sender by electronically transferring money from the sender's account to the payment engine 206 (e.g., a temporary account).

Figure 3B:
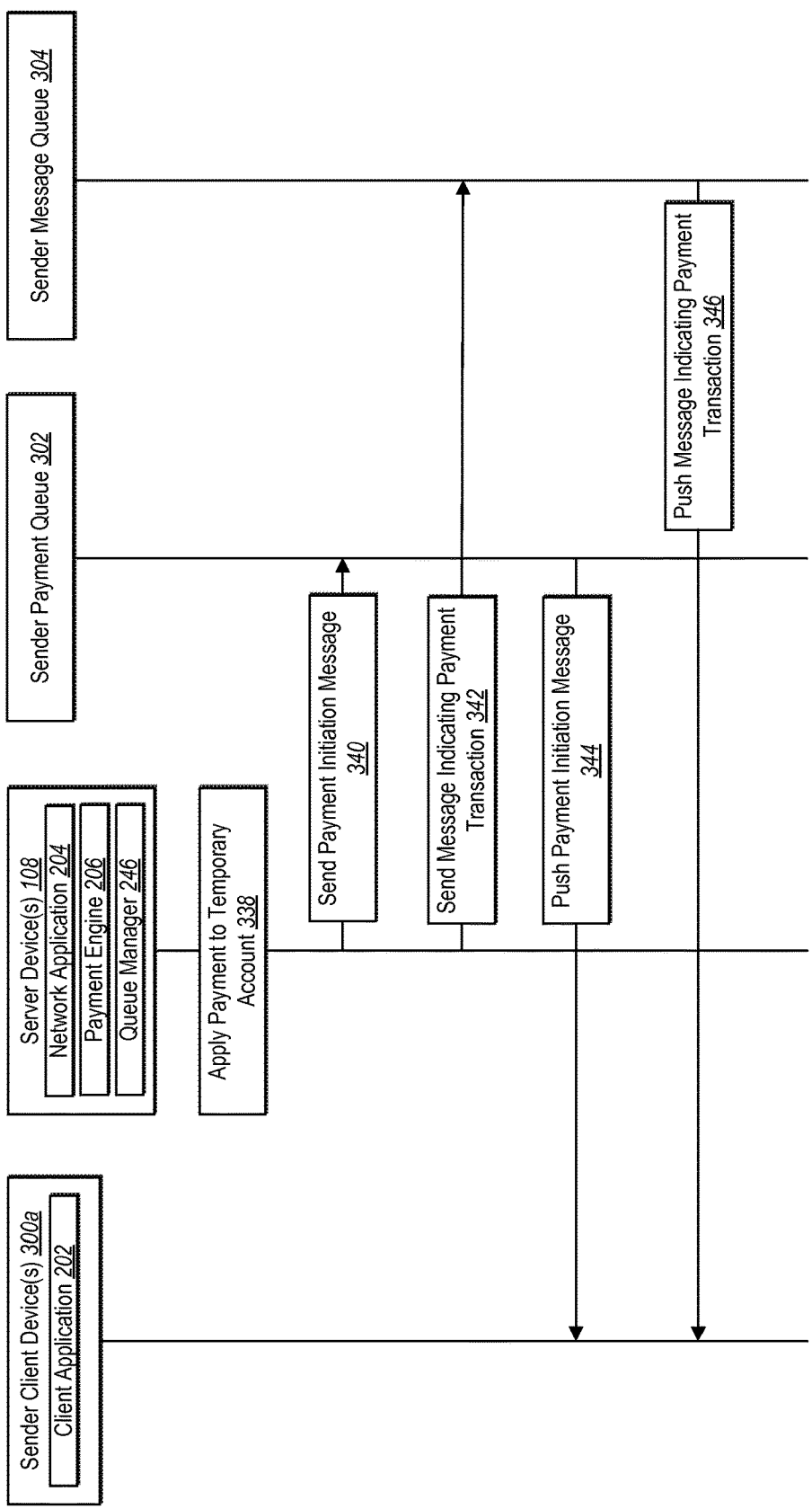

As shown in FIG. 3B, the payment engine 206 can apply the payment to a temporary account 338 after, before, or at the same time as the network application 204 generates the message ID. For example, the payment engine 206 can apply the payment to an intermediate account that the payment engine 206 uses to transfer funds to a payment credential of a recipient. In one or more embodiments, the payment engine 206 can create a new account to which to apply the payment. Alternatively, the payment engine 206 can apply the payment to a master temporary account that includes various other payments organized and identified by the unique transaction ID associated with each payment.

After successfully funding the payment request, the payment engine 206 can determine that the charge was successful and that the payment transaction is a valid transaction. In particular, the payment engine 206 can notify the network application 204 to generate a message ID 334 in connection with one or more messages indicating the payment transaction to the sender and/or the recipient within a messaging thread. In various implementations, the network application 204 can generate the message ID to send to the client devices 302a, 302b for the payment transaction in association within the messaging thread between the sender and the recipient. According to one or more embodiments, identifiers can allow the client devices 302a, 302b to properly display the message regarding the payment, as well as to send and receive status updates and update information for the message.

At this point the payment engine 206 can generate a payment initiation message. For example, the payment initiation message can include, but is not limited to, an offline threading ID, a thread key, the transaction ID, a timestamp, and the sender of the payment transaction. The offline threading ID can allow the client devices 302a, 302b to resolve inconsistencies within the messaging thread and in connection with the payment transaction (e.g., in case of a connection loss while processing the transaction). To illustrate, if the sender sends a message, loses a connection with the server device(s) 108, and then reconnects to the server device(s) 108, the offline threading ID allows the client device 302a to determine that the message sent and processed successfully, rather than marking the message as failed. The thread key can identify the messaging thread, as well as the number and identities of participants in the messaging thread for determining how many participants are associated with a payment transaction. The transaction ID identifies the payment transaction, as previously described. The timestamp can indicate the time associated with an initiation of the payment transaction or other timing information for the message indicating the payment transaction.

As mentioned, the thread key can identify whether multiple participants are involved in a group thread or group payment transaction. If more than one user is sending money to one or more users in a payment transaction, the thread key can identify the relationships between each user and whether each user is a sender or a recipient. Additionally, the client application 202 can use the information associated with the payment transaction and the thread key to determine how many people are involved and the total payment amount of the payment transaction. The client application 202 can present the payment amount in a way that allows the participants to easily view the status and payment amount of the payment transaction within the messaging thread. For example, the client application 202 can present the total payment amount for the transaction within the messaging thread for simplicity, and can update the payment amount, if necessary based on updates to the payment transaction.

In one or more embodiments, the network application can associate the message ID with the transaction ID by mapping the message ID to the transaction ID and storing the mapped IDs in a database. By associating the message ID with the transaction ID, the server device(s) 108 can identify and associate updates to the payment transaction with a corresponding message indicating the transaction. Although FIG. 3A shows the network application 204 generating the message ID and sending the transaction ID and message ID to the sender client device(s) 300a after receiving the successful charge response, the network application 204 can generate the message ID at another time during the payment transaction process (e.g., prior to sending the charge request).

Figure 3C:
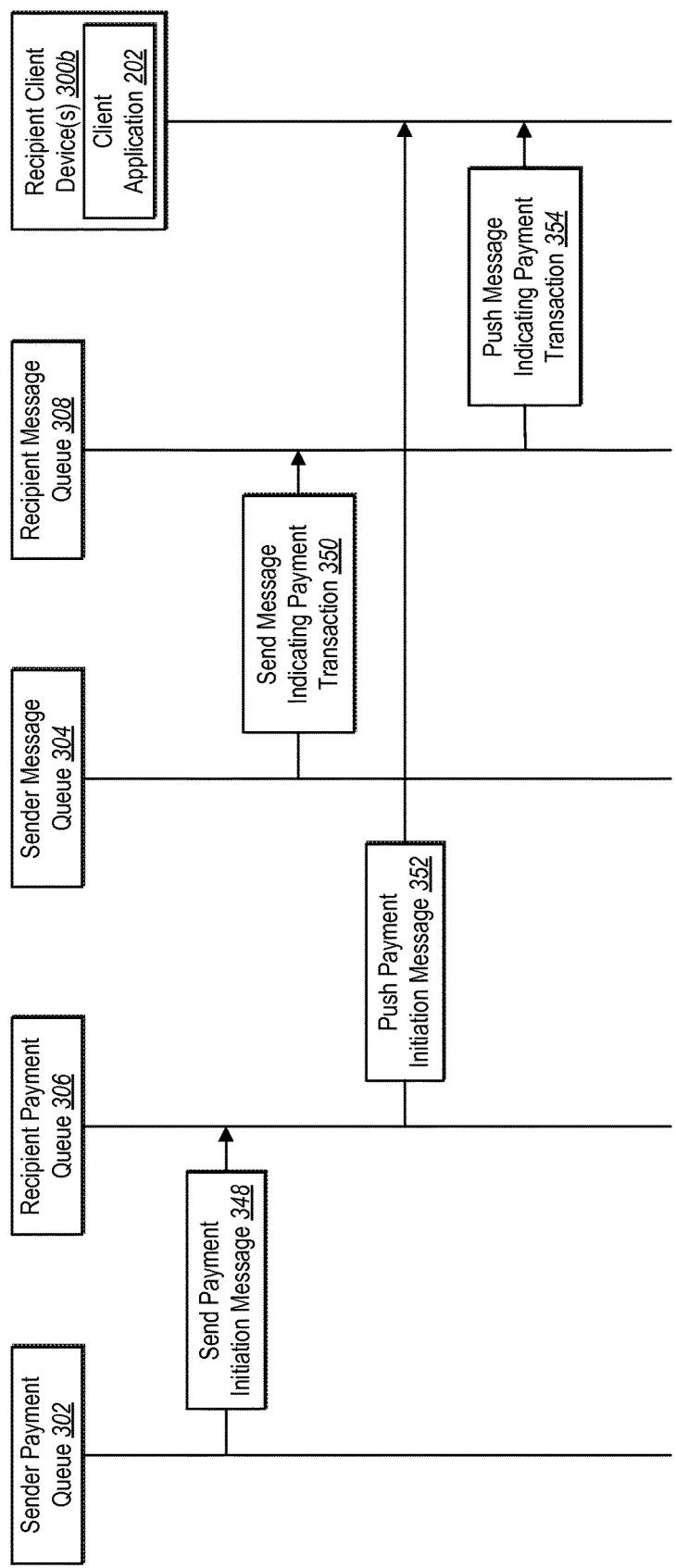

Upon generating the message ID or in response to depositing the payment in the temporary account, the payment engine 206 can send the payment initiation message 340 to the sender payment queue 302, as shown in FIG. 3C. The sender payment queue 302 temporarily stores updates for payment transactions of the sender. For example, the sender payment queue 302 temporarily stores the payment initiation message received from the payment engine 206. As mentioned above, the payment initiation message can include, but is not limited to, the transaction ID, the payment amount, the sender, the recipient(s), a status, a timestamp indicating when the payment transaction initiated, a currency of the transaction, a sequence ID for the update, and an amount offset for formatting the payment amount.

The status can comprise a field with a number (e.g., 1-10). Each number can correspond to a status of the payment transaction. Thus, a number 1 can indicate the initiation of the payment transaction (i.e., that the payment has been funded by the sender). As described below, once a status associated with the payment transaction changes, an update can be sent to the payment queue. The update can include the transaction ID and a new status number. The new status number can signify a new status or a status change. For example, the status can signify that the receipt added a payment credential to receive the payment, that the receipt accepted the payment, that the receipt rejected the payment, that payment was successfully transferred to the receipt, etc. Once the payment initiation message has been received by a client device, the payment queue can send just the changes (i.e., status updates) to the client device. The new status updates can indicate to client device the change in the status of the payment transaction.

In parallel with, or after, the payment engine 204 sends the payment initiation message, the network application 204 can send a message indicating the payment transaction 342 to the sender message queue 304, which is separate from the sender payment queue 302. Specifically, the network application 204 can generate a message indicating the payment transaction in association with the message ID, and send the message indicating the transaction to the sender message queue 304. The sender message queue 304 temporarily stores messages and updates for messages from and to the sender.

After receiving the payment initiation message from the payment engine 206, the sender payment queue 302 can push the payment initiation message 344 to the sender client device(s) 300a. The sender payment queue 302 can push the payment initiation message at any time after receiving the update from the payment engine 206 and while the sender payment queue 302 is communicating with the sender client device(s) 300a. For example, the sender payment queue 302 may detect when the sender client device(s) 300a establishes a connection with the sender payment queue 302, and push any updates to the sender client device(s) 300a received since the last time the sender client device(s) 300a was in communication with the sender payment queue 302. For example, the sender payment queue 302 can maintain the last sequence ID (i.e., the last update/change) sent to the client device, then push any changes/updates since the last update/change received by the client device to the client device. Alternatively, the client device can send the last sequence ID to the payment queue. In response, the payment queue can send the push any changes/updates since the last update/change received by the client device as indicated by the sequence ID.

The sender message queue 304 can push 346 the message indicating the payment transaction to the sender client device(s) 300a. In one or more embodiments, the sender message queue 304 only pushes the message indicating the payment transaction after the sender payment queue 302 has pushed the payment initiation message. Thus, the sender client device(s) 300a can receive the payment initiation message first and then receive the message indicating the payment transaction.

The sender payment queue 302 and the sender message queue 304 can push the payment initiation message and the message indicating the transaction, respectively, using the transaction ID and the message ID. In particular, because the sender client device(s) 300a has the transaction ID and the message ID, the sender client device(s) 300a can receive updates from the queues whenever the message or payment transaction is updated. For example, the queues can push the updates by including the transaction/message ID and the update information. In other embodiments (e.g., for the payment initiation message), the update information may include more information that describes more than one status change (e.g., timestamp information) or more complex status changes.

In alternative embodiments, the sender client device(s) 300a can generate a local copy of the message indicating the payment transaction within a messaging thread when the sender client device(s) 300a generates the payment request, rather than the server device(s) 108 generating the payment request. After charging the payment credential for the sender, the network application 204 can send a status update to the sender client device(s) 300a via the sender payment queue 302 to update the message already on the sender client device(s) 300a. For instance, the status update can include a visual cue within the messaging thread indicating that the payment charged successfully.

In one or more embodiments, after or while pushing the payment initiation message to the sender client device(s) 300a, the sender payment queue 302 can also send the payment initiation message 348 to the recipient payment queue 306. For example, the sender payment queue 302 can send the payment initiation message to the recipient payment queue 306 in parallel with pushing the update to the sender client device(s) 300a. Thus, the sender may be able to view that the payment engine 206 successfully charged the sender's payment credential before the recipient receives any information about the payment transaction. Similarly, the sender message queue 304 can send the message indicating the payment transaction 350 to the recipient message queue 308. Alternatively, the sender payment/message queue can send the payment initiation message/message indicating the payment transaction to the recipient payment/message queue after the server device(s) 108 perform one or more additional operations related to the recipient.

Once the recipient payment queue 306 has received the payment initiation message, the recipient payment queue 306 can push the payment initiation message 352 to the recipient client device(s) 300b. The recipient message queue 308 can then push the message indicating the payment transaction 354 to the recipient client device(s) 300b. Thus, the recipient client device(s) 300b receives the payment initiation message prior to receiving the message indicating the payment transaction and placing the message indicating the payment transaction within the messaging thread between the sender and the recipient.

In one or more embodiments, because the recipient client device(s) 300b has not previously received any information about the payment transaction, the server device(s) 108 can provide the transaction ID and the message ID to the recipient client device 300a. For example, the server client device(s) 108 can communicate directly with the recipient client device(s) 300b to send the transaction ID and the message ID. Thus, the recipient client device(s) 300b can then begin receiving pushed update information for the payment transaction and the corresponding message in the messaging thread by way of the recipient payment queue 306 and the recipient message queue 308. Alternatively, the server device(s) 108 can send the transaction ID and the message ID via the recipient queues with the payment initiation message.

The recipient client device(s) 300b can add the message indicating the payment transaction to a messaging thread between the recipient and the sender. The message indicating the payment transaction can include the amount of the payment transaction. In particular, the message indicating the payment transaction can include a link to the payment amount in the payment initiation message. Thus, upon an update to the payment amount from the payment initiation message send via the payment queues 302, 306, the amount in the message in the message thread can change to reflect the update.

Along similar lines, upon receiving updates from the payment queues 302, 306, the client devices 300a, 300b can update the message indicating the payment transaction in the messaging threads. For example, as described below, upon receiving a payment update from the payment engine 206 regarding the status of the payment transaction via the payment queues 302, 306, the client devices can update the message in the messaging threads.

Figure 3D:
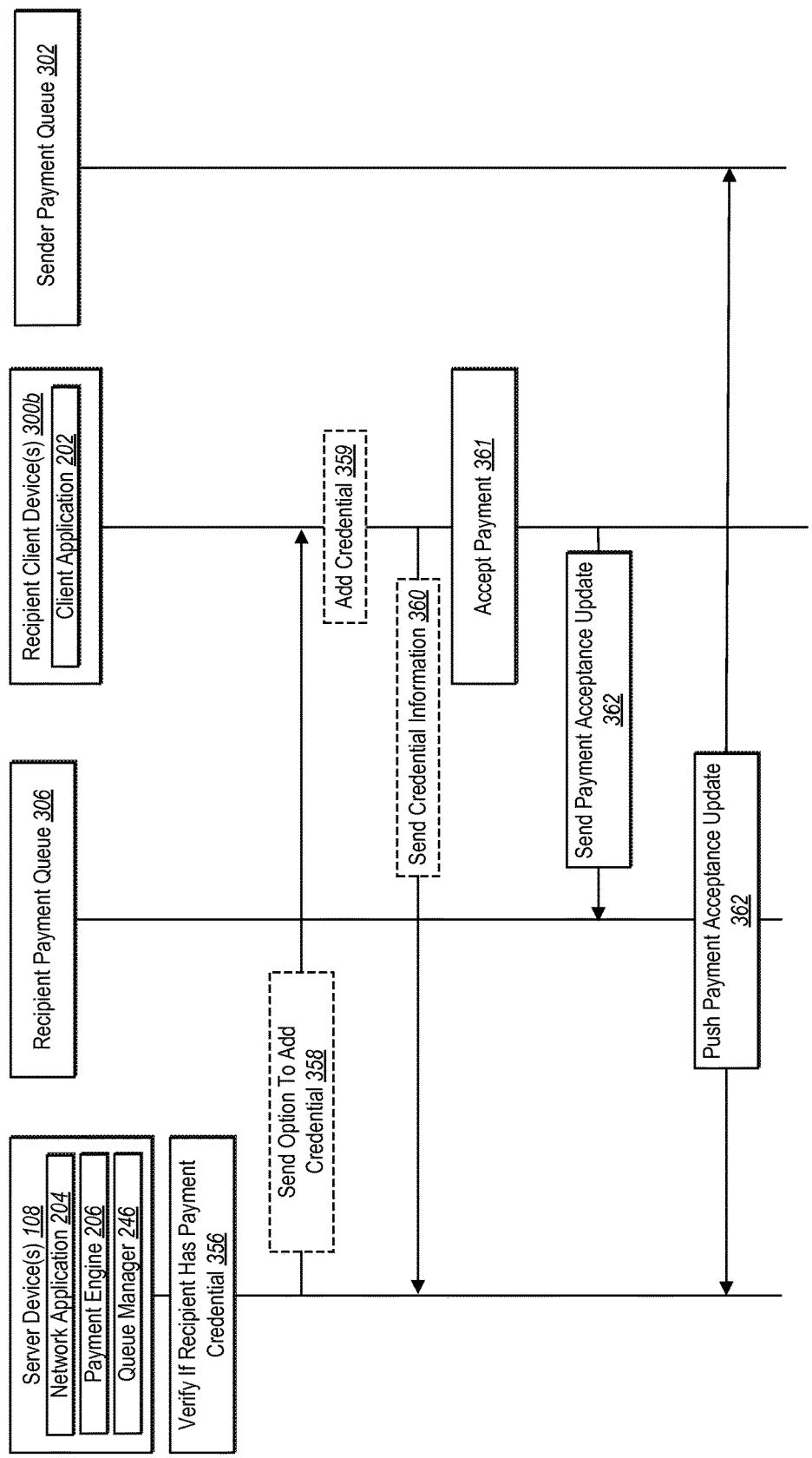

After the payment engine 206 successfully funds the payment transaction, after the recipient client device(s) 300b has received the payment initiation message and the corresponding message, or after the recipient indicates acceptance of the payment transaction, the payment engine 206 can verify 356 if the recipient has a payment credential, as illustrated by FIG. 3D. For example, as described previously, the payment engine 206 can determine whether the recipient has any payment credentials registered with the payment engine 206, and communicate with the payment network 115 to determine whether registered credentials are valid. If the recipient does not have any valid credentials, the server device(s) can optionally send an option to add a credential 359 to the recipient client device(s) 300b.

When the recipient client device(s) 300b receives the option from the recipient payment queue 306, the recipient client device(s) 300b can allow the recipient to enter payment credential information. For example, the option can be a notification that causes the client application 202 at the recipient client device(s) 300b to present a payment credential interface. The user can add 360 credentials for a deposit account (e.g., a debit card account) for depositing the funds from the payment transaction. The recipient client device can then send 360 the credential information to the payment engine 206.

At this point, or even before, the recipient can accept the payment 361. As part of the payment acceptance process, the recipient can select or add a payment credential as explained above. Upon the recipient accepting the payment, the recipient client device(s) 300b can update the message indicating the payment transaction in the messaging thread. The client recipient device(s) 300b can also generate a payment acceptance update. The payment acceptance update can comprise the transaction ID, the message ID, and an update number indicating that the payment was accepted. The client recipient device(s) 300b can send the payment acceptance update 362 to the recipient payment queue 306. The recipient payment queue 306 can update the sequence ID of the payment initiation message such that it the payment initiation message goes to the top of the queue. The recipient payment queue 306 also updates the status number of the payment initiation message. The recipient payment queue 306 can then push the payment acceptance update 362 to the sender payment queue 302 and the payment engine 206.

The sender payment queue 302 can update the sequence ID of the payment initiation message such that it the payment initiation message goes to the top of the queue. The sender payment queue 302 also updates the status number of the payment initiation message. The sender payment queue 302 then pushes the payment acceptance update to the sender client device(s) 300a. Based on the payment acceptance update, the sender client device(s) 300a can update the message indicating the payment transaction in the messaging thread of the sender's messaging application. This allows the sender to view the message indicating the payment transaction in the messaging thread and see that the recipient has accepted the payment.

As shown by FIG. 3D, the recipient payment queue 306 can push the payment acceptance update 362 to the sender payment queue 302 and the payment engine 206 simultaneously. This can allow the sender to receive the payment acceptance update as soon as the payment engine 206. One will appreciate that by not having to send the payment acceptance update first to the server device(s) where it is read to a database and then sent out, the process of the payment/messages queues can increase the speed and efficiency of messages and updates. The rest of the FIGS. illustrate the payment and messaging queues sending or pushing updates or messages in a non-simultaneous manner for ease in illustration. One will appreciate that in light of the disclosure herein that the queue can send/push the messages/update simultaneously or at different times.

Figure 3E:
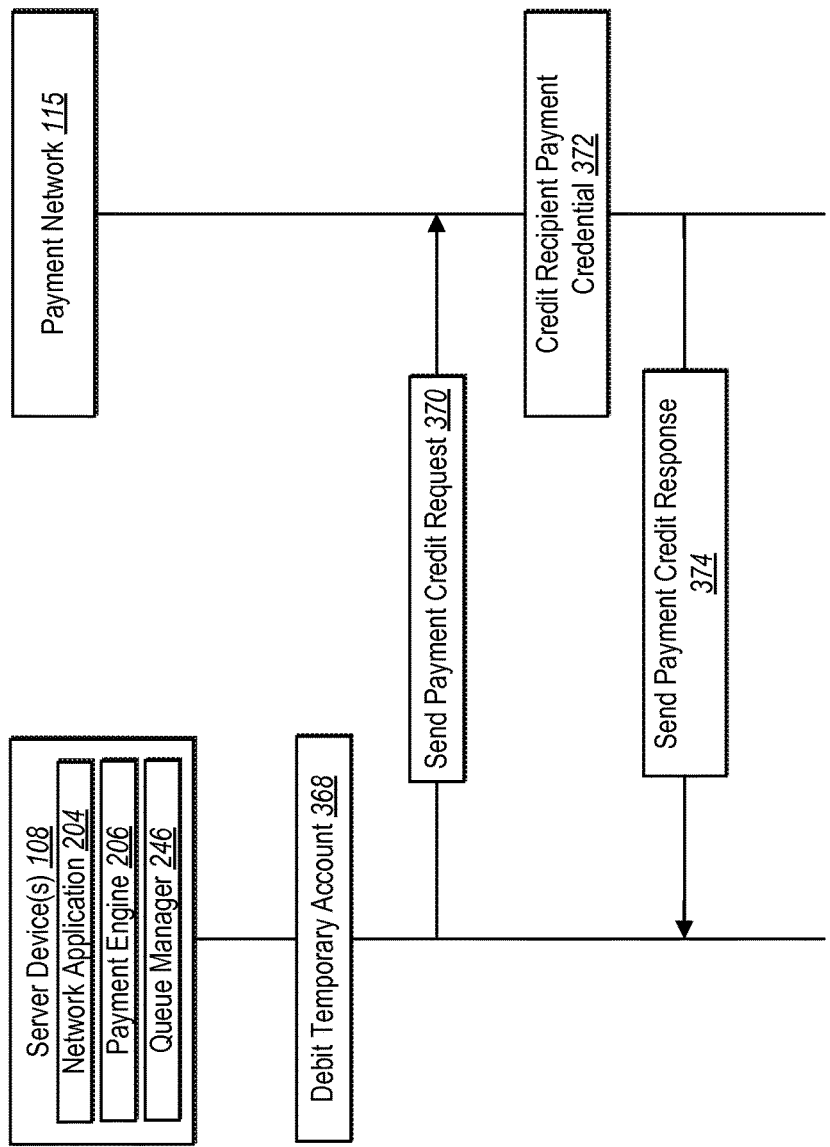

As FIG. 3E illustrates, after acceptance of the payment by the recipient, the payment engine 206 can debit 368 the funds for the payment transaction from the temporary account. The payment engine 206 sends a payment credit request 370 to the payment network 115 to deposit the funds into the recipient's payment credential. Upon receiving the payment credit request the payment network 115 can credit the recipient's payment credential 372 with the payment amount corresponding to the payment transaction. The payment network 115 sends a payment credit response 374 to the payment engine 206 indicating that the payment network 115 successfully credited the payment credential of the recipient.

Figure 3F:
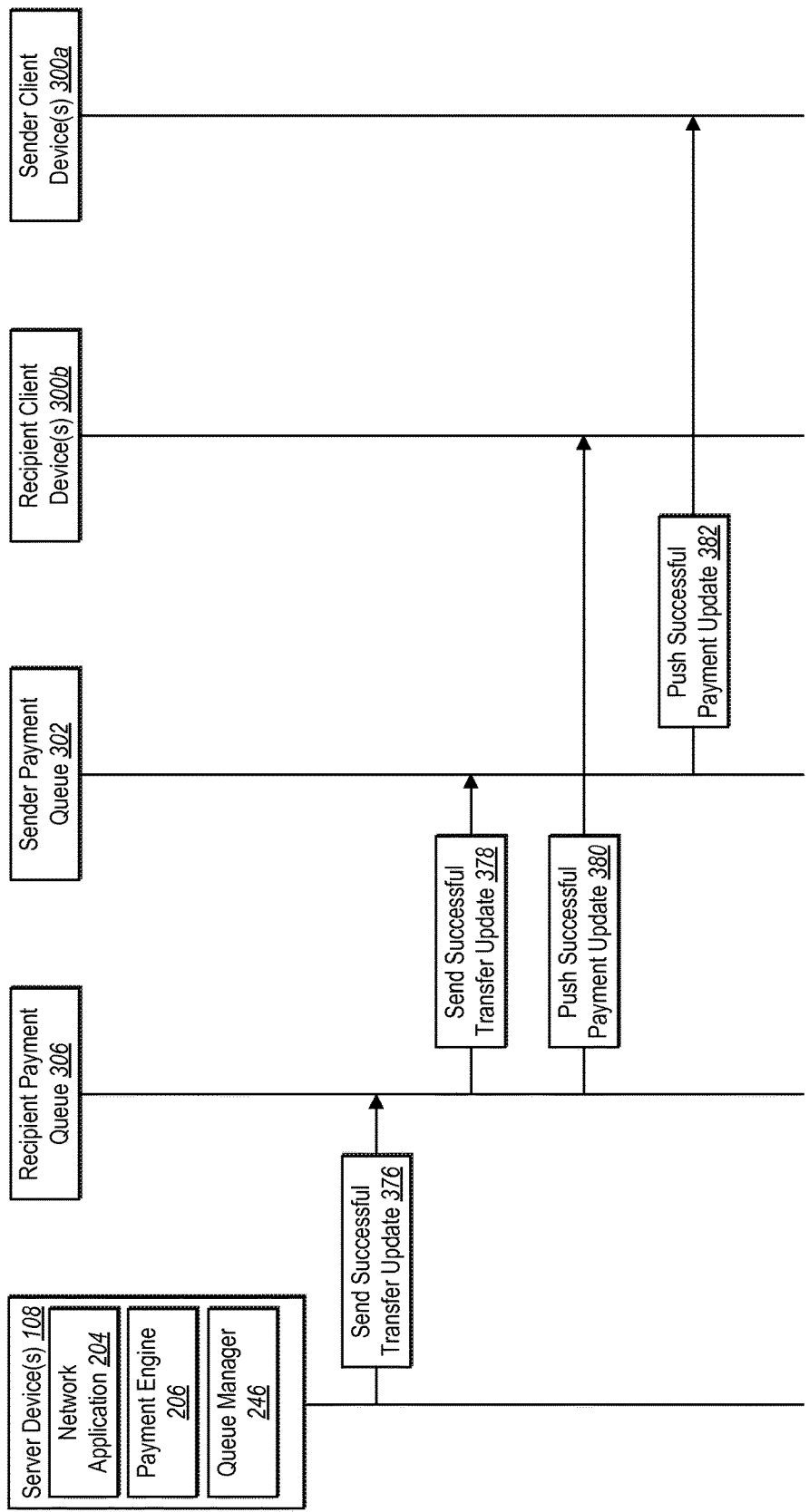

After the payment engine 206 receives the successful payment credit response from the payment network 115, the payment engine 206 can send a successful transfer update 376 to the recipient payment queue 306, shown in FIG. 3F. The successful transfer update can include the transaction ID and an updated status for the payment transaction. For example, the successful transfer update can include a new status number that indicates to the client devices that the transfer of funds to the recipient's payment credential was successful. Alternatively, if the payment transaction fails, the payment engine 206 can send a status update indicating that the transfer failed using a different status number corresponding to a failed transaction.

After the recipient queue receives the successful transfer update, the recipient payment queue 306 can send the successful transfer update 378 to the sender payment queue 302. The recipient payment queue 306 can also push the successful payment update 380 to the recipient client device(s) 300b in parallel to sending the update to the sender payment queue 302. Alternatively, the recipient payment queue 306 can push the update to the recipient client device(s) 300b prior to sending the update to the sender payment queue 302. When the sender payment queue 302 receives the successful payment update, the sender payment queue 302 can push 382 the successful payment update to the sender client device(s) 300a.

In one or more embodiments, when the client devices 302a, 302b receive status updates for the payment transaction from the corresponding payment queues, the client applications 202 can detect the updates and perform one or more actions associated with the messaging thread. For example, as described in more detail in FIGS. 5N-5O, the client application 202 can identify the updates and display a corresponding message status update within the messaging thread. To illustrate, the client application 202 can display an icon or visual indication within the messaging thread that the payment transaction has a new status. Alternatively, the payment engine 206 can communicate with the network application 204 to send updates to the client devices 302a, 302b via the corresponding message queues.

Figure 4:
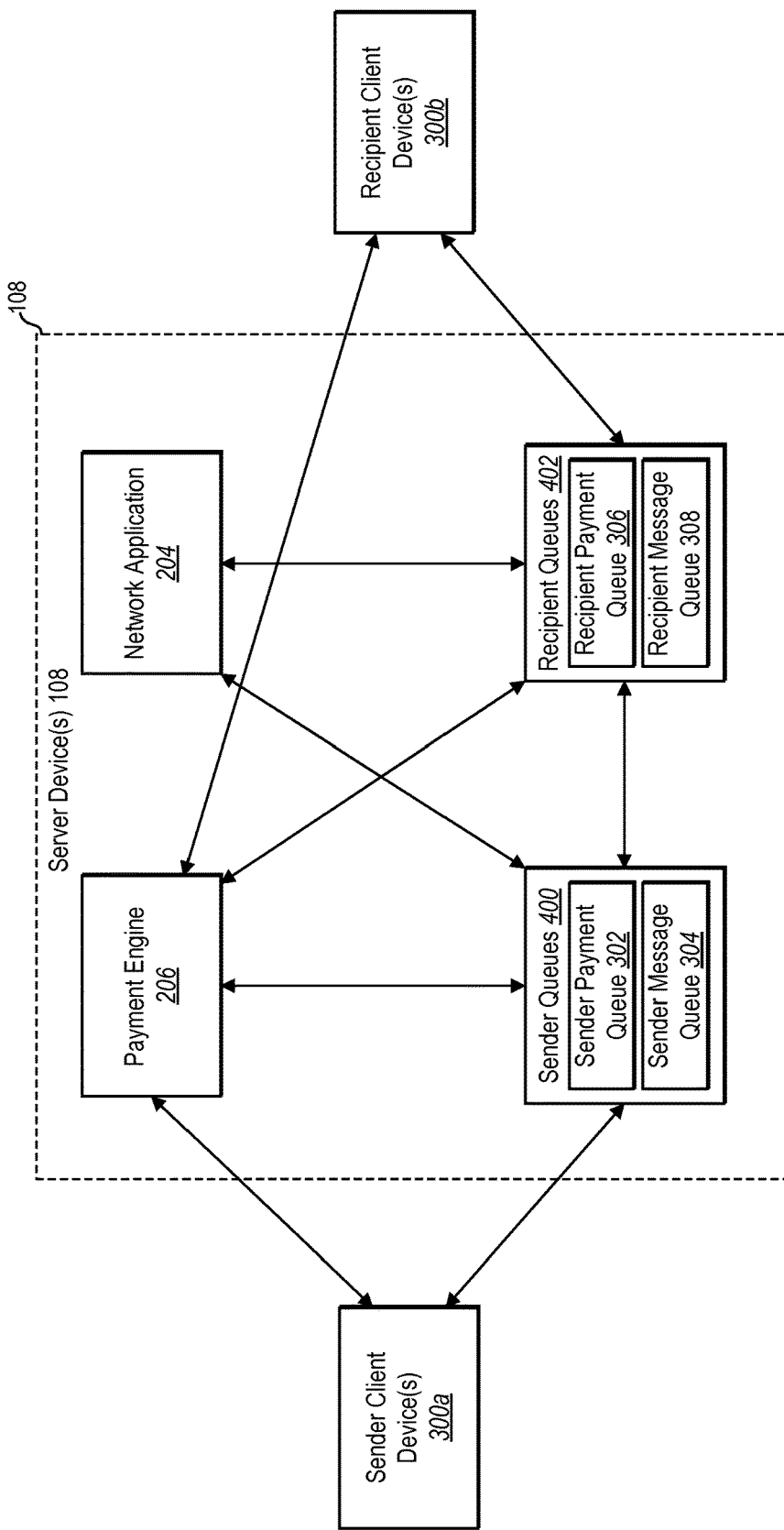
FIG. 4 illustrates a schematic diagram of a system that facilitates sending of messages and payments using user-specific queues in accordance with one or more embodiments.

As described previously, the network application 204 and the payment network 206 communicate with queues for each of the users in the system 100. FIG. 4 illustrates one embodiment of the system 100 that facilitates the sending of payments and messages using multiple queues dedicated to each user. According to one or more embodiments, the server device(s) 108 may include the network application 204, the payment network 206, the sender queues 400 (i.e., the sender payment queue 302 and the sender message queue 304) and the recipient queues 402 (i.e., the recipient payment queue 306 and the recipient message queue 308). Alternatively, the sender queues 400 and the recipient queues 402 may be on separate server devices or on dedicated server devices for each of the sender and the recipient.

As shown, the server device(s) are in communication with the sender client device(s) 300a and the recipient client device(s) 300b. In one or more embodiments, each of the components of the server device(s) 108 may communicate with each other. For example, the sender queues 400 and the recipient queues 402 may communicate with the network application 204 to send and receive updates to messages within a messaging thread between the sender and the recipient. Likewise, the sender queues 400 and the recipient queues 402 may communicate with the payment engine 206 to send and receive updates to payment transactions within the client applications 202 on the respective devices.

At least some of the components of the server device(s) 108 may also communicate with the sender client device(s) 300a and/or the recipient client device(s) 300b. For example, the sender queues 400 may communicate with the sender client device(s) 300a, and the recipient queues 402 may communicate with the recipient client device(s) 300b. For some types of communications, the payment engine 206 may also communicate directly with the sender client device (s) 300a and the recipient client device(s) 300b. To illustrate, the payment engine 206 can communicate directly with the client devices when the client devices or the payment engine 206 transfer data over a secure connection (e.g., data including personal information such as credential information). Although not shown, in one or more embodiments, the network application 204 may communicate with the client devices for sending or receiving sensitive user information such as user account information (e.g., login username/password).

In one or more embodiments, the sender queues 400 and the recipient queues 402 allow the system 100 to process and exchange messages between users more quickly than if the client devices 302a, 302b always communicate directly with the network application 204 and the payment engine 206. For example, the queues allow the system to send at least some messages or changes to the messages from the sender to the recipient without first writing the messages or updates to a database for persistent storage. In particular, the system 100 can use the queues to send messages to the network application 204 and/or the payment engine 206 in parallel with sending the messages to the recipient.

To illustrate, when the sender client device(s) 300a sends a message to the sender queues 400, the sender queues 400 can forward the message to the network application 204 and/or the payment engine 206 and to the recipient queues 402. The recipient queues 402 can then push the messages to the recipient client device(s) 300b essentially at the same time as the network application 204 or payment engine 206 is processing the message (e.g., by writing the message to a database or performing another operation associated with the message). By removing the network application 204 and/or the payment engine 206 as a direct intermediate step in delivering messages from the sender to the recipient, and vice versa, the system 100 improves the speed of the exchange.

When determining whether to deliver a particular update to a client device (e.g., after a connection loss), the queue can determine whether the client device has already received the update based on a sequence ID associated with the update and a sequence ID obtained from the client device. If the sequence ID does not match the sequence ID of the update, the queue can push the update and any intervening updates to the client device to synchronize the client device with the queue. Once the client device is synchronized and has an established connection, the queue can push any new updates to the client device without requesting a sequence ID from the client device, allowing the user of the client device to view status updates to payment transactions as they happen, rather than requiring the client device to request updates.

Additionally, in one or more embodiments, the queues can temporarily store up to a predetermined amount to push to a client device. Specifically, the queues store updates to push to the client devices when the client devices establish a connection with the server device(s) 108. For example, each of the queues can store up to a thousand messages or changes for pushing to the corresponding client device before old updates that the system 100 has not pushed to the client device drop off or are removed from the queue. In alternative examples, the queues may store dynamic numbers of messages based on timestamp information associated with each update, or according to other or additional criteria.

As will be described in more detail below, the components of the system 100 as described with regard to FIGS. 1-2 and FIG. 4, can provide, along and/or in combination with the other components, one or more graphical user interfaces. In particular, the components can allow a user to interact with a collection of display elements for a variety of purposes. In particular, FIGS. 5A-5O and the description that follows illustrate various example embodiments of the user interfaces and features that allow a sender user to send a payment to a recipient.

For example, FIGS. 5A-5O illustrate various views of GUIs provided by the client application 202 to facilitate electronic messaging and sending and receiving payments. In some examples, a client device (i.e., client device 300a, 300b) can implement part or all of the system 100. For example, FIG. 5A illustrates a client device 500 that is a handheld device, such as a mobile phone device (e.g., a smartphone). As used herein, the term "handheld device" refers to a device sized and configured to be held/operated in a single hand of a user. In additional or alternative example, however, any other suitable computing device, such as, but not limited to, a tablet device, a handheld device, larger wireless devices, laptop or desktop computer, a personal-digital assistant device, and/or any other suitable computing device can perform one or more of the processes and/or operations described herein.

The client device 500 can include any of the features and components described below in reference to a computing device 800 of FIG. 8. As illustrated in FIG. 5A, the client device 500 includes a touchscreen 502 that can display or provide user interfaces and by way of which user input may be received and/or detected. As used herein, a "touchscreen display" refers to the display of a touchscreen device. In one or more embodiments, a touchscreen device may be a client device with at least one surface upon which a user may perform touch gestures (e.g., a laptop, a tablet computer, a personal digital assistant, a media player, a mobile phone). Additionally or alternatively, the client device 500 may include any other suitable input device, such as a touch pad or those described below in reference to FIG. 8.

As noted previously, the system 100 can integrate an electronic messaging system (e.g., a messaging application such as FACEBOOK MESSENGER) and an electronic payment system. FIG. 5A illustrates a people or contacts user interface 504 provided by the user interface manager 208 on the touchscreen 502. The contacts user interface 504 can provide a list of contacts of a user ("Donald") of the client device 500. In particular, the contacts user interface 504 can list "friends" or contacts 506 with which the user is connected or associated within the system 100.

The contacts user interface 504 can further provide one or more statuses of each of the contacts 506. For example, the contacts user interface 504 can indicate whether a given contact or co-user is active (e.g., logged into the client application 202, connected to the Internet, recently performed an action using the client application 202) by via of a first status indicator 508. The first status indicator 508 can comprise a graphical user interface object such as an icon. In one embodiment, the first status indicator 508 includes a dot of a first color (e.g., green) next to a name of each co-user who is active. Along related lines, the first status indicator 508 can also include a dot of a second color (e.g., grey) next to users who are inactive.

The contacts user interface 504 can indicate whether a given the type of device a contact or co-user is currently using via a device indicator 510. The device indicator 510 can include a graphical user interface object such as an icon. For example, as shown the device indicator 510 can include the words "Web" indicating that a co-user is active or logged into the client application 202 using a personal computer. Along similar lines, the device indicator 510 can include the word "Mobile" to indicate that a given contact is active or logged into the client application 202 using a mobile device, such as a mobile phone. Additionally or alternatively, the device indicator 510 can indicate a brand or model of the client device of a given co-user.

Depending upon privacy settings of given co-users, the contacts user interface 504 can further include a payment status indicator 511. The payment status indicator 511 can indicate whether a given co-user is enrolled or capable of receiving or sending electronic payments using the system 100. For example, the presence of a payment status indicator 511 next to the name of a given co-user can indicate that the given co-user has a payment credential associated with their account or profile with the system 100 or network application 204. The payment status indicator 511 can comprise a graphical user interface object such as an icon. For instance, as shown by FIG. 5A, the payment status indicator 511 can comprise a dollar sign or other symbol commonly associated with payment transactions.

The client application 202 can receive notifications or indications of the statuses of the contacts associated with the user of the client device 500 from the status manager 232 of the network application 204. For example, the client applications 202 can send notifications or status updates to the network application 204 to indicate when the client applications 202 are active or online. The status manager 232 can then send the statuses of contacts associated with a given user to the client devices 104a associated with the given user. Along related lines, the status manager 232 can determine if a given user has a payment credential associated with their profile and can provide indications to the client device 500 of contacts of the user who have the ability to send and receive payments.

One will appreciate in light of the disclosure herein the integration of an electronic messaging system and an electronic payments system can provide significant advantages over conventional payment applications. In particular, a user can access a contacts user interface 504 and determine which co-users are active, and thus, available to chat about a payment transaction or even notice the receipt of a payment. Furthermore, the contacts user interface 504 can optionally allow a user to know which co-users have a payment credential. Thus, the contacts user interface 504 can inform the user whether a co-user will be able to receive a payment or whether the user may be asked to invite the co-user to enroll.

As described above, the system 100 can facilitate receiving and sending data. In one or more embodiments, the communication manager 230 facilitates receiving and sending electronic communications between the computing devices 104a, 104b, 500. Also in one or more embodiments, the user interface manager 208 displays electronic communications sent and received via the communication manager 230. In one or more embodiments, the user interface manager 208 can display electronic communications sent and received via the communication manager 230 in a messaging thread within the messaging graphical user interface. For example, a user can interact with a contact list in the list of contacts of the contacts user interface 504 in order to open a messaging graphical user interface that facilitates exchanging messages with the contact. For example, FIG. 5B illustrates a messaging graphical user interface 512 provided by the user interface manager 208 on the touchscreen 502 upon the user selecting the contact "Joe" from the contacts user interface 504.

As shown, the messaging graphical user interface 512 can include a messaging thread 514 that includes electronic messages 516a sent from an account of a user of the client device 500. Similarly, the messaging thread 514 can include electronic messages 516b received by the account of a co-user (i.e., "Joe"). In one or more embodiments, the user interface manager 208 organizes the messaging thread 514 such that new messages are added to the bottom of the messaging thread 514 so that older messages are displayed at the top of the messaging thread 514. In alternative embodiments, the user interface manager 208 may organize the messages 516a, 516b in any manner that may indicate to a user the chronological or other relationship between the messages 516a, 516b.

The user interface manager 208 provides a variety of electronic communication characteristics to help a user distinguish between electronic communications in the messaging thread 514. For example, as illustrated in FIG. 5B, the user interface manager 208 displays the electronic messages 516a sent from an account of the user of the client device 500 pointed toward one side (i.e., the right side) of the messaging graphical user interface 512. On the other hand, the user interface manager 208 displays the electronic messages 516b received by the messaging handler 212 pointed toward the opposite side (i.e., the left side) of the messaging graphical user interface 512. In one or more embodiments, the positioning and orientation of the electronic messages 516a, 516b provides a clear indicator to a user of the client device 500 of the origin of the various electronic communications displayed within the messaging graphical user interface 512.

Another characteristic provided by the user interface manager 208 that helps a user distinguish electronic communications may be a color of the electronic communications. For example, as shown in FIG. 5B, the user interface manager 208 displays sent electronic messages 516a in a first color and received electronic messages 516b in a second color. In one or more embodiments, the first and second colors may be black and white, respectively, with an inverted typeface color. In an alternative embodiment, the user interface manager 208 may display the electronic messages 516a, 516b with white backgrounds and different colored outlines.

In yet another alternative embodiment, the user interface manager 208 may display the electronic messages 516a, 516b with backgrounds of different patterns, in different fonts, in different sizes or in any other manner that may distinguish the sent electronic messages 516a from the received electronic messages 516b. For example, in one or more embodiments, the user interface manager 208 displays sent electronic messages 516a with white typeface on a blue background. Likewise, in one or more embodiments, the user interface manager 208 displays received electronic messages 516b with black typeface on a grey background.

As mentioned above, the user interface manager 208 may also provide a message input control palette or toolbar 522. As illustrated in FIG. 4B, the user interface manager 208 displays the message input control palette or toolbar 522 as part of the messaging graphical user interface 512. In one or more embodiments, the message input control palette or tool bar 522 includes a variety of selectable message input controls that provide a user with various message input options or other options. For example, in FIG. 5B, the message input control palette or toolbar 522 includes a text input control 524a, a payment control 524b, a camera viewfinder input control 524c, a multimedia input control 524d, a symbol input control 524e, and a like indicator control 524f. In one or more alternative embodiments, the message input control palette or toolbar 522 may provide the input controls 524a-524e in a different order, may provide other input controls not displayed in FIG. 4B, or may omit one or more of the input controls 524a-524e shown in FIG. 4B.

As will be described below in greater detail, a user may interact with any of the input controls 524a-524e in order to compose and send different types of electronic communications. For example, if a user interacts with the text input control 524a, the user interface manager 208 may provide a touchscreen display keyboard 518 in a portion of the messaging graphical user interface 512 that the user may utilize to compose a textual message 520. Similarly, if a user interacts with the multimedia input control 524d, the user interface manager 208 may provide a multimedia content item display area (e.g., for displaying digital photographs, digital videos, etc.) within a portion of the messaging graphical user interface 512. Likewise, if a user interacts with the camera viewfinder input control 524c, the user interface manager 208 may provide a digital camera interface within a portion of the messaging graphical user interface 512 that the user may utilize to capture, send, and add a digital photograph or digital video to the messaging thread 514.

A user may interact with any of the message input controls 524a-e in order to compose and send a message or a payment to one or more co-users via the system 100. For example, in FIG. 5B, a user's finger is shown interacting with the payment control 524b. In one or more embodiments, the user input detector 210 can detect interactions (e.g., a tap touch gesture) of the user's finger or other input device with the payment control 524b. Upon the user input detector 210 detecting a tap touch gesture on the payment control 524b, the user interface manager 208 may display a payment user interface 515 within a portion of the messaging user interface 512 as shown by FIG. 5C.

In particular, as illustrated by FIG. 5C, the user interface manager 208 can provide the messaging thread 514 in a first portion (i.e., the upper portion) of the messaging user interface 512. The user interface manager 208 can provide the payment user interface 515 in a second portion (i.e., the lower portion) of the messaging user interface 512. Thus, the user interface manager 208 can allow the user to view the messaging thread 514 and any new messages, while also being able to initiate a payment transaction. In alternative embodiments the user interface manager 102 can arrange the messaging thread 514 and the payment user interface 515 horizontally or in another arrangement other than a vertical arrangement. In still further embodiments, the payment user interface 515 can comprise an overlay over the messaging user interface 512 or a separate user interface.

As will be apparent from the description herein, the payment user interface 515 can allow a user to initiate a payment transaction (send a payment, request a payment, etc.) while simultaneously viewing messages with one or more co-users party to the payment transaction. For example, FIGS. 5B and 5C illustrate that the sender user ("Brad") of the device 500 (hereinafter sender) has received a message from the recipient co-user ("Joe") participating in the conversation in the messaging thread 514: "Can you send me $25 for the other night?" In response, Brad has replied: "Sure thing." In response to this conversation or messaging session, the sender can desire to send a payment to the recipient. The messaging user interface 512 can allow the sender to do so without having to navigate away from the messaging thread 514 or the messaging user interface 512. Alternatively, the messaging user interface 512 can navigate to a separate payment user interface 515.

As shown, the payment interface 515a can include a numerical keypad 538 that can allow a user to select a payment amount 532 by entering the desired digits in sequence (i.e., by tapping "2" then "5" within the numerical keypad 538 to arrive at $25). The payment interface can display the selected digits to allow the user to verify that the selected digits correspond to the desired payment amount and to modify the selected digits accordingly. One will appreciate in light of the disclosure herein that the payment interface 515 of FIG. 5C is one implementation of a payment interface. In one or more embodiments, a user can select a payment interface 515 from a plurality of different payment interfaces.

In one or more embodiments, in response to the sender selecting a pay element 537 or otherwise causing the payment request to send, the client application 202 can send a request to the payment engine 206 to determine if the sender has a registered payment credential and/or to authorize a registered payment credential of the user. Specifically, the client application 202 can generate a payment request and send a payment initiation request to the payment engine 206, as illustrated in FIG. 3A. In the event the sender is not associated with a registered payment account, a user interface manager 208 can present a credential user interface 534 that allows the sender to register a payment credential, as shown in FIG. 5D. Alternatively, or additionally, a graphical interface can present a one-time payment option that allows a user to input payment information to facilitate a one-time payment (e.g., enter a debit card or credit card number), without requiring the sender to create an account.

One will appreciate that the credential user interface 534 can vary depending upon which type of payment credential the sender selects to enter. In or more embodiments, the user interface manager 208 can provide a list of acceptable payment credentials (e.g., credit card, debit card, gift card, bank account) for sending funds to a recipient. Upon a user selecting a type of payment credential, the user interface manager 208 can provide an applicable credential user interface 534. For example, FIG. 5D illustrates a credential user interface 534 for entering a debit card. As shown, a user can input, via a numerical keypad 538, a debit card number, an expiration date, a security code, and a billing ZIP code associated with the debit card. Upon entering the payment information, the messaging handler 212 can send the payment credential information to the payment engine 206 for storing a payment credential.

After the sender has entered the payment credentials details (whether by way of an automatic reminder, a manual reminder from the recipient, or by the sender's own choice), the system 100 can continue processing the payment transaction. In one or more embodiments, the client application 202 can provide to the sender an option to use a PIN or other shortcut for processing future payment transactions. For example, the client application 202 can present to the sender a pop-up window 540 or other notification in the messaging interface 512 asking the sender whether the sender wants to create a PIN for sending money for added security, as shown in FIG. 5E.

If the sender selects to enter a PIN for processing future payment transactions, the client application 202 can present a PIN creation interface 542 for creating a PIN, as shown in FIG. 5F. Specifically, the PIN creation interface can allow the sender to create a unique PIN associated with the sender's stored credentials. For example, the PIN can be a 4-digit number (or string of any length) that the sender is can input via the numerical keypad 538 before being able to process a future payment transactions. In some instances, the system 100 can also request that the sender confirm the PIN by re-entering the PIN in order to create the PIN and associate the PIN with the stored credentials.

For future payment transactions, the system 100 can present a PIN input interface by which the sender can input the PIN. Inputting the PIN can allow the system 100 to process the payment transaction using the credentials stored for the user in association with the PIN. Thus, entering the PIN will allow the sender to initiate and complete payment transactions without remembering the credentials every time the sender wishes to send money to another user via the system 100.

In one or more embodiments, while validating or after validating the payment credentials of the user, the sender client device 500 can send the payment request to the payment engine 206 for processing and delivering to the recipient client device. As described previously, after the payment engine 206 receives the payment request from the sender client device 500 and successfully charges the sender's payment credential, the payment engine 206 sends a payment initiation message to the sender client device 500 to the sender payment queue 302. The sender payment queue 302 can push the update to the sender client device 500 and also send the update to the recipient payment queue 306.

In connection with the payment initiation message, the network application 204 can generate a message indicating the payment request for presenting the payment amount 532 within the messaging thread 514 for both the sender and the recipient involved in the conversation. Specifically, the network application 204 can send the message to the sender message queue 304. The sender message queue 304 then pushes the message to the sender client device 500 and also forwards the message to the recipient message queue 308.

When the sender client device 500 receives the message and the payment initiation message, the sender client device 500 can display the message within the messaging thread 514. As previously mentioned, the message may be linked to the payment transaction by way of the transaction ID and message ID so that the message can show information associated with the payment transaction. For example, FIG. 5G shows the payment amount 532 for the payment request in the messaging thread 514 between the sender and the recipient. To illustrate, the system 100 can present the payment amount 532 as a message within a time-dependent flow of the conversation of the messaging thread 514.

Figure 5M:
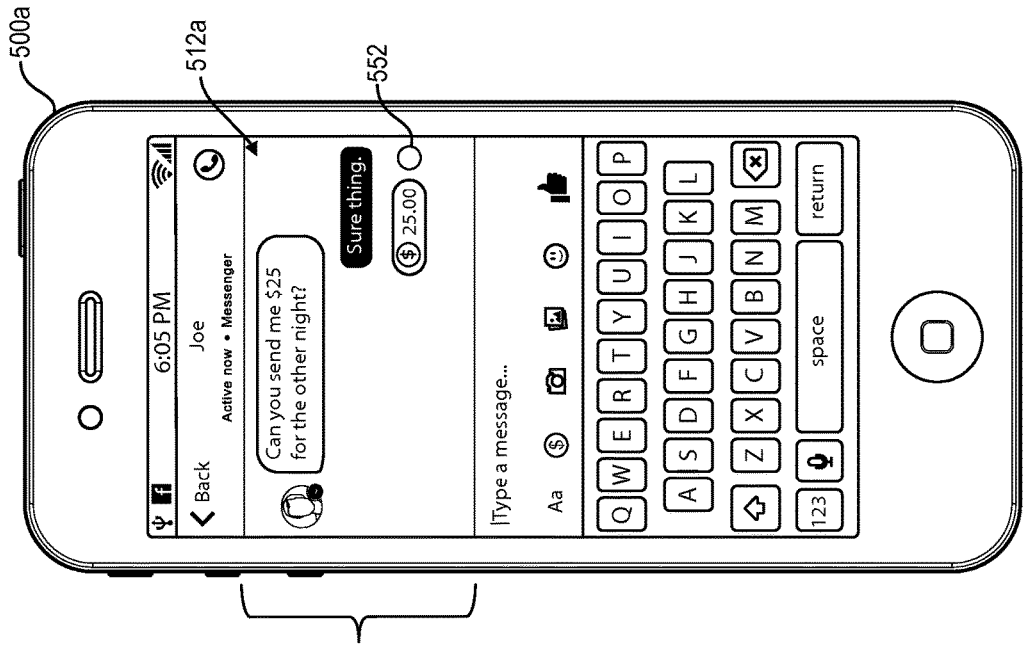
FIGS. 5A-5O illustrate user interfaces for completing a payment transaction in accordance with one or more embodiments.

FIGS. 5H-5M illustrate a graphical user interface for the recipient client device 500a. FIG. 5H illustrates the messaging interface 512a at the recipient client device 500a after the sender has initiated the payment transaction to send a payment amount to the recipient. In one or more embodiments, the system 100 can notify the recipient that the sender has initiated the payment transaction via the payment initiation message and the message indicating the payment transaction. Specifically, when the recipient payment queue 306 receives the payment initiation message, the recipient payment queue 306 can push the update to the recipient client device 500a.

Additionally, the recipient message queue 308 can push the corresponding message to the recipient client device 500a. For example, the user interface manager 208 can show the payment amount in the messaging thread 514a of the messaging interface 512a associated with the sender's identity, and text content (e.g., "Sent from Messenger") in a payment request with the payment amount 532a. To illustrate, the user interface manager 208 can insert the payment amount 532a into a messaging thread 514a with other messages exchanged between the sender and the recipient. Additionally or alternatively, the user interface manager 208 can present the payment amount 532a in another manner (e.g., by providing a notification in a notification area of the recipients client device 500a or in an overlay of the messaging interface 512a).

In one or more embodiments, the user interface manager 208 can provide a confirmation request to the recipient to allow the recipient to accept the payment transaction (i.e., by selecting an element in the messaging interface such as an accept element 552). After the recipient accepts the payment transaction, the payment engine 206 can complete the payment transaction and begin the process of transferring funds from the sender to the recipient. In an alternative example, the payment request can merely bring attention of the payment transaction to the recipient while the system 100 automatically processes and completes the payment transaction.

In one or more embodiments, when the recipient selects to accept the payment or after the recipient receives the payment request, the client application 202 can send a request to the payment engine 206 to determine if the recipient has a registered payment credential that supports a qualified payment method. In the event the recipient is not associated with a registered payment account, the payment engine 206 can notify the recipient client device 500*a* to display a credential user interface 534 that allows the recipient to establish an account and register a payment credential for a payment transaction (e.g., a debit card account or a credit card account), as shown in FIG. 5I. Alternatively, or additionally, a graphical interface can present a one-time payment option that allows a recipient to input payment information to facilitate a one-time payment, without requiring the sender to create an account.

After the recipient enters a payment credential, the recipient client device 500*a* sends the payment credentials of the recipient to the payment engine 206 for authentication/verification. The system 100 can then complete the payment transaction. Specifically, the system 100 can complete the payment transaction by transferring funds from the sender to the recipient. In some instances, transferring funds from the sender to the recipient can include transferring funds into a temporary or intermediate account associated with the recipient until the transaction is approved by the corresponding financial institutions, as described previously in relation to FIGS. 3A-3F. In alternative instances, completing the payment transaction can include directly transferring the funds into the destination deposit account entered by the recipient.

As shown in FIG. 5J, after completing the payment transaction (or after the recipient selects to complete the payment transaction), the system 100 can display a payment completion message 558 notifying the recipient that the payment transaction is complete, and that the recipient should receive the payment within a certain timeframe. For example, the payment completion message 558 can notify the recipient that the recipient should receive the payment within a certain time period. In one or more embodiments, the recipient client device 500*a* can display the completion message 558 after receiving a payment status update indicating that the payment transaction is complete from the recipient payment queue 306.

In additional embodiments, the system 100 can select a payment credential from a plurality of payment credentials for the recipient. In particular, the system 100 can identify a plurality of payment credentials that the recipient has previously registered with the payment engine 206 and select an appropriate payment credential. For example, the system 100 can identify multiple deposit accounts and allow the user to select from the multiple deposit accounts via the payment interface 515*a*. After selecting the appropriate payment credential, the system can complete the payment transaction (i.e., push the payment amount to the recipient's selected payment credential) and provide the recipient with the payment completion message 558.

In one or more embodiments, after closing the payment completion message 558 or otherwise completing the payment transaction, the system 100 can update the payment amount 532 (and any other text of the payment request) in the messaging thread 514 on the sender client device 500 and/or the messaging thread 514*a* of the recipient client device 500*a* to reflect that the system 100 has completed processing the payment transaction. For example, the user interface manager 208 can change certain characteristics of the payment request (which in this case comprises only the payment amount 532) in the messaging thread 514*a*. To illustrate, in FIG. 5K, the user interface manager 208 changes the color or shading of a payment icon 560 by the payment amount 532*a* in the payment request from light as shown in FIG. 5G to dark, as shown in FIG. 5K. Additionally, or alternatively, the user interface manager 208 can change the position of the payment request in the messaging thread 514*a*, the border width of the payment request, the background color of the payment request, the size and font of the payment request, or any other characteristic of the payment request suitable for this purpose.

In one example, the user interface manager 208 can animate the payment amount when the payment amount is finalized, for example, by causing the payment amount to "bounce" within the messaging interface 512. When animating the payment amount, the user interface manager 208 can animate characters and/or images in the payment amount individually or collectively.

Additionally or alternatively, the user interface manager 208 can modify the appearance (e.g., animate the payment amount) until the one or more operations associated with the payment transaction are completed. For example, the user interface manager 208 can animate the payment amount until the recipient accepts the payment amount, the sender and/or the recipient enters credentials, or the system 100 completes the payment transaction and transfers the funds from the sender to the recipient. In additional or alternative embodiments, the user interface manager 208 can apply the modifications to the appearance of the payment amount for an amount of time once the payment amount is final. Additionally or alternatively, the user interface manager 208 can apply modifications to the appearance of the payment amount based on other criteria, such as when the payment transaction is complete, when the funds are available to the sender, or if the payment transaction fails.

According to one or more embodiments, the users may view additional information about the payment transaction within the messaging thread. For example, as shown in FIG. 5L, if the recipient selects the message (e.g., by tapping on the message), the messaging user interface 512*a* can display the current payment status in a second message 550, pop-up window, or other status indicator associated with the payment request within the messaging thread 514*a*. To illustrate, if the payment engine 206 has initiated the payment transaction, but has not yet completed the payment transaction, the second message 550 can retrieve the information received for the transaction ID and display the current status as "Initiated". Additionally, the second message 550 can display the timestamp of the status update to the payment transaction.

When the status for the payment transaction updates, the recipient client device 500*a* can receive the update in a push notification from the recipient payment queue even while the recipient is looking at the status of the payment transaction (e.g., the second message 550 updates in real-time). As shown in FIG. 5M, the second message 550 can indicate the status update to "Complete" to indicate that the payment transaction has completed. The second message 550 can also show the timestamp associated with the newest status update. In one or more instances, the second message 550 can also show previous status updates, as well, along with the corresponding timestamps. For example, the second message 550 can show additional information in response to additional user input (e.g. a long press on the message). Although the status shown in FIGS. 5L and 5M show status updates received from the payment queues for payment initiation and completion, the payment engine 206 can send additional or alternative updates, including, but not limited to, payment acceptance, payment credentials being entered, payment cancellation, and/or others.

Additionally, or alternatively, in one or more embodiments, the payment amount shown in the message indicating the payment transaction can change due to an update to the payment transaction. For example, as previously mentioned, the payment amount may update in real time if the sender user (or multiple sender users in a group payment transaction) modifies the payment amount by increasing or decreasing the payment amount to the recipient, cancels the payment, or additional senders add payment amounts to the payment transaction. To illustrate, if a user in a group payment cancels the user's payment to a recipient, the payment amount can update to reflect the canceled payment by subtracting the canceled payment amount from the previous payment amount. Similarly, if a new user joins the group and adds a payment, the payment amount can update to reflect the payment from the new user by adding the new payment amount to the previous payment amount.

Similarly, the payment amount may change based on exchange rates. For example, if the payment transaction involves multiple currencies, the payment amount may change as the exchange rate for the currencies changes. To illustrate, if the exchange rate for a recipient's currency changes (e.g., the recipient's currency value decreases), the payment amount could increase to reflect the modified exchange rate in real time.

More specifically, as mentioned above, the payment amount shown in the message 532a in the message thread 514a comprises a link to the payment initiation message. Upon the payment queues receiving a payment update changing the payment amount (either from a client device or the payment engine 206), the payment queue can push the payment update to the payment queues, causing them to update the amount in the payment initiation message. Upon the payment amount changing in the payment initiation message, the amount of the payment displayed in the message 532a in the messaging thread 514a can update as the message comprises a link to the payment initiation message.

Figure 5N:
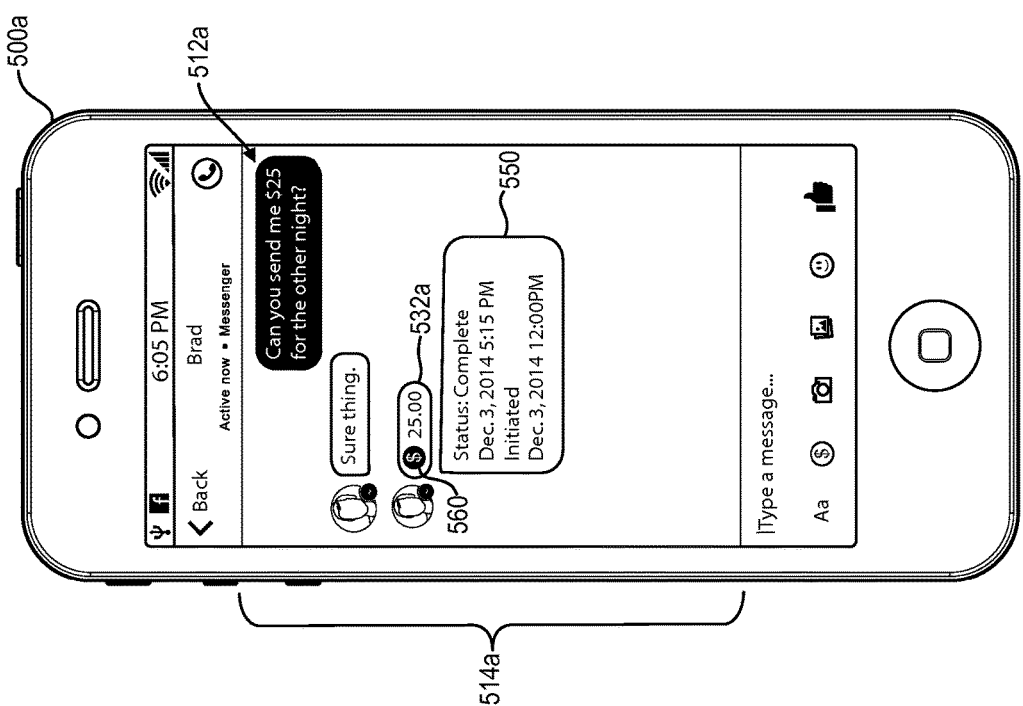
Figure 50:
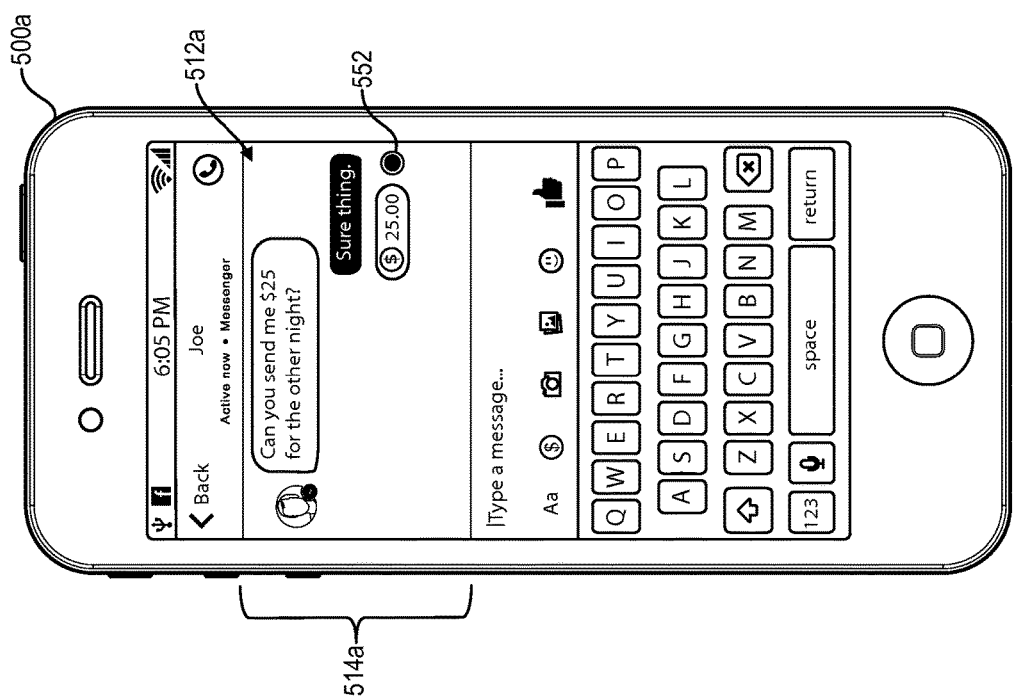

In one or more embodiments, the client application 202 can provide status updates for the message indicating the payment transaction in association with payment status updates. FIGS. 5N and 5O illustrate message status updates based on status updates to the payment transaction between the sender and the recipient and/or based on message delivery/read updates. For example, the messaging thread 514 at the sender client device 500 can include a visual indicator (represented by a circle next to the message in the messaging thread 514) that the payment status has changed and/or based on actions taken by the recipient. To illustrate, FIG. 5N shows a message status indicator 552 that indicates to the sender that the payment engine 206 has successfully charged the sender's payment credential for the payment amount, though the status indicator may indicate other payment status updates or message status updates (e.g., when the recipient receives or reads the message), or have a different appearance.

According to one or more embodiments, the client application 202 on the sender client device 500 can detect that the sender client device has received the payment update from the sender payment queue 302 and determine the status identifier from the update. Based on the status identifier for the update to the payment transaction, the client application 202 can identify a message status that corresponds to the payment update and modify the message status within the messaging thread 514. For example, the client application 202 can find the corresponding message update based on a mapping of payment updates to message updates. Alternatively, the payment engine 206 can notify the network application 204 of the payment status update, and the network application 204 can send the message status update to the sender client device 500 via the sender message queue 304.

As the payment status updates, the message status can update accordingly. For example, FIG. 5O illustrates the message status indicator 552 updated in response to a new payment status update or a message delivery/read update. To illustrate, the message status indicator 552 when updated can indicate that the recipient has accepted the payment transaction and that the payment has processed. Additionally, or alternatively, the messaging thread can indicate more or different status updates associated with the payment transaction or the message within the messaging thread. For example, the message status indicator 552 can indicate that the recipient has received the message indicating the payment transaction, that the recipient has read the message, that the recipient has viewed the payment status information by selecting the message, or other recipient actions.

Although FIGS. 5A-5O illustrate an embodiment of a payment transaction in which a sender initiates the payment transaction, the system 100 can allow users to request payments via the messaging application. For example, when a user requests a payment, the user's device can send the request to one or more other users via the user's payment queue to the server device(s) 108 and to the payment queue(s) of the other user(s). The other user(s) can approve the payment and send the approval via the respective payment queue(s).

FIGS. 1-5O, the corresponding text, and the examples, provide a number of different systems and devices for sending and receiving payments using an integrated electronic payment and messaging system. In addition to the foregoing, embodiments can be described in terms of flowcharts comprising acts and steps in a method for accomplishing a particular result. For example, FIGS. 6 and 7 illustrate flowcharts of exemplary methods in accordance with one or more embodiments.

Figure 6:
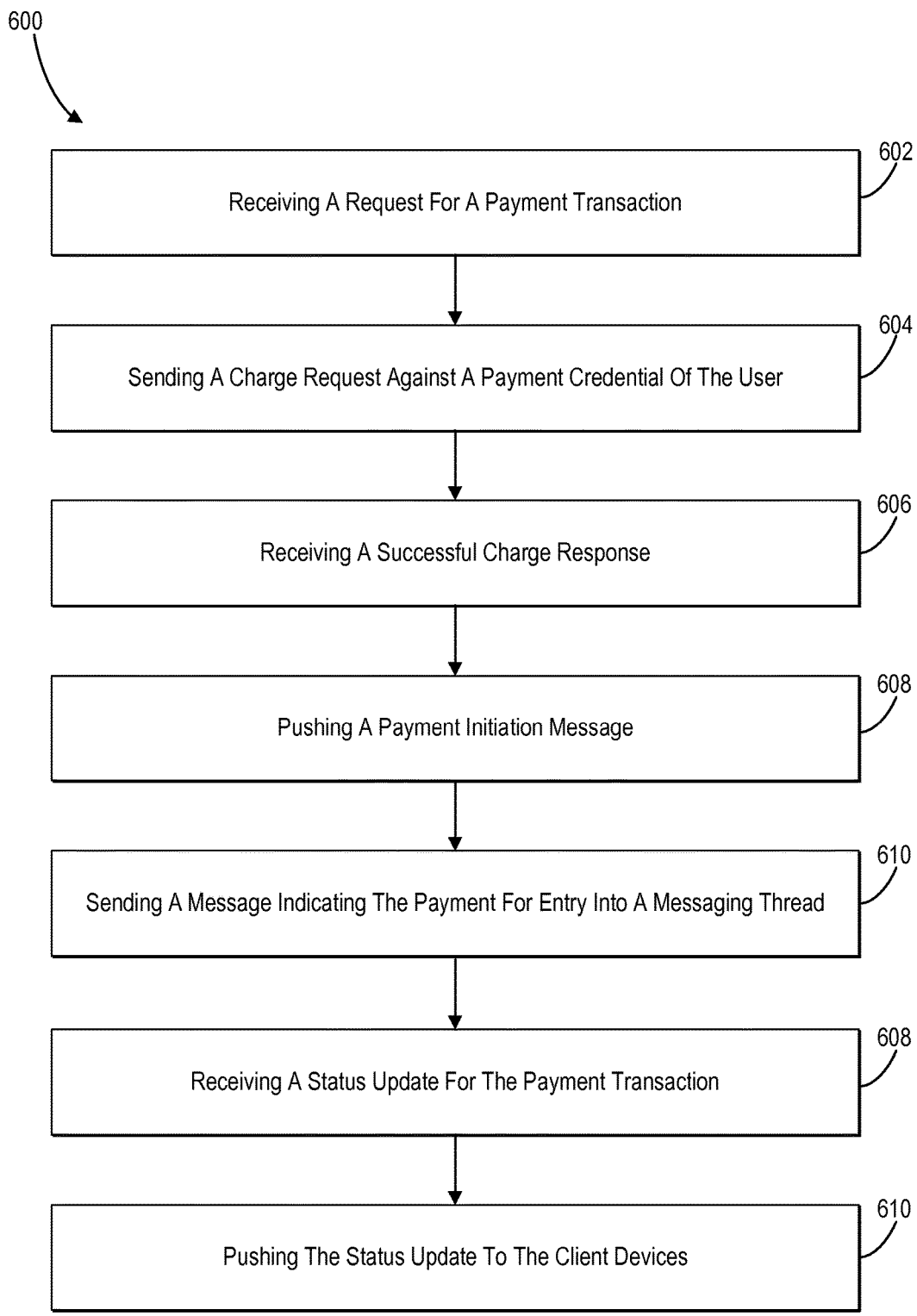
FIG. 6 illustrates a flow chart of a series of acts in a method of pushing payment transaction updates to client devices in accordance with one or more embodiments.
Figure 7:
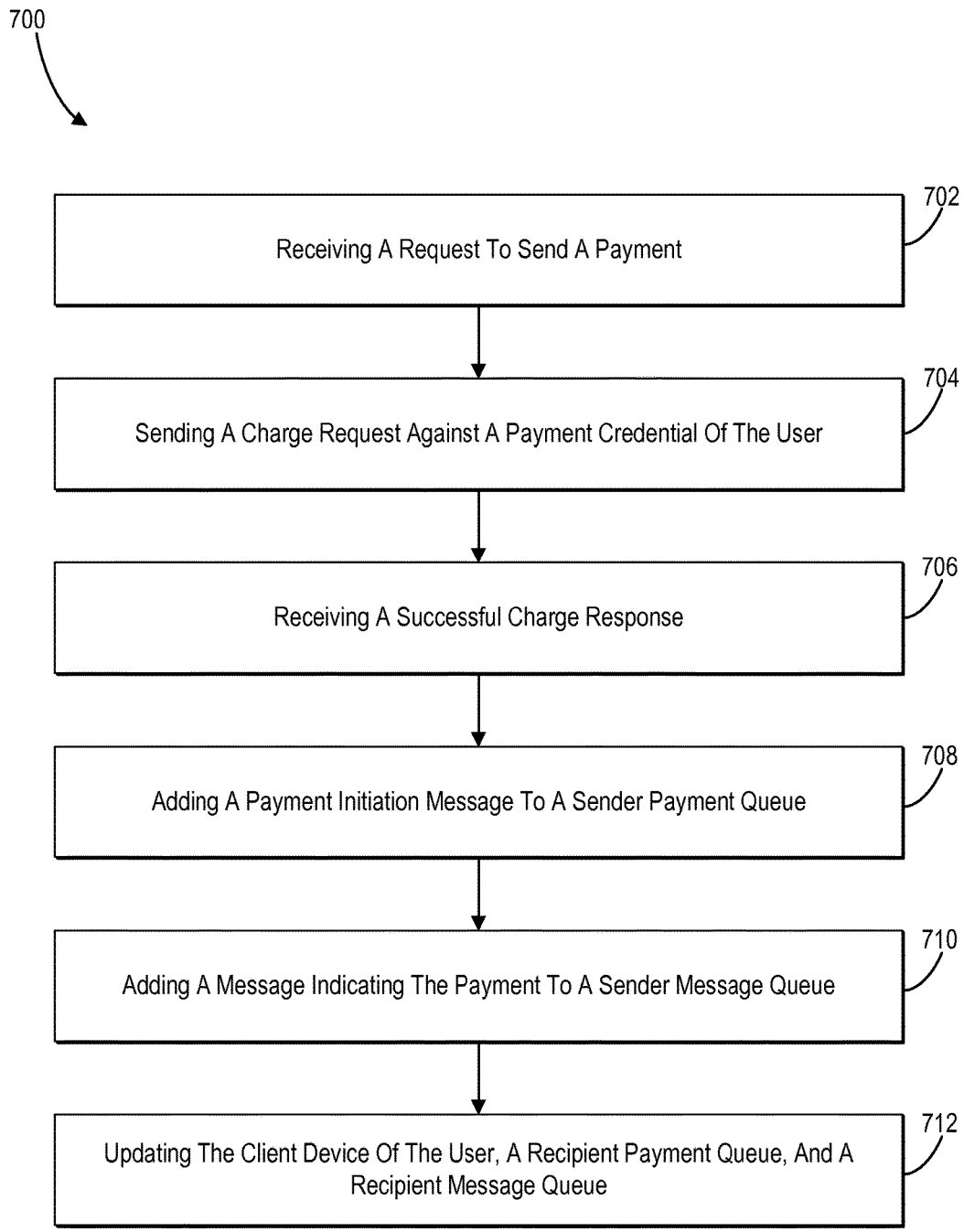
FIG. 7 illustrates a flow chart of a series of acts in another method of pushing payment transaction updates to client devices in accordance with one or more embodiments.

FIG. 6 illustrates a flowchart of a method 600 of pushing payment transaction updates to client devices. The method 600 includes an act 602 of receiving a request to conduct a payment transaction. For example, act 602 involves receiving, from a first client device 104a associated with a user, a request from a user to send a payment to a co-user, the request including a payment amount. To illustrate, act 602 can involve receiving a payment request that comprises a payment amount, a sender identifier, and an offline reference associated with a payment transaction between the user and the co-user. Additionally, or alternatively, the payment transaction can comprise a transaction involving a group of users.

The method 600 also includes an act 604 of sending a charge request against a payment credential of the user. For example, act 604 involves sending, to a payment network 115, a charge request against a payment credential of the user for the payment amount of the payment request. To illustrate, act 604 can involve determining a payment credential of the user from a database comprising registered payment credentials using a sender identifier from the payment request.

Additionally, the method 600 includes an act 606 of receiving a successful charge response. For example, act 606 involves receiving, from the payment network 115, a successful charge response indicating that the charge request was successful. To illustrate, act 606 can involve receiving a successful charge response indicating that the payment network successfully charged the payment credential of the user for the payment amount of the payment transaction.

Furthermore, the method 600 includes an act 608 of pushing a payment initiation message to the first client device 104*a* and a second client device 104*b*. For example, act 608 involves pushing, in response to the successful charge response, a payment initiation message to the first client device 104*a* associated with the user and a second client device 104*b* associated with the co-user. Additionally, act 608 can involve generating the payment initiation message in response to the successful charge response. The payment initiation message can comprise the transaction identifier, the payment amount, the sender identifier, a recipient identifier, and a status indicating that the payment transaction was initiated. The payment initiation message can also comprise a timestamp indicating when the payment transaction was initiated.

The method 600 also includes an act 610 of sending a message indicating the payment for entry into a messaging thread 514, 514*a* between the user and the co-user. For example, act 610 involves sending, to the first client device 104*a* and the second client device 104*b*, a message indicting the payment for entry into a messaging thread 514, 514*a* between the user and the co-user and including the payment amount associated with the payment. To illustrate, the message indicating the payment can display the payment amount within the messaging thread 514, 514*a*. Additionally, the method 600 can include pushing the payment initiation message and sending the message indicating the payment in parallel. For example, the method 600 can include pushing the payment initiation message via a first queue and sending the message indicating the payment via a second queue separate from the first queue.

As part of act 610, or as an additional act, the method 600 can include generating a transaction identifier for the payment transaction, and associating the transaction identifier with the message corresponding to the messaging thread 514, 514*a*. To illustrate, associating the transaction identifier with the message can involve generating a message identifier for the message, and mapping the message identifier to the transaction identifier.

The method 600 further includes an act 612 of receiving a status update for the payment transaction. For example, act 612 can involve identifying the transaction identifier in connection with the status update, and determining that the status update is associated with the payment transaction. To illustrate, the status update can comprise a transaction completion update. Alternatively, the status update can comprise a transaction cancellation update. In another example, the status update can comprise an acceptance of the payment transaction by the recipient.

Additionally, the message corresponding to the messaging thread 514, 514*a* can comprise a link to the payment amount based on the transaction identifier. To illustrate, the message can comprise a link that obtains the payment amount based on a payment status of the payment transaction, and displays the payment amount from the payment transaction within the message.

The method 600 also includes an act 614 of pushing the status update to the client devices. For example, act 614 involves pushing the status update for the payment transaction to the first client device 104*a* and the second client device 104*b*. To illustrate, act 614 can involve detecting a communication connection with the first client device 104*a*, and pushing the status update for the payment transaction to the first client device 104*a* in response to the detected communication connection with the first client device 104*a*. Similarly, act 614 can involve detecting a communication connection with the second client device 104*b*, and pushing the status update for the payment transaction to the second client device 104*b* in response to the detected communication connection with the second client device 104*b*. Act 614 can also involve pushing the status update to the first client device 104*a* and the second client device 104*b* at different times.

As part of act 614, or as an additional act, the method 600 can further include pushing, based on the status update for the payment transaction, a message status update associated with the message corresponding to the messaging thread 514, 514*a* to the first client device 104*a* and the second client device 104*b*. To illustrate, the method 600 can include pushing the message status update to display a message status update indicator at the first client device 104*a* and the second client device 104*b*, the message status update indicator indicating the status update for the payment transaction within the messaging thread 514, 514*a*.

FIG. 7 illustrates a flowchart of another method of pushing payment transaction updates to client devices. The method 700 includes an act 702 of receiving a request to conduct a payment transaction. For example, act 702 involves receiving, a first client device associated with a user, a payment request from the user directed to a co-user, the payment request including a payment amount associated with a payment transaction between the user and the co-user. To illustrate, act 702 can involve receiving a payment request that comprises a payment amount, a sender identifier, and an offline reference associated with a payment transaction between the user and the co-user. Additionally, or alternatively, the payment transaction can comprise a transaction involving a group of users.

The method 700 also includes an act 704 of sending a charge request against a payment credential of the user. For example, act 704 involves sending, to a payment network 115, a charge request against a payment credential of the user for the payment amount of the payment request. To illustrate, act 704 can involve determining a payment credential of the user from a database comprising registered payment credentials using a sender identifier from the payment request.

The method 700 further includes an act 706 of receiving a successful charge response. For example, act 706 involves receiving, from the payment network 115, a successful charge response from the payment network 115 for the payment amount. To illustrate, act 706 can involve receiving a successful charge response indicating that the payment network successfully charged the payment credential of the user for the payment amount of the payment transaction.

Additionally, the method 700 includes an act 708 of adding a payment initiation message to a sender payment queue 302. For example, act 708 involves adding, in response to the successful charge notification, a payment initiation message to a sender payment queue 302 associated with the user. To illustrate, act 708 can involve updating a sequence identifier for the payment initiation message, and sending the payment initiation message to the sender payment queue 302.

The method 700 also includes an act 710 of adding a message to a sender message queue 304. For example, act 710 involves adding, in response to the successful charge notification, a message indicating the payment to a sender message queue 304 associated with the user. Act 710 can also involve generating, in response to the successful charge notification, the transaction identifier for the payment transaction, and generating the message indicating the payment.

As part of act 710, or as an additional act, the method 700 can include generating the transaction identifier for the payment transaction in response to receiving the successful charge response. Additionally, the method 700 can include generating a message identifier for the message comprising the transaction identifier, and mapping the transaction identifier to the message identifier. The method 700 can also include sending the message identifier and the transaction identifier to the client device of the user prior to adding the payment initiation status update to the sender payment queue 302.

Additionally, the method 700 includes an act 712 of updating the client device 104*a* of the user, a recipient payment queue 306, and a recipient message queue 308. For example, act 712 involves updating the client device of the user, a recipient payment queue 306, and a recipient message queue 308 by pushing the payment initiation message from the sender payment queue 302 to the client device and the recipient payment queue 306, and pushing the message indicating the payment from the sender message queue 304 to the client device 104*a* and the recipient message queue 308. To illustrate, act 712 can involve detecting a communication connection between the sender payment queue 302 and the client device 104*a*, and pushing the payment initiation message from the sender payment queue 302 to the client device 104*a* in response to detecting the communication connection. Act 712 can also involve pushing the payment initiation message from the sender payment queue 302 to the recipient payment queue 306 in response to the payment initiation status update being added to the sender payment queue 302. Additionally, act 712 can involve pushing the payment initiation message and the message indicating the payment transaction in parallel.

The method 700 can further include updating a client device 104*b* of the co-user by pushing the payment initiation message from the recipient payment queue 306 to the client device 104*b* of the co-user, and pushing the message indicating the payment from the recipient message queue 308 to the client device 104*b* of the co-user. Additionally, the method 700 can further include pushing the payment initiation message and the message indicating the payment to the client device 104*b* of the co-user in parallel.

As an additional act, the method 700 can include receiving, from the payment network, a transaction completion response indicating that the payment network has successfully completed the payment transaction. The method 700 can also include pushing, in response to the transaction completion response, a transaction completion status update for the payment transaction to the recipient payment queue 306 in association with the transaction identifier. The method 700 can further include pushing, based on the transaction completion status update, a message status update associated with the message comprising the transaction identifier to the recipient message queue 308.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 8 illustrates a block diagram of exemplary computing device 800 that may be configured to perform one or more of the processes described above. One will appreciate that one or more computing devices such as the computing device 800 may implement the payment system 100. As shown by FIG. 7, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 706.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touchscreen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social-networking system may enable its users (such as persons or organizations) to interact with the system and with each other. As mentioned above, the system 100 can comprise a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 9:
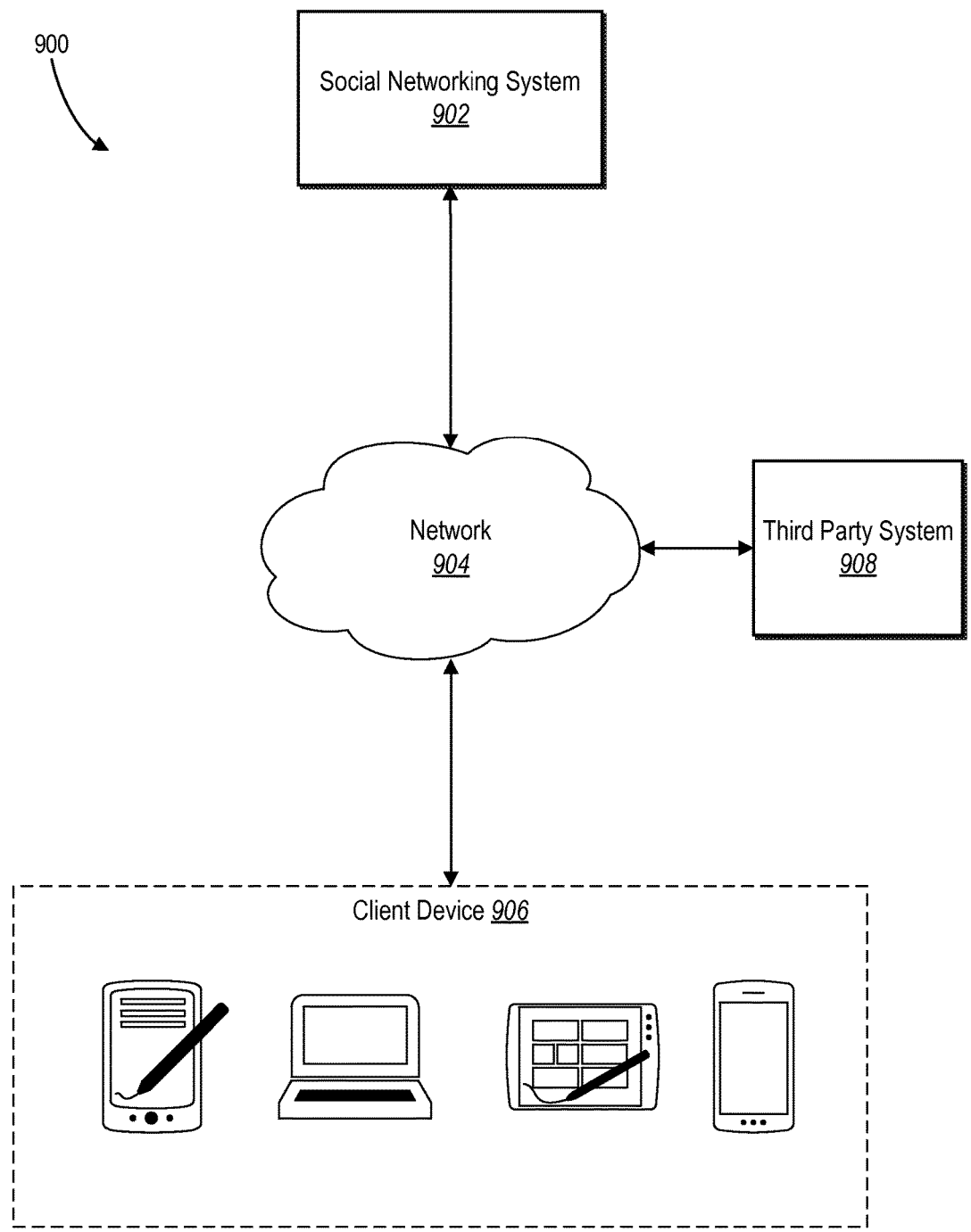
FIG. 9 illustrates an example network environment of a social-networking system in accordance with one or more embodiments.

FIG. 9 illustrates an example network environment 900 of a social-networking system. Network environment 900 includes a client system 906, a social-networking system 902, and a third-party system 908 connected to each other by a network 904. Although FIG. 9 illustrates a particular arrangement of client system 906, social-networking system 902, third-party system 908, and network 904, this disclosure contemplates any suitable arrangement of client system 906, social-networking system 902, third-party system 908, and network 904. As an example and not by way of limitation, two or more of client system 906, social-networking system 902, and third-party system 908 may be connected to each other directly, bypassing network 904. As another example, two or more of client system 906, social-networking system 902, and third-party system 908 may be physically or logically co-located with each other in whole or in part. Moreover, although FIG. 9 illustrates a particular number of client systems 906, social-networking systems 902, third-party systems 908, and networks 904, this disclosure contemplates any suitable number of client systems 906, social-networking systems 902, third-party systems 908, and networks 904. As an example and not by way of limitation, network environment 900 may include multiple client system 906, social-networking systems 902, third-party systems 908, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client system 906, social-networking system 902, and third-party system 908 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client system 906 may be an electronic device including hardware, software, or embedded logic components or a combination of two or more such components and capable of carrying out the appropriate functionalities implemented or supported by client system 906. As an example and not by way of limitation, a client system 906 may include any of the computing devices discussed above in relation to FIG. 8. A client system 906 may enable a network user at client system 906 to access network 904. A client system 906 may enable its user to communicate with other users at other client systems 906.

In particular embodiments, client system 906 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 906 may enter a Uniform Resource Locator (URL) or other address directing the web browser to a particular server (such as server, or a server associated with a third-party system 908), and the web browser may generate a Hyper Text Transfer Protocol (HTTP) request and communicate the HTTP request to server. The server may accept the HTTP request and communicate to client system 906 one or more Hyper Text Markup Language (HTML) files responsive to the HTTP request. Client system 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 902 may be a network-addressable computing system that can host an online social network. Social-networking system 902 may generate, store, receive, and send social-networking data, such as, for example, user-profile data, concept-profile data, social-graph information, or other suitable data related to the online social network. Social-networking system 902 may be accessed by the other components of network environment 900 either directly or via network 904. In particular embodiments, social-networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 906, a social-networking system 902, or a third-party system 908 to manage, retrieve, modify, add, or delete, the information stored in data store.

In particular embodiments, social-networking system 902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 902 may provide users of the online social network the ability to communicate and interact with other users. In particular embodiments, users may join the online social network via social-networking system 902 and then add connections (e.g., relationships) to a number of other users of social-networking system 902 whom they want to be connected to. Herein, the term "friend" may refer to any other user of social-networking system 902 with whom a user has formed a connection, association, or relationship via social-networking system 902.

In particular embodiments, social-networking system 902 may provide users with the ability to take actions on various types of items or objects, supported by social-networking system 902. As an example and not by way of limitation, the items and objects may include groups or social networks to which users of social-networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 902 or by an external system of third-party system 908, which is separate from social-networking system 902 and coupled to social-networking system 902 via a network 904.

In particular embodiments, social-networking system 902 may be capable of linking a variety of entities. As an example and not by way of limitation, social-networking system 902 may enable users to interact with each other as well as receive content from third-party systems 908 or other entities, or to allow users to interact with these entities through an application programming interfaces (API) or other communication channels.

In particular embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating social-networking system 902. In particular embodiments, however, social-networking system 902 and third-party systems 908 may operate in conjunction with each other to provide social-networking services to users of social-networking system 902 or third-party systems 908. In this sense, social-networking system 902 may provide a platform, or backbone, which other systems, such as third-party systems 908, may use to provide social-networking services and functionality to users across the Internet.

In particular embodiments, a third-party system 908 may include a third-party content object provider. A third-party content object provider may include one or more sources of content objects, which may be communicated to a client system 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 902 also includes user-generated content objects, which may enhance a user's interactions with social-networking system 902. User-generated content may include anything a user can add, upload, send, or "post" to social-networking system 902. As an example and not by way of limitation, a user communicates posts to social-networking system 902 from a client system 906. Posts may include data such as status updates or other textual data, location information, photos, videos, links, music or other similar data or media. Content may also be added to social-networking system 902 by a third-party through a "communication channel," such as a newsfeed or stream.

In particular embodiments, social-networking system 902 may include a variety of servers, sub-systems, programs, modules, logs, and data stores. In particular embodiments, social-networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 902 may also include suitable components such as network interfaces, security mechanisms, load balancers, failover servers, management-and-network-operations consoles, other suitable components, or any suitable combination thereof. In particular embodiments, social-networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 902 to one or more client systems 906 or one or more third-party system 908 via network 904. The web server may include a mail server or other messaging functionality for receiving and routing messages between social-networking system 902 and one or more client systems 906. An API-request server may allow a third-party system 908 to access information from social-networking system 902 by calling one or more APIs. An action logger may be used to receive communications from a web server about a user's actions on or off social-networking system 902. In conjunction with the action log, a third-party-content-object log may be maintained of user exposures to third-party-content objects. A notification controller may provide information regarding content objects to a client system 906. Information may be pushed to a client system 906 as notifications, or information may be pulled from client system 906 responsive to a request received from client system 906. Authorization servers may be used to enforce one or more privacy settings of the users of social-networking system 902. A privacy setting of a user determines how particular information associated with a user can be shared. The authorization server may allow users to opt in to or opt out of having their actions logged by social-networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client systems 906 associated with users. Advertisement-pricing modules may combine social information, the current time, location information, or other suitable information to provide relevant advertisements, in the form of notifications, to a user.

Figure 10:
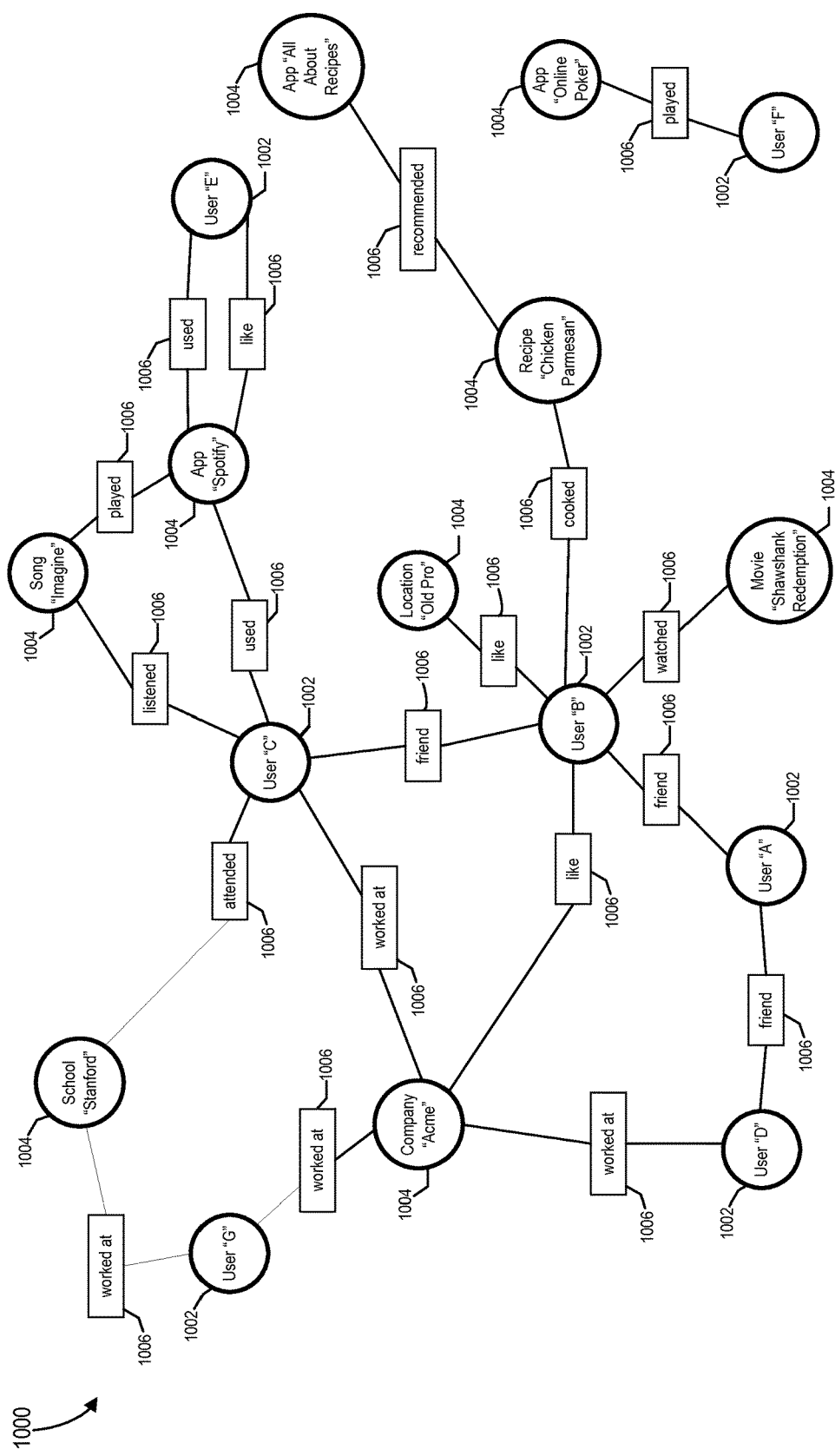
FIG. 10 illustrates an example social graph for a social-networking system in accordance with one or more embodiments.

FIG. 10 illustrates example social graph 1000. In particular embodiments, social-networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social-networking system 902, client system 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social-networking system 902. As an example and not by way of limitation, a user may be an individual (human user), an entity (e.g., an enterprise, business, or third-party application), or a group (e.g., of individuals or entities) that interacts or communicates with or over social-networking system 902. In particular embodiments, when a user registers for an account with social-networking system 902, social-networking system 902 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social-networking system 902. In particular embodiments, a user node 1002 may be associated with information provided by a user or information gathered by various systems, including social-networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 902 or a third-party website associated with a web-application server); an entity (such as, for example, a person, business, group, sports team, or celebrity); a resource (such as, for example, an audio file, video file, digital photo, text file, structured document, or application) which may be located within social-networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social-networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social-networking system 902. Profile pages may also be hosted on third-party websites associated with a third-party server 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 906 to send to social-networking system 902 a message indicating the user's action. In response to the message, social-networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social-networking system 902 may send a "friend request" to the second user. If the second user confirms the "friend request," social-networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social-networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social-networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social-networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 906) may indicate that he or she likes the concept represented by the concept node 1004 by clicking or selecting a "Like" icon, which may cause the user's client system 906 to send to social-networking system 902 a message indicating the user's liking of the concept associated with the concept-profile page. In response to the message, social-networking system 902 may create an edge 1006 between user node 1002 associated with the user and concept node 1004, as illustrated by "like" edge 1006 between the user and concept node 1004. In particular embodiments, social-networking system 902 may store an edge 1006 in one or more data stores. In particular embodiments, an edge 1006 may be automatically formed by social-networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 902) or RSVP (e.g., through social-networking system 902) to an event associated with the advertisement. In addition or as an alternative, an advertisement may include social-networking-system context directed to the user. As an example and not by way of limitation, an advertisement may display information about a friend of the user within social-networking system 902 who has taken an action associated with the subject matter of the advertisement.

In particular embodiments, social-networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 902 may calculate a coefficient based on a user's actions. Social-networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social-networking system 902 may analyze a user's actions to determine whether one or more of the actions indicate an affinity for subject matter, content, other users, and so forth. As an example and not by way of limitation, if a user may make frequently posts content related to "coffee" or variants thereof, social-networking system 902 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 902 may calculate a coefficient based on the type of relationship between particular objects. Referencing the social graph 1000, social-networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 902 may determine that the user has a higher coefficient with respect to the first photo than the second photo because having a tagged-in-type relationship with content may be assigned a higher weight and/or rating than having a like-type relationship with content. In particular embodiments, social-networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social-networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 906 of the user). A first user may be more interested in other users or concepts that are closer to the first user. As an example and not by way of limitation, if a user is one mile from an airport and two miles from a gas station, social-networking system 902 may determine that the user has a higher coefficient for the airport than the gas station based on the proximity of the airport to the user.

In particular embodiments, social-networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 902 may provide information that is relevant to user's interests and current circumstances, increasing the likelihood that they will find such information of interest. In particular embodiments, social-networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social-networking system 902 may calculate the coefficient (or access the coefficient information if it has previously been calculated and stored). In particular embodiments, social-networking system 902 may measure an affinity with respect to a particular process. Different processes (both internal and external to the online social network) may request a coefficient for a particular object or set of objects. Social-networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/979,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social-networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 902 may send a request to the data store for the object. The request may identify the user associated with the request and may only be sent to the user (or a client system 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   receiving, at one or more servers from a first client device associated with a user, a request from the user to send a payment to a co-user as part of a payment transaction, the request including a payment amount;
   sending, by the one or more servers to a payment network, a charge request against a payment credential of the user for the payment amount of the payment request;
   receiving, at the one or more servers from the payment network, a successful charge response indicating that the charge request was successful;
   pushing, by the one or more servers in response to the successful charge response via one or more payment queues, a payment initiation message to the first client device associated with the user and a second client device associated with the co-user, the one or more payment queues comprising communications media at the one or more servers that temporarily store data sent to, and received from, the user and the co-user and in communication with a first group of servers of the one or more servers, the first group of servers processing payment transaction information with the payment network;
   sending, by the one or more servers to the second client device via one or more message queues in parallel with the payment initiation message to the second client device via a second payment queue of the one or more payment queues, a message indicating the payment for entry into a messaging thread between the users at the second client device, the one or more message queues comprising communications media at the one or more servers that temporarily store data sent to, and received from, the user and the co-user and in communication with a second group of servers of the one or more servers separate from the first group of servers, the second group of servers comprising a message database maintaining an archive of messaging threads involving the user and the co-user;
   writing, by the second group of servers to the message database, the message indicating the payment at the same time as, or after, sending the message to the second client device via a recipient message queue of the one or more message queues;
   receiving, at the one or more servers, a status update for the payment transaction; and
   pushing, by the one or more servers, the status update for the payment transaction to the first client device and the second client device via the one or more payment queues.

2. The method as recited in claim 1, further comprising:
   generating a transaction identifier for the payment transaction; and
   associating the transaction identifier with the message indicating the payment.

3. The method as recited in claim 2, wherein receiving the status update for the payment transaction comprises:
identifying the transaction identifier in connection with the status update; and
determining, based on the transaction identifier, that the status update is associated with the payment transaction.

4. The method as recited in claim 2, wherein associating the transaction identifier with the message indicating the payment comprises:
generating a message identifier for the message; and
mapping the message identifier to the transaction identifier.

5. The method as recited in claim 1, wherein the payment initiation message comprises the payment amount, a sender ID, a sequence ID, transaction ID, a status identifier, and a recipient ID; and
the message indicating the payment comprises a link to the payment amount in the payment initiation message such that the message indicating the payment displays the payment amount from the payment initiation message.

6. The method as recited in claim 5, further comprising, in response to the receipt of the status update for the payment transaction, incrementing the sequence ID of the payment initiation message; and
determining which client devices to push message status update for the payment transaction based on a current sequence ID of the client devices.

7. The method as recited in claim 1, wherein pushing, by the one or more servers, the status update for the payment transaction consists of sending any changes to the payment initiation message based on the received status update for the payment transaction.

8. The method as recited in claim 1, wherein the status update comprises a transaction completion update.

9. The method as recited in claim 1, further comprising:
obtaining, from the second client device, a sequence ID indicating a most recent update received by the second client device via the second payment queue of the one or more payment queues;
determining that the sequence ID obtained from the second client device does not match a sequence ID maintained in the second payment queue indicating a most recent update sent to the second client device; and
pushing changes corresponding to sequence IDs after the sequence ID obtained from the second client device and up to the sequence ID maintained in the second payment queue.

10. A system comprising:
at least one server; and
at least one non-transitory computer readable storage medium storing instructions thereon, that, when executed by the at least one server, cause the system to:
receive, from a first client device associated with a user, a request from the user to send a payment to a co-user as part of a payment transaction, the request including a payment amount;
send, to a payment network, a charge request against a payment credential of the user for the payment amount of the payment request;
receive, from the payment network, a successful charge response indicating that the charge request was successful;
push, in response to the successful charge response via one or more payment queues, a payment initiation message to the first client device associated with the user and a second client device associated with the co-user, the one or more payment queues comprising communications media at one or more servers that temporarily store data sent to, and received from, the user and the co-user and in communication with a first group of servers of the one or more servers, the first group of servers processing payment transaction information with the payment network;
send, to the second client device via one or more message queues in parallel with the payment initiation message to the second client device via a second payment queue of the one or more payment queues, a message indicating the payment for entry into a messaging thread between the users at the second client device, the one or more message queues comprising communications media at the one or more servers that temporarily store data sent to, and received from, the user and the co-user and in communication with a second group of servers of the one or more servers separate from the first group of servers, the second group of servers comprising a message database maintaining an archive of messaging threads involving the user and the co-user;
write, by the second group of servers to the message database, the message indicating the payment at the same time as, or after, sending the message to the second client device via a recipient message queue of the one or more message queues;
receive a status update for the payment transaction; and
push the status update for the payment transaction to the first client device and the second client device via the one or more payment queues.

11. The system as recited in claim 10, further comprising instructions that, when executed by the at least one server, cause the system to:
generating a transaction identifier for the payment transaction; and
associating the transaction identifier with the message indicating the payment.

12. The system as recited in claim 11, wherein the instructions, when executed by the at least one server, cause the system to receive the status update for the payment transaction by:
identifying the transaction identifier in connection with the status update; and
determining, based on the transaction identifier, that the status update is associated with the payment transaction.

13. The system as recited in claim 11, wherein the instructions, when executed by the at least one server, cause the system to associate the transaction identifier with the message indicating the payment by:
generating a message identifier for the message; and
mapping the message identifier to the transaction identifier.

14. The system as recited in claim 10, wherein:
the payment initiation message comprises the payment amount, a sender ID, a sequence ID, transaction ID, a status identifier, and a recipient ID; and
the message indicating the payment comprises a link to the payment amount in the payment initiation message such that the message indicating the payment displays the payment amount from the payment initiation message.

15. The system as recited in claim 14, wherein the instructions, when executed by the at least one server, cause the system to:

increment the sequence ID of the payment initiation message in response to the receipt of the status update for the payment transaction; and determine which client devices to push message status update for the payment transaction based on a current sequence ID of the client devices.

16. The system as recited in claim 10, wherein the instructions, when executed by the at least one server, cause the system to push the status update for the payment transaction by sending any changes to the payment initiation message based on the received status update for the payment transaction.

17. The system as recited as in claim 10, further comprising instructions that, when executed by the at least one server, cause the system to:
   obtain, from the second client device, a sequence ID indicating a most recent update received by the second client device via the second payment queue of the one or more payment queues;
   determine that the sequence ID obtained from the second client device does not match a sequence ID maintained in the second payment queue indicating a most recent update sent to the second client device; and
   push changes corresponding to sequence IDs after the sequence ID obtained from the second client device and up to the sequence ID maintained in the second payment queue.

18. The system as recited in claim 10, wherein the status update comprises a transaction cancellation update.

19. A non-transitory computer-readable medium storing instructions thereon that, when executed by at least one processor, cause a computer system to:
   receive, from a first client device associated with a user, a request from the user to send a payment to a co-user as part of a payment transaction, the request including a payment amount;
   send, to a payment network, a charge request against a payment credential of the user for the payment amount of the payment request;
   receive, from the payment network, a successful charge response indicating that the charge request was successful;
   push, in response to the successful charge response via one or more payment queues, a payment initiation message to the first client device associated with the user and a second client device associated with the co-user, the one or more payment queues comprising communications media at one or more servers that temporarily store data sent to, and received from, the user and the co-user and in communication with a first group of servers of the one or more servers, the first group of servers processing payment transaction information with the payment network;
   send, to the second client device via one or more message queues in parallel with the payment initiation message to the second client device via a second payment queue of the one or more payment queues, a message indicating the payment for entry into a messaging thread between the users at the second client device, the one or more message queues comprising communications media at the one or more servers that temporarily store data sent to, and received from, the user and the co-user and in communication with a second group of servers of the one or more servers separate from the first group of servers, the second group of servers comprising a message database maintaining an archive of messaging threads involving the user and the co-user;
   write, by the second group of servers to the message database, the message indicating the payment at the same time as, or after, sending the message to the second client device via a recipient message queue of the one or more message queues;
   receive a status update for the payment transaction; and
   push the status update for the payment transaction to the first client device and the second client device via the one or more payment queues.

20. The non-transitory computer readable medium as recited in claim 19, further comprising instructions that, when executed by the at least one processor, cause the computer system to:
   generate a transaction identifier for the payment transaction; and
   associate the transaction identifier with the message indicating the payment.

* * * * *